3,357,888
4,7-DIMETHYL ANDROSTENE DERIVATIVES
J Allan Campbell and John C. Babcock, Kalamazoo,
Mich., assignors to The Upjohn Company, Kalamazoo, Mich., a corporation of Delaware
No Drawing. Filed Apr. 7, 1965, Ser. No. 446,418
13 Claims. (Cl. 167—65)

This invention relates to novel steroid compounds, especially to 4,7α-dimethyl-4-androstenes, 4(α and β),7α-dimethyl-5(α and β)-androstanes, the 2α-methyl derivatives thereof and the 19-nor counterparts of the foregoing.

The compounds of the present invention and the processes for their production are illustratively represented by the following sequence of formulae:

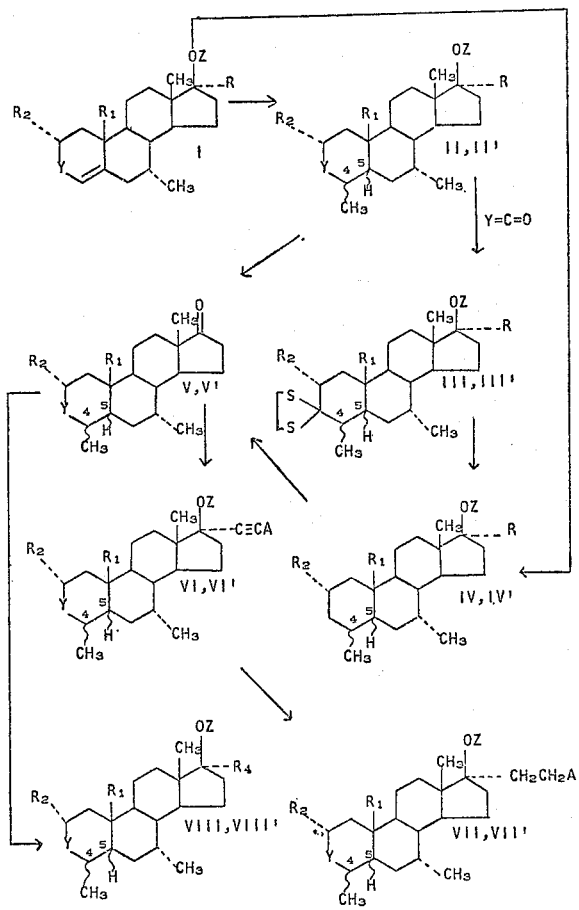

wherein ) is a generic expression denoting α- and β-bonds and mixtures thereof; the 4(5)-carbon atom linkage is selected from the group consisting of single bonds and double bonds, with the proviso that the 5-hydrogen atom is absent when the 4(5)-carbon atom linkage is a double bond; R, $R_1$ and $R_2$ are selected from the group consisting of hydrogen and methyl; $R_4$ is a lower alkyl radical containing from one to twelve carbon atoms, inclusive; Z is selected from the group consisting of hydrogen, lower alkyl of from one to twelve carbon atoms, inclusive, and the lower acyl radical of an organic carboxylic acid containing from one two twelve carbon atoms, inclusive; Y is selected from the group consisting of the methylene radical (>$CH_2$), the carbonyl radical (>C=O),

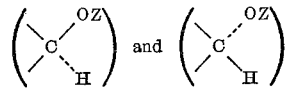

Z having the same meanings as above; A is selected from the group consisting of hydrogen, lower alkyl of from one to twelve carbon atoms, inclusive, chlorine, bromine, and trifluoromethyl; the symbol

represents a thioketal radical of the formula

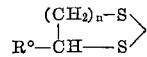

wherein $n$ is selected from the integers one and two and R° is selected from the group consisting of hydrogen and a lower alkyl radical containing from one to six carbon atoms, inclusive. In the examples relating to 3-thioketals the specific ketal used is the cyclic 3-(ethylene mercaptole) also named as a cyclic 3-(ethylene dithioketal). For brevity, these are referred to as the 3-thioketal.

The compounds of the invention are prepared from the known 7α-methyl-4-androstene starting materials of Formula I, which are synthesized in the manner described in J. Amer. Chem. Soc., 81, 4069. The corresponding 2α,7α-dimethyl starting compounds (I) are produced in accordance with the procedures of U.S. Patent 2,923,720.

The 4,7α-dimethyl, 2α,4,7α-trimethyl and 2α,4,7α,17α-tetramethyl compounds of Formula II, wherein the 4(5)-carbon atom linkage is a double bond, are prepared in accordance with Canadian Patent No. 676,599 and Australian Patent No. 244,970. A 3-oxo-Δ⁴-starting steroid of Formula I is condensed with formaldehyde or paraformaldehyde and a thiol in the presence of a basic catalyst to yield a corresponding 4-organothiomethyl-3-oxo-Δ⁴-steroid (I′). It is not necessary to isolate the 4-organothiomethyl compounds (I′) in crystalline form, as they are generally formed in high yield, so that the total product can be employed in a desulfurization step resulting in the production of the various 4-methylated compounds embraced by Formula II.

Desulfurization of the 4-organothiomethyl intermediates (I′) can be carried out by treating a solution of the organothiomethyl compound with Raney nickel of a suitable reactivity. The preferred solvent is acetone, but other ketonic solvents such as butan-2-one or cyclohexanone can be employed, either alone or diluted with an inert solvent such as a lower alkanol containing up to 5 carbon atoms. The reactivity of the Raney nickel must first be adjusted so as to prevent saturation of the 4:5-ethylenic linkage, which may occur if a highly active Raney nickel is used. Raney nickel, as ordinarily prepared, may be suitably deactivated by preliminary heating in the ketonic solvent, preferably acetone, in which the desulfurization is to be effected, if desired in a slow stream of nitrogen to facilitate removal of the hydrogen gas which is evolved from the nickel. The thiomethyl compound (I′) is then added to the suspension of deactivated Raney nickel (heating if desired), and reaction is continued until desulfurization is completed, when the corresponding 4,7α-dimethyl, 2α,4,7α-trimethyl or 2α,4,7α,17α-tetramethyl-3-oxo-Δ⁴-steroid (II) can be isolated, for example, by filtration to remove the nickel and evaporation of the filtrate.

When the thiomethyl compound (I′) contains a readily oxidizable hydroxyl group, such as a 17β-hydroxyl group, it is advisable to protect this group by formation of a derivative such as the acetate or propionate prior to the desulfurization reaction, in order to avoid partial oxidation of the hydroxyl group to an oxo group, which may occur, with concomitant reduction of a part of the ketonic solvent to the corresponding alcohol, under the catalytic influence of Raney nickel. The hydroxyl group can be regenerated after desulfurization, if desired, by hydrolysis of the ester, for example, with alcoholic alkali.

Alternatively, when esterified products are required, it will be apparent to those skilled in the art that an ester group can be conveniently introduced into the thiomethyl compound. Thus, for example, in the preparation of a 4,7α-dimethyl, 2α,4,7α-trimethyl or 2α,4,7α,17α-tetramethyl testosterone ester (II) a corresponding 4-alkyl or arylthiomethyltestosterone (I') can be converted by esterification into the appropriate 4-alkyl or arylthiomethyltestosterone ester (I'), and the latter compound treated with Raney nickel to give the required 4-methyltestosterone ester (II). For the preparation of such products as 4,7α-dimethyltestosterone (II), 2α,4,7α-trimethyltestosterone (II) or 2α,4,7α,17α-tetramethyltestosterone (II), zinc dust alkali-metal hydroxide forms a convenient reducing agent.

An alternative method for converting the compounds of Formula I to the corresponding 4-alkyl derivatives (II) is described in U.S. Patent 3,070,612. In accordance with the process disclosed therein, the starting materials of this application, such as 7α-methyl-17β-hydroxy-4-androsten-3-one (I), a 7α-methyl-17α-lower-aliphatic hydrocarbon-17β-hydroxy-4-androsten-3-one (I), or the 2α-methyl counterparts (I) of the foregoing, can be treated with a secondary cyclic amine to produce the 3-enamine of the corresponding starting material. The 3-enamine thus produced can then be reacted with an alkylating agent to produce the 4-alkyl-3-enamine of the corresponding starting material; these compounds on hydrolytic removal of the enamine group yield the corresponding 4-alkyl-3-keto compounds, i.e., the 4-alkyl-7α-methyl-17β-hydroxy-4-androsten-3-ones (II), the 4-alkyl-7α-methyl-17α-lower-aliphatic hydrocarbon-17β-hydroxy-4-androsten-3-ones (II) or their 2α-methyl counterparts (II), which can be esterified with an acylating agent such as an acid anhydride or acid halide of an organic carboxylic acid, especially a hydrocarbon carboxylic acid containing from one to twelve carbon atoms, inclusive, to yield the corresponding 17β-acylates, i.e., the 4-alkyl-7α-methyl-17β-acyloxy-4-androsten-3-ones (II), the 4-alkyl-7α-methyl-17α-lower-aliphatic hydrocarbon-17β-acyloxy-4-androsten-3-ones (II) or their 2α-methyl counterparts (II).

The compounds of Formula II of this invention wherein the 4(5)-carbon atom linkage is a double bond, can be converted to the corresponding compounds of Formulae III, IV, V, VI, VII and VIII in accordance with the procedures that follow.

In order to produce the Δ⁴-3-desoxy compounds of Formula IV, the compounds of Formula II are first converted to their corresponding 3-thioketal derivatives (III) in the manner of J. Amer. Chem. Soc., 76, 1945, namely, by reaction with an alkanedithiol (such as ethanedithiol) in the presence of an organic acid and a strong Lewis acid catalyst (e.g., boron trifluoride etherate); desulfurization is accomplished by hydrogenation of the 3-thioketal group (III) (e.g., with sodium metal in liquid ammonia or with hydrogen in the presence of a catalyst such as Raney nickel) to yield a corresponding 3-desoxy compound (IV), such as 4,7α-dimethyl-19-nor-17β-hydroxy-4-androstene (IV).

Oxidation of the compounds of Formulae II and IV, e.g., 4,7α-dimethyl-19-nor-17β-hydroxy-4-androsten-3-one (II), 2α,4,7α-trimethyl-17β-hydroxy-4-androsten-3-one (II) and 4,7α-dimethyl-19-nor-17β-hydroxy-4-androstene (IV), with oxidizing agents such as chromic acid, sodium dichromate, potassium dichromate, and the like, using procedures known in the art, yields 4,7α-dimethyl-19-nor-4-androsten-17-one (V), 2α,4-7α-trimethyl-4-androstene-3,17-dione (V) and 4,7α-methyl-19-nor-4-androsten-17-one (V), respectively. The 3-ketones of Formula V can be converted to the corresponding 3β-alcohols by known procedures, e.g., by reduction in cold (about +5° C. to about −15° C.) tetrahydrofuran with lithium aluminum tri-t-butoxyhydride.

The 4,7α-dimethyl (and 2α,4,7α-trimethyl)-3,17-diketo-4-androstenes of Formula V, prior to the formation of their corresponding 17α-alkynyl and haloalkynyl derivatives (VI), must first be converted to the corresponding 3-enamines, 3-ketals, or 3-enol ethers in order to protect the 3-keto function from reduction. The 3-enamine formation can be accomplished in the manner described in U.S. Patent 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4-dimethylpyrrolidine, 3-ethylpyrrolidine, 3-isopropylpyrrolidine, 3,3-dimethylpyrrolidine, 2-methylmorpholine, 3-methylmorpholine, and the like. Pyrrolidine is the preferred amine for use in the above reaction.

Advantageously, the 3-enamine is prepared by heating the 4,7α-dimethyl (and 2α,4,7α-trimethyl)-4-androstene-3,17β-diones (V) and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamines of 4,7α-dimethyl (and 2α,4,7α-trimethyl)-4-androstene-3,17-diones (V) so obtained are then reacted with an alkali metal derivative, for example, the lithium, sodium or potassium derivative of the appropriate alkyne. The reaction is carried out preferably in the presence of an anhydrous inert solvent such as dimethylformamide, dimethylsulfoxide, benzene and the like. The 3-enamines of the 4,7α-dimethyl (and 2α,4,7α-trimethyl)-17α-alkynyltestosterones (VI) so obtained are not generally isolated from the reaction mixture but are hydrolyzed in situ to the free 4,7α-dimethyl (and 2α,4,7α-trimethyl)-17α-alkynyltestosterones (VI) by treatment with an aqueous solution of a base such as sodium hydroxide, potassium hydroxide, and the like, after first decomposing the reaction mixture with water, ammonium chloride, and the like.

The 4,7α - dimethyl (and 2α,4,7α - trimethyl) - 17α-alkynyltestosterones (VI) so obtained can be purified, if desired, by procedures known in the art such as by chromatography, recrystallization, and the like.

The 4,7α - dimethyl (and 2α,4,7α - trimethyl) - 17α-alkynyltestosterones (VI) of the invention can also be prepared by reacting the 3-enamines of the 4,7α-dimethyl (and 2α,47α-trimethyl)-4-androstene-3,17-diones (V), prepared as described above, with the appropriate alkynyl magnesium halide. The reaction is preferably carried out in the presence of a solvent such as dimethyl ether, tetrahydrofuran, and the like. Preferably the Grignard reagent is employed in an excess of the order of 10 moles per mole of the 3-enamine. The 3-enamines of 4,7α-dimethyl (and 2α,4,7α-trimethyl)-17α-alkynyltestosterone (VI) so obtained are generally not isolated from the reaction mixture but are hydrolyzed in situ to the free 4,7α-dimethyl (and 2α,4,7α-trimethyl)-17α-alkynyltestostrones (VI) by the method described above.

In converting the 4,7α-dimethyl (and 2α,4,7α-trimethyl)-3,17-diketo-4-androstenes (V) to their corresponding 17α-alkynyl and haloalkynyl derivatives (VI), 3-keto protecting groups in addition to the 3-enamines described above, such as 3-ketals and 3-enol ethers, can be employed. Treatment of a 3-ketal or 3-enol ether of a compound of Formula V with an alkali metal derivative, e.g., the lithium, sodium or potassium derivative of an appropriate alkyne or haloalkyne, yields the corresponding 17α-alkynyl derivative, which on hydrolysis gives the corresponding 3-ketone of Formula VI. Methods for the preparation of 3-ketals and 3-enol ethers of a variety of 3-keto compounds of the androstane series, and their subsequent alkynylation or haloalkynylation, are described in detail in J. Chem. Soc. 4995 (1962).

Oxidation of a compound represented by Formula IV, e.g., 4,7α - dimethyl - 19 - nor - 17β-hydroxy-4-androstene (IV), with oxidizing agents such as chromic acid, sodium dichromate, potassium dichromate, etc., employing known procedures, yields the corresponding 17-ketone (V), e.g., 4,7α-dimethyl-19-nor-4-androsten-17-one (V).

Since the compounds of Formula V thus derived lack an oxygen function at the 3-position, no protective group is required to prevent their reduction, and they can be directly converted to the corresponding 17α-alkynyl compounds (VI) by treatment with the lithium, sodium or potassium derivative of the appropriate alkyne; e.g., sodium acetylide on reaction with 7α-methyl-19-nor-4-androsten-17-one (V) yields 4,7α-dimethyl-19-nor-17β-hydroxy-17α-ethynyl-4-androstene (VI).

The alkynyl compounds of Formula VI can be readily reduced at the 17α-position exclusively (e.g., with hydrogen in the presence of a palladium catalyst) to give the corresponding saturated compound (VII). For example, by employing the foregoing procedure, 4,7α-dimethyl-19-nor-17β-hydroxy - 17α - ethynyl - 4 - androstene (VI) and 4,7α-dimethyl-19-nor-17β-hydroxy - 17α-ethynyl-4-androsten-3-one (VI) are converted to 4,7α-dimethyl-19-nor-17α-hydroxy-17α-ethyl-4-androstene (VII) and 4,7α-dimethyl-19-nor - 17β - hydroxy - 17α-ethyl-4-androsten-3-one (VII), respectively.

The 17-ketones represented by Formula V can be converted to the corresponding 17β-hydroxy-17α-alkyl derivatives (VIII) by treatment with an appropriate alkylating agent such as an appropriate Grignard reagent or alkyl lithium compound. For example, 4,7α-dimethyl-19-nor-4-androsten-17-one (V) when heated under reflux in an inert solvent (e.g., benzene-tetrahydrofuran) with methylmagnesium bromide yields 4,7α,17α-trimethyl-19-nor-17β-hydroxy-4-androstene (VIII). Before converting the compounds of Formula V (Y=>C=O) to the 17α-alkyl compounds (VIII) by the above procedure, it is necessary to first attach a protecting group at the 3-position, e.g., an enamine; this can be carried out in the manner described hereinbefore for preparing the 17α-alkynyl compounds (VI) from the corresponding 17-ketones (V). The 17α-alkylated-3-enamine produced by the reaction of an appropriate alkylating agent (e.g., a Grignard reagent or alkyl lithium) with a 3-enamine of a compound of Formula V is generally not isolated from the reaction mixture, but is hydrolyzed in situ to the corresponding 4,7α-dimethyl (or 2α,4,7α-trimethyl)-17α-alkyl derivative (VIII) by treatment with an aqueous solution of a base such as sodium hydroxide, potassium hydroxide, etc., after first decomposing the reaction mixture with water, ammonium chloride, and the like. By following the foregoing procedure, 2α,4,7α-trimethyl - 4 - androstene-3,17-dione 3-pyrrolidinyl enamine (V) is converted to 2α,4,7α,17α-tetramethyl-17β-hydroxy-4-androsten - 3 - one (VIII).

The 4,7α - dimethyl - 17β - hydroxy-4-androsten-3-ones (II), 4,7α,17α-trimethyl - 17β-hydroxy-4-androsten-3-ones (II) and their 2α-methyl derivatives (II), produced as above, are readily reduced by known methods to the corresponding 4(α and β),7α-dimethyl-17β-hydroxy-5 (α and β)-androstan-3-ones (II'), 4(α and β),7α,17α-trimethyl-17β-hydroxy-5(α and β)-androstan-3-ones (II') and their 2α-methyl counterparts (II'); further reduction yields the corresponding 3(α and β)-alcohols (II''). All of the foregoing 4(α and β),7α-dimethyl-5(α and β)-androstanes embraced within Formula II of the flowsheet, above, can be converted to the steroids included within Formulae III through VIII therein, in the manner described below.

The α,β-unsaturated ketones (II) can be reduced with metal (preferably lithium) in ammonia to yield the corresponding 3-keto-5α-androstanes (II') and the reduction stopped at this stage if reagents such as t-butyl alcohol or ammonium chloride are employed at the end of the reaction (in the manner described in J. Amer. Chem. Soc. 81, 2386 for the conversion XX→XXV). The same publication shows that continued treatment following the addition of methanol instead of t-butyl alcohol or ammonium chloride, leads directly to the saturated 3β-hydroxy-5α-androstanes (II''). For example, when the reduction of a compound such as a 4(α or β),7α-dimethyl-17β-hydroxy-4-androsten-3-one (II), e.g., with lithium in ammonia, is discontinued at the point where a 4(α or β),7α-dimethyl - 17β - hydroxy - 5α - androstan-3-one (II') is formed, it can be further reduced (e.g., with sodium borohydride) to yield a 4(α or β),7α-dimethyl-3β,17β-dihydroxy-5α-androstane (II''). On the other hand, the reduction of a 3-keto-4-androstene (II) directly to the corresponding 3β-hydroxy-5α-androstane (II''), without isolation of the 3-keto-5α-androstan-3-one (II'), can be carried out in accordance with the above-noted publication.

The 3-keto-4(α or β),7α-dimethyl (and 2α,4[α or β], 7α-trimethyl)-5α-androstanes (II') can be reduced to yield a mixture of 3(α and β)-hydroxy-5α-androstanes (II''). For example, treating a 4(α or β),7α-dimethyl-17β-hydroxy-5α-androstan-3-one 17-acylate (II') with lithium aluminum tri-t-butoxyhydride in a solvent (e.g., tetrahydrofuran) yields a corresponding 4(α or β),7α-dimethyl-3α,17α-dihydroxy - 5α - androstane - 17 - acylate (II'') and a corresponding 4(α or β),7α-dimethyl-3β,17α-dihydroxy-5α-androstane 17-acylate (II'').

In general, the metal (lithium)-ammonia reductions of the 3-keto-4-androstenes (II) are conducted in the presence of co-solvents such as ether, dioxane or tetrahydrofuran.

Conversion of the Δ⁴-compounds of Formula II to a variety of 3(α and β)hydroxy-5α-androstanes can be carried out by procedures known in the steroid art. For example, after reduction of a Δ⁴-compound of Formula II, such as a 4,7α-dimethyl-17β-hydroxy-4-androsten-3-one 17-aceylate (II), e.g., with lithium in ammonia in a solvent such as tetrahydrofuran, to yield a compound of Formula II', such as a corresponding 4(α or β),7α-dimethyl-17β-hydroxy-5α-androstan-3-one 17-acylate (II'), the thus produced compound (II') is treated with a reducing agent to obtain compounds such as a corresponding 4(α or β),7α-dimethyl-3α,17β-dihydroxy-5α-androstan 17-acylate (II'α) and a corresponding 4(α or β),7α-dimethyl-3β,17β-dihydroxy-5α-androstan 17-acylate (II'β).

The conversion of the 3-ketones of Formula II' to the corresponding 3(α and β)-alcohols (II'α and II'β) is carried out using a reducing agent, for example, lithium tri-t-butoxy-hydride, lithium aluminum triethoxyhydride, sodium borohydride, potassium borohydride, diborane, and the like, in an inert organic solvent, for example, tetrahydrofuran, ether, diethyleneglycol dimethyl ether, and the like. Advantageously, the reaction is carried out at temperatures of from 0° to 100° C. for from about ¼ to about 2 hours, with a temperature of 25° C. for about ½ hour being preferred. The compounds of Formulae IIα and IIβ are recovered following their formation by fractional crystallization, chromatography of the total crude reaction product on acid washed alumina, Florisil (synthetic aluminum silicate), silica gel (precipitated silicic acid granules), or silicic acid, with elution by commercial hexanes containing increasing amounts of acetone or benzene containing increasing amounts of methanol, Craig countercurrent partition separation, column partition chromatography, preparative paper chromatography, thin-layer chromatography, or a combination of these methods.

The conversion of the compounds of Formulae II'α, such as a 4(α or β),7α-dimethyl-3α,17β-dihydroxy-5α-androstan 17-acylate, and 11'β, such as a 4(α or β),7α-dimethyl-3β,17β-dihydroxy-5α-androstan 17-acylate, to the corresponding 17β-alcohols, such as 4(α or β),7α-dimethyl-3α,17β-dihydroxy-5α-androstane and 4(α or β), 7α-dimethyl-3β,17β-dihydroxy-5α-androstane, is carried out according to procedures well known in the art for the conversion of androstane 17-acylates to androstane 17-alcohols as shown in U.S. Patent 2,849,464.

A compound of Formula II′$\beta$, such as a 4($\alpha$ or $\beta$), 7$\alpha$-dimethyl-3$\beta$,17$\beta$-dihydroxy-5$\alpha$-androstane 17 - acylate (II′$\beta$), can be transformed to a corresponding 3$\alpha$-hydroxy-17-ketone (II′$\beta_6$) such as 4($\alpha$ or $\beta$),7$\alpha$-dimethyl-3$\alpha$-hydroxy-5$\alpha$-androstan-17-one by the five following reactions.

(1) It is first converted to its 3-tosylate by reacting it with an o-, m- or p-toluenesulfonyl halide, preferably p-toluenesulfonyl chloride, in the presence of a weak base, such as pyridine, collidine, dimethylaniline, and the like, to obtain compounds such as 4($\alpha$ or $\beta$),7$\alpha$-dimethyl-3$\beta$, 17$\beta$-dihydroxy-5$\alpha$-androstane 3-tosylate 17-acylate (II′$\beta_1$). The reaction is carried out at a temperature of from about 10° to 50° C. for from about 2 to 50 hours. The compounds of Formula II′$\beta_1$ are recovered from the reaction mixture by conventional methods, such as, for example, dilution of the reaction mixture with water, extraction with a water immiscible solvent, such as methylene chloride, ethyl acetate, benzene, toluene, and the like, or any of the methods described in the immediately preceding paragraph.

(2) The 3-tosylate 17-acylate (II′$\beta_1$) is connected to the corresponding 3-tosylate 17-alcohol (II′$\beta_2$) by treating the compounds of Formula II′$\beta_1$, such as 4($\alpha$ or $\beta$), 7$\alpha$-dimethyl-3$\beta$,17$\beta$-dihydroxy-5$\alpha$-androstane 3 - tosylate 17-acylate with a Lewis acid, such as hydrachloric, hydrobromic, sulfuric acids, boron trifluoride, and the like, in the presence of an alkanol, such as ethanol, methanol, and the like, to obtain the compounds of Formula II′$\beta_2$, such as 4($\alpha$ or $\beta$),7$\alpha$-dimethyl-3$\beta$,17$\beta$-dihydroxy-5$\alpha$-androstane 3-tosylate. These compounds (II′$\beta_2$) are recovered from the reaction mixture according to the procedures of the immediately preceding paragraph, or alternatively, the crude compounds can be used in the subsequent step for oxidation of the 17$\beta$-alcohols (II′$\beta_2$) to the corresponding 17-ketones (II′$\beta_3$) without further purification.

(3) The oxidation of the compounds of Formula II′$\beta_2$, such as 4($\alpha$ or $\beta$),7$\alpha$-dimethyl-3$\beta$,17$\beta$-dihydroxy-5$\alpha$-androstane 3-tosylate, to produce the compounds of Formula II′$\beta_3$, such as 4($\alpha$ or $\beta$),7$\alpha$-dimethyl-3$\beta$-hydroxy-5$\alpha$-androstan-17-one 3-tosylate, is carried out by reacting the 17$\beta$-hydroxycompound (II′$\beta_2$) with an oxidizing agent in the presence of an organic solvent. Suitable oxidizing agents are chromic anhydride-pyridine complex, chromic anhydride/sulfuric acid, sodium dichromate, and the like, and suitable solvents are pyridine, acetone, acetone-water, and the like, with chromic anhydride-pyridine complex being preferred. The reaction is carried out at temperatures of about 0° to about 50° C. for about 2 to about 20 hours. The compounds of Formula II′$\beta_3$ are recovered from the reaction mixture by the methods described above for the recovery of the compounds of Formula II′$\beta_1$.

(4) The compounds of Formula II′$\beta_3$, such as 4($\alpha$ or $\beta$),7$\alpha$-dimethyl-3$\beta$-hydroxy-5$\alpha$-androstan-17-one 3-tosylate, are treated with dimethylformamide at a temperature of about 80° to about 85° C. for from about 2 to about 5 days to produce a mixture of the compounds of Formula II′$\beta_4$, such as 7$\alpha$-methyl-5$\alpha$-androst-2-en-17-one, and Formula II′$\beta_5$, such as 4($\alpha$ or $\beta$),7$\alpha$-dimethyl-3$\alpha$-hydroxy-5$\alpha$-androstan-17-one 3-formate. In those instances where the 3-formylation proceeds less readily, i.e., wherein R$_2$ is alkyl, in addition to dimethylformamide the compounds of Formula II′$\beta_3$ are treated with an alkali metal formate, such as sodium, potassium or lithium formate, at a temperature of about 60° to about 220° C. for about 2 to 70 hours to give a mixture of compounds such as 2$\alpha$,4($\alpha$ or $\beta$),7$\alpha$-trimethyl-5$\alpha$-androstan-2-en-17-one (II′$\beta_4$) and 2$\alpha$,4($\alpha$ or $\beta$),7$\alpha$ - trimethyl-3$\alpha$-hydroxy-5$\alpha$-androstan-17-one 3-formate (II′$\beta_5$).

(5) The mixture comprising the compounds of Formula II′$\beta_4$, such as 4($\alpha$ or $\beta$),7$\alpha$-dimethyl-5$\alpha$-androst-2-en-17-one, and Formula II′$\beta_5$, such as 4($\alpha$ or $\beta$),7$\alpha$-dimethyl-3$\alpha$-hydroxy-5$\alpha$-androstan-17-one 3-formate, is subjected to chromatography (e.g., over a column of alumina) during which procedure the compounds of Formula II′$\beta_5$ are converted to the compounds of Formula II′$\beta_6$, such as 4($\alpha$ or $\beta$),7$\alpha$-dimethyl-3$\alpha$-hydroxy-5$\alpha$-androstan-17-one (4[$\alpha$ or $\beta$],7$\alpha$-dimethylandrosterone), while the compounds of Formula II′$\beta_4$ remain unchanged. The chromatography also brings about the separation of the compounds of Formulae II′$\beta_4$ and II′$\beta_6$ from each other. The compounds of Formulae II′$\beta_4$ and II′$\beta_6$ can be further purified by the methods described above, e.g., further chromatography, recrystallization and the like.

A compound of Formula II′$\alpha$, such as 4($\alpha$ or $\beta$),7$\alpha$-dimethyl-3$\alpha$,17$\beta$-dihydroxy - 5$\alpha$ - androstane 17 - acylate (II′$\alpha$) can be transformed to a corresponding 17-ketone (II′$\alpha_4$) by the four following reactions.

(1) The conversion of a compound of Formula II′$\alpha$, such as 4($\alpha$ or $\beta$),7$\alpha$-dimethyl-3$\alpha$,17$\beta$-dihydroxy-5$\alpha$-androstane 17-acylate, to the compounds of Formula II′$\alpha_1$, such as 4($\alpha$ or $\beta$),7$\alpha$-dimethyl-3$\alpha$,17$\beta$-dihydroxy-5$\alpha$-androstane 3-dihydropyranul ether 17-acylate (II′$\alpha_1$) is carried out by reacting a corresponding compound of Formula II′$\alpha$ with dihydropyran in the presence of a Lewis acid, such as boron trifluoride etherate, p-toluenesulfonic acid, sulfuric acid, zinc chloride, and the like. Advantageously, the reaction can be carried out in an organic solvent, such as ether, benzene, and the like. The reaction is carried out at temperatures of from about 0° C. to about 80° C., with a temperature of 25° C. being preferred. The thus obtained compounds of Formula II$\alpha_1$ are recovered from the reaction mixture by conventional methods such as, for example, dilution of the reaction mixture with water, extraction with a water immiscible solvent, such as methylene chloride, ethyl acetate, benzene, toluene and the like, or any of the methods described above for the recovery of the compounds of Formulae II′$\alpha$ and II′$\beta$. Alternatively, the entire crude product obtained in this reaction (1) can be used in the subsequent hydrolysis of step (2).

(2) The hydrolysis of the compounds of Formula II′$\alpha_1$, such as 4($\alpha$ or $\beta$),7$\alpha$-dimethyl-3$\alpha$,17$\beta$-dihydroxy-5$\alpha$-androstane 3-dihydropyranyl ether 17-acylate, to the compounds of Formula II′$\alpha_2$, such as 4($\alpha$ or $\beta$),7$\alpha$-dimethyl-3$\alpha$,17$\beta$-dihydroxy-5$\alpha$-androstane 3-dihydropyranyl ether, is carried out in an alkaline aqueous medium using relatively water soluble alkali metal carbonates, alkaline earth metal carbonates, alkali metal hydroxides, alkaline earth hydroxides, e.g., sodium or potassium carbonate, calcium carbonate, sodium or potassium hydroxide, calcium hydroxide, and the like, preferably potassium carbonate. Advantageously, there is added to the alkaline aqueous medium an inert water-miscible organic solvent, such as methanol, ethanol, isopropyl alcohol and the like, with methanol being preferred. The reaction is carried out at temperatures of about 10° C. to about 100° C. for from about 1 to about 20 hours. The compounds of Formula II′$\alpha_2$ are recovered from the reaction mixture by the methods described above for the recovery of the compounds of Formula II$\alpha_1$.

(3) The oxidation of the compounds of Formula II′$\alpha_2$, as 4($\alpha$ or $\beta$),7$\alpha$-dimethyl-3$\alpha$,17$\beta$-dihydroxy-5$\alpha$-androstane 3-dihydropyranyl ether to the compounds of Formula II′$\alpha_3$, such as 4($\alpha$ or $\beta$),7$\alpha$-dimethyl-3$\alpha$-hydroxy-5$\alpha$-androstan-17-one 3-dihydroxypyranyl ether, is carried out by reacting the starting steroid (II′$\alpha_2$) with an oxidizing agent in an organic solvent. Suitable oxidizing agents are chromic anhydride-pyridine complex, chromic anhydride/sulfuric acid, sodium dichromate, and the like; suitable solvents are pyridine, acetone, acetone-water, and the like, with chromic anhydride-pyridine complex being preferred. The reaction is carried out at temperatures of from about 0° C. to about 50° C. for from about 2 to about 20 hours. The compounds of Formula II'α₃ are recovered from the reaction mixture by the methods described above for the recovery of the compounds of Formula II'α₁. Alternatively, the crude compounds of Formula IIα₃ can be used in the subsequent step, namely, the removal of the dihydropyranyl ether group, without further purification.

(4) The removal of the dihydropyranyl group is carried out by treating the compounds of Formula II'α₃, such as 4(α or β),7α-dimethyl-3α-hydroxy-5α-androstan-17-one 3-dihydropyranyl ether; with an acid in an organic solvent to obtain the compounds of Formula II'α₄, such as 4(α or β),7α-dimethyl-3α-hydroxy-5α-androstan-17-one. Preferably the acid is a mineral acid, such as hydrochloric, hydrobromic, or sulfuric acids, and the like. Suitable solvents are acetone-water, methanol-water, dimethylsulfoxide-water, dimethylformamide-water, and the like. The reaction is conveniently carried out at temperatures of from about 10° to about 50° C. for from about 5 to about 50 hours. The compounds of Formula IIα₄ are recovered from the reaction mixture by the methods described above for the recovery of the compounds of Formula II'α₄.

The 4,7α-dimethyl (and 2α,4,7α-trimethyl)-3-keto-4-androstene compounds of Formula II, wherein the 17-substituent does not contain double or triple bonds, can be converted to the corresponding 5β-androstanes (II') by hydrogenation of the Δ⁴-bond. For example, treating a compound such as 2α,4,7α-trimethyl-17β-hydroxy-4-androsten-3-one (II) in a solvent (e.g., 95% ethyl alcohol) in the presence of a catalyst (e.g., 5% palladium on charcoal) with hydrogen until one mole equivalent is consumed, yields a compound such as 2α,4(α or β),7α-trimethyl-17β-hydroxy-5β-androstan-3-one (II'). Isolation of the desired compound from the reaction mixture and its subsequent purification is accomplished by methods well known in the art. For example, the cayalyst is removed from the reaction mixture by filtration through a bed of Celite (diatomaceous earth), the filtrate concentrated to dryness, chromatographed on an adsorbent column (e.g., Florisil), eluted with solvents such as acetone-Skellysolve B (hexanes) and recrystallized from solvents such as the aforesaid pair of eluents.

The 4(α or β), 7α-dimethyl (and 2α,4[α or β],7α-trimethyl)-3-keto-5β-androstanes of Formula II', wherein the 17-substituent does not contain double or triple bonds, can be converted to the corresponding 3α-hydroxy-5β-androstanes (II') by reduction of the 3-keto group. For example, treating a compound such as 2α,4(α or β),7α-trimethyl-17β-hydroxy-5β-androstan-3-one (II') in a solvent (e.g., tetrahydrofuran) with a reducing agent (e.g., lithium aluminum tri-t-butoxyhydride) at low temperature (e.g., 0° C.), with agitation (e.g., stirring), yields a compound such as 2α,4(α or β),7α-trimethyl-3α,17β-dihydroxy-5β-androstane (II''). The reaction mixture containing the desired compounds of Formula II'' is stored at low temperature (e.g., −15° C.) for about 18 hours. Dilute acetic acid is added until the inorganic materials are coagulated. The organic phase is decanted, dried over a dehydrating agent such as magnesium sulfate, filtered, concentrated to dryness and recrystallized from solvent to yield the 3α-hydroxy-5α-androstane (II''), or alternatively, purified by chromatography with a Florisil column.

In order to produce the 3-desoxy compounds of Formula IV, wherein the 5-hydrogen atom is α-oriented, the compounds of Formula II' are first converted to their corresponding 3-thioketal derivatives (III) in the manner of J. Amer. Chem. Soc. 76, 1945, namely, by reaction with an alkandithiol (such as ethanedithiol) in the presence of an organic acid and a strong Lewis acid catalyst (e.g., boron trifluoride etherate); desulfurization is accomplished by hydrogenation of the 3-thioketal group of the compounds of Formula III (e.g., with sodium metal in liquid ammonia or with hydrogen in the presence of a catalyst such as Raney nickel) to yield a corresponding 3-desoxy compound (IV), such as 4(α or β),7α-dimethyl-19-nor-17β-hydroxy-5α-androstane (IV).

To produce the 3-desoxy-5β-androstanes of Formula IV, the 4-androstenes of Formula II are first converted to their corresponding 3-thioketal derivatives (III) followed be desulfurization (in the same manner as in the immediately preceding paragraph) to yield a compound such as 4,7α-dimethyl-19-nor-17β-hydroxy-4-androstene. A thus produced 3-desoxy-Δ⁴-steroid can be suspended in a solvent (e.g., 95% alcohol) with a catalyst such as 5% palladium on charcoal, or Adams (platinum dioxide) catalyst, and hydrogenated until one mole equivalent of hydrogen is consumed to yield a compound such as 4(α or β),7α-dimethyl-19-nor-17β-hydroxy-5β-androstane (IV). The catalyst is filtered off and the filtrate concentrated to dryness. The residue of the 5β-hydrogen compound (IV) is purified by recrystallization or chromatography with a column of Florisil.

Oxidation of the compounds of Formulae II' and IV, such as 4(α or β),7α-dimethyl-19-nor-17β-hydroxy-5α-androstan-3-one (II'), 2α,4(α or β),7α-trimethyl-17β-hydroxy-5α-androstane (IV) and 4(α or β),7α-dimethyl-19-nor-17β-hydroxy-5β-androstane (IV), with oxidizing agents such as chromic acid, sodium dichromate, potassium dichromate, and the like, using procedures known in the art, yields 4(α or β),7α-dimethyl-19-nor-5α-androstan-17-one (V), 2α,4(α or β),7α-trimethyl-5α-androstane-3,17-dione (V) and 4(α or β),7α-dimethyl-19-nor-5β-androstan-17-one (V), respectively. The 3-ketones of Formula V can be converted to the corresponding 3β-alcohols by known procedures, e.g., by reduction in cold (about +5° C. to about −15° C.) tetrahydrofuran with aluminum tri-t-butoxyhydride.

The 4(α or β),7α- dimethyl (and 2α,4[α or β],7α-trimethyl)-3,17-diketo-5(α or β)-androstanes of Formula V, prior to the formation of their corresponding 17α-alkynyl and haloalkynyl derivatives (VI), must first be converted to the corresponding 3-enamines, 3-ketals, or 3-enol ethers in order to protect the 3-keto function from reduction. The 3-enamine formation can be accomplished in the manner described in U.S. Patent 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4-dimethylpyrrolidine, 3-ethylpyrrolidine, 3-isopropylpyrrolidine, 3,3-dimethylpyrrolidine, 2-methylmorpholine, 3-methylmorpholine, and the like. Pyrrolidine is the preferred amine for use in the above reaction.

Advantageously, the 3-enamine is prepared by heating the 4(α or β),7α-dimethyl (and 2α,4[α or β],7α-trimethyl)-5(α or β)-androstane-3,17-diones (V) and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamines of 4(α or β),7α-dimethyl (and 2α,4[α or β], 7α-trimethyl)-5(α and β)-androstane-3,17-diones (V) so obtained are then reacted with an alkali metal derivative, for example, the sodium or potassium derivative of the appropriate alkyne. The reaction is carried out preferably in the presence of an anhydrous inert solvent such as dimethylformamide, dimethylsulfoxide, benzene and the like. The 3-enamines of the 4(α or β),7α-dimethyl (and 4[α or β],7α-trimethyl)-17α-alkynyl-17β-hydroxy-5(α or β)-androstan-3-ones (VI) so obtained are not generally isolated from the reaction mixture but are hydrolyzed in situ to the free 4(α or β),7α-dimethyl (and 2α, 4[α or β],7α-dimethyl)-17α-alkynyl-17β-hydroxy-5(α and β)-androstan-3-ones (VI) by treatment with an aqueous solution of a base such as sodium hydroxide, potassium hydroxide, and the like, after first decomposing the reaction mixture with water, ammonium chloride, and the like.

The 4(α or β),7α-dimethyl (and 2α,4[α or β],7α-trimethyl)-17α-alkynyl-17β-hydroxy-5(α and β)-androstan-3-ones (VI) so obtained can be purified, if desired, by procedures known in the art such as by chromatography, recrystallization, and the like.

The 4(α or β)7α-dimethyl(and 2α,4[α or β],7α-trimethyl)-17α-alkynyl-17β-hydroxy-5(α and β)-androstan-3-ones (VI) of the invention can also be prepared by reacting the 3-enamines of the 4(α or β),7α-dimethyl(and 2α, 4[α or β],7α-trimethyl-5(α and β)-androstane-3,17-diones (V), prepared as described above, with the appropriate alkynylmagnesium halide. The reaction is preferably carried out in the presence of a solvent such as dimethyl ether, tetrahydrofuran, and the like. Preferably, the Grignard reagent is employed in an excess of the order of 10 moles per mole of the 3-enamine. The 3-enamines of 4(α or β), 7α-dimethyl(and 2α,4[α or β],7α-trimethyl)-17α-alkynyl-17β-hydroxy-5(α and β)-androstan-3-ones (VI) so obtained are generally not isolated from the reaction mixture but are hydrolyzed in situ to the free 4(α or β),7α-dimethyl(and 2α,4[α or β],7α-trimethyl)-17α-alkynyl-17β-hydroxy-5(α and β)-androstan-3-ones (VI) by the method described above.

In converting the 4(α or β),7α-dimethyl(and 2α,4[α or β], 7α-trimethyl-3,17-diketo-5(α and β)-androstanes (V) to their corresponding 17α-alkynyl and haloalkynyl derivatives (VI), 3-keto protecting groups in addition to the 3-enamines described above, such as 3-ketals and 3-enol ethers, can be employed. Treatment of a 3-ketal or 3-enol ether of a compound of Formula V with an alkali metal derivative, e.g., an appropriate alkyne or haloalkyne, yields the corresponding 17α-alkynyl derivative, which on hydrolysis gives the corresponding 3-ketone of Formula V. Methods for the preparation of 3-ketals and 3-enol ethers of a variety of 3-keto compounds of the androstane series, and their subsequent alkynylation or haloalkynylation, is described in detail in J. Chem. Soc. 4995 (1962).

The 3-ketones of Formula VI can be reduced to yield their corresponding 3(α and β)-alcohols in the manner described above for converting the compounds of Formula II′ to those of Formulae II′α and II′β.

Oxidation of a compound represented by Formula IV, e.g., 4(α or β),7α-dimethyl-19-nor-17β-hydroxy-5(α or β)-androstane (IV) with oxidizing agents such as chromic acid, sodium dichromate, potassium dichromate, etc., employing known procedures, yields the corresponding 17-ketone (V), e.g., 4(α or β),7α-dimethyl-19-nor-5(α or β)-androstan-17-one (V).

Since the compounds of Formula V wherein Y=>CH₂ lack an oxygen function at the 3-position, no protective group is required to prevent their reaction, and they can be directly converted to the corresponding 17α-alkynyl compounds (VI) by treatment with the lithium, sodium or potassium derivative of the appropriate alkyne; e.g., sodium acetylide on reaction with 4(α or β)-,7α-dimethyl-19-nor-5(α or β)androstan-17-one (V) yields 4(α or β), 7α-dimethyl-19-nor-17β-hydroxy-17α-ethynyl-5(α or β)-androstane (VI).

The alkynyl compounds of Formula VI can be readily reduced at the 17-alkynyl bond exclusively (e.g., with hydrogen in the presence of a palladium catalyst) to give the corresponding saturated compound (VI). For example, by employing the foregoing procedure, 4(α or β),7α-dimethyl-19-nor-17β-hydroxy-17α-ethynyl-5(α or β)-androstane (VII) and 4(α or β),7α-dimethyl-19-nor-17β-hydroxy-17α-ethynyl-5(α or β)-androstan-3-one (VII) are converted to 4(α or β),7α-dimethyl-19-nor-17β-hydroxy-17α-ethyl-5(α or β)-androstane (VII) and 4(α or β),7α-dimethyl-19-nor-17β-hydroxy-17α-ethyl-5(α or β)-androstan-3-one (VII), respectively.

The 17-ketones represented by Formula V can be converted to the corresponding 17β-hydroxy-17α-alkyl derivatives (VIII) by treatment with an appropriate alkylating agent such as an appropriate Grignard reagent or alkyl lithium compound. For example, 4(α or β),7α-dimethyl-19-nor-5(α or β)-androstan-17-one (V) when heated under reflux in an inert solvent (e.g., benzene-tetrahydrofuran) with methylmagnesium bromide yields 4(α or β), 7α,17α-trimethyl-19-nor-17β-hydroxy-5(α or β)androstane (VIII). Before converting the compounds of Formula V (Y=>C=O) to the 17α-alkyl compounds (VIII) by the above procedure, it is necessary to first attach a protecting group at the 3-positon, e.g., an enamine; this can be carried out in the manner described hereinbefore for preparing the 17α-alkynyl compounds (VI) from the corresponding 17-ketones (V). The 17α-alkylated-3-enamine produced by the reaction of an appropriate alkylating agent (e.g., a Grignard reagent or alkyl lithium) with a 3-enamine of a compound of Formula V is generally not isolated from the reaction mixture, but is hydrolyzed in situ to the corresponding 4(α or β),7α-dimethyl(or 2α,4[α or β],7α-trimethyl)-17α-alkyl derivative (VIII) by treatment with an aqueous solution of a base such as sodium hydroxide, potassium hydroxide, etc., after first decomposing the reaction mixture with water, ammonium chloride, and the like. By following the foregoing procedure, 2α,4(α or β),7α-trimethyl-5(α or β)-androstane-3,17-dione 3-pyrrolidinyl enamine (V) is converted to 2α,4(α or β),7α,17α-tetramethyl-17β-hydroxy-5(α or β)-androstan-3-one (VIII).

Both the 4-androstene and 5(α or β)-androstane compounds embraced by Formulae II through VIII of the present invention have anabolic and androgenic activity of improved therapeutic ratio. They also possess anti-fertility, anti-androgenic and anti-estrogenic activities. They also have the ability to reduce the level of cholesterol in the blood and favorably alter the α:β lipoprotein ratio and consequently are of therapeutic value in the treatment or prevention of atherosclerosis. Other useful properties include replication of egg-laying in pullets, hair growth in male baldness, pelt size in female mink, and blood clot lysis time in mammals. The foregoing properties make the new compounds useful in medical and veterinary practice.

The compounds of the invention can be prepared and administered to mammals, birds, humans, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

*Example 1.—2α,7α-dimethyl-17β-hydroxy-4androsten-3-one (2α,7α-dimethyltestosterone) (I)*

A solution of 9.96 g. (0.331 mole) of 7α-methyl-17β-hydroxy-4-androsten-3-one (7α-methyltestosterone) (prepared in the manner disclosed in J. Amer. Chem. Soc. 81, 4069) in 150 ml. of t-butyl alcohol was treated with stirring at about 60° C. with 10 ml. of ethyl oxalate followed by 13 ml. of 25 percent sodium methoxide solution. Heating was stopped and stirring continued for about 20 minutes, while the temperature of the reaction mixture was allowed to decline without external cooling. After the addition of about 120 ml. of anhydrous ether and a further period of about 20 minutes of stirring, the yellow glyoxalate was collected by filtration, washed with ether and dried at about 70° C. in vacuo. The crude glyoxalate weighing 9.17 g. was mixed with 30 g. of potassium carbonate, 30 ml. of methyl iodide and 250 ml. of acetone; the mixture was stirred while heating under gentle reflux for a period of about 24 hours. The reflux condenser was removed and the reaction flask arranged for distillation. After between about 75 and 100 ml. had distilled, the reaction mixture was filtered and the filtrate evaporated to dryness to give 10 g. of solid. This material was dissolved in 125 ml. of methanol, purged with nitrogen and treated with 10 ml. of similarly purged 25 percent sodium methoxide solution. After about 2 hours at room temperature, 250 ml. of saturated salt solution was added, the mixture extracted with methylene chloride, dried and evaporated to an amber gum. This crude product was purified by chromatography on 350 g. of Florisil (synthetic magnesium silicate). Thirty-five fractions of 550 ml. volume were collected using a gradient from 100 percent Skellysolve B (hexane hydrocarbons) to 10 percent acetone-90 percent Skellysolve B. Fractions 18 to 28 contained 2.68 g. of crystals which after two recrystallizations from a mixture of acetone and Skellysolve B gave pure 2α,7α-dimethyl-17β-hydroxy-4-androsten-3-one (I), melting at 170 to 180° C.;

$\lambda_{max.}^{alc.}$ 214 m$\mu$; $\epsilon$=15,560; $\nu_{max.}^{Nujol}$ 4350, 1655, 1622, 1225 and 1075 cm.$^{-1}$ Analysis.—Calcd. for $C_{21}H_{32}O_2$: C, 79.70; H, 10.19. Found: C, 79.59; H, 10.49.

Following the procedure of Example 1, but substituting for the starting steroid 7α - methyl - 17β-hydroxy-4-androsten-3-one, the following representative starting materials:

7α-methyl-19-nor-17β-hydroxy-4-androsten-3-one and
7α-methyl-19-nor-17β-hydroxy-4-androsten-3-one 17-acetate, yields, 2α,7α - dimethyl - 19-nor-17β-hydroxy-4-androsten-3-one (I).

The thus produced 2α,7α - dimethyl - Δ$^4$-3-keto compounds (I) of the preceding paragraph, can be converted to their Δ$^4$-3(α and β)-hydroxy counterparts by employing reduction procedures well known in the steroid art, e.g., by reacting them with sodium borohydride in isopropanol in the manner disclosed in Tetrahedron 15, 193, or with lithium aluminum hydride in accordance with the methods shown in J. Biol. Chem. 175, 217; Helv. Chim. Acta 31, 1822 and 1885; ibid. 32, 265.

Example 2.—2α,7α,17α - trimethyl - 17β - hydroxy - 4-androsten-3-one (2α,7α,17α-trimethyltestosterone) (I)

To a solution of 50 g. of 7α,17α-dimethyl-17β-hydroxy-4 - androsten-3-one (7α,17α-dimethyltestosterone) (prepared as in J. Amer. Chem. Soc., 81, 4069) in 750 ml. of t-butyl alcohol, warmed to 55° C. in a nitrogen atmosphere, 50 ml. of ethyl oxalate and 65 ml. of 25 percent sodium methoxide solution was added with stirring. Stirring was continued for about 20 minutes after which 750 ml. of ether was added. The mixture was filtered and the solid of yellow glyoxalate dried in a vacuum oven to give 46 g. of crude material. A mixture of the crude glyoxalate, 150 g. of potassium carbonate, 150 ml. of methyl iodide and 1250 ml. of acetone was stirred and heated under reflux for about 24 hours. Approximately 500 ml. of liquid was distilled off and the remaining mixture filtered. The filter cake was washed with acetone and the combined mixture filtered. The cake was washed with additional acetone and the combined filtrate evaporated at reduced pressure to an amber gum which was dissolved in 625 ml. of methanol purged with nitrogen and treated with 50 ml. of 25 percent sodium methoxide solution. After about 2 hours, 1400 ml. of saturated sodium chloride solution was added, and the mixture extracted with methylene chloride. The extract was dried and the solvent evaporated. The crude gummy product was purified via chromatography on a 2.5 kg. column of Florisil. A mixture composed of 6 percent of acetone and the remainder Skellysolve B eluted 13.34 g. of crystals, which on recrystallization from acetone-Skellysolve B yielded 11.53 g. of the desired product (I) melting at 158 to 159° C. A portion of this material was recrystallized from the same solvent pair to provide an analytical sample of pure 2α,7α,17α - trimethyl-17β-hydroxy-4-androsten-3-one (II) melting at 158 to 159° C.;

$\lambda_{max.}^{alc.}$ 242 m$\mu$; $\epsilon$=15,500; $\nu^{Nujol}$ 3435, 1665, 1622, 1220, 1166, 1075 cm.$^{-1}$ (index I–10,881).

Depression of the melting point of the product (I) occurred on mixture with the starting material (I).

Analysis.—Calcd. for $C_{22}H_{34}O_2$: C, 79.95; H, 10.37. Found: C, 79.60; H, 10.48.

Following the procedure of Example 2, but substituting for the starting steroid 7α,17α-dimethyl-17β-hydroxy-4-androsten-3-one, the following representative starting materials:

(1) 7α,17α - dimethyl-19-nor-17β-hydroxy-4-androsten-3-one and
(2) 7α,17α - dimethyl-19-nor-17β-hydroxy-4-androsten-3-one 17-acetate,
yields, respectively,
(1) 2α,7α,17α-trimethyl-19-nor-17β-hydroxy-4-androsten-3-one (I) and
(2) 2α,7α,17α-trimethyl-19-nor-17β-hydroxy-4-androsten-3-one 17-acetate (I).

The thus produced 2α,7α,17α-trimethyl-Δ$^4$-3-keto compounds (I) of the preceding paragraph, can be converted to their Δ$^4$-3(α and β)-hydroxy counterparts by employing reduction procedures well known in the steroid art, e.g., by reacting them with sodium borohydride in isopropanol in the manner disclosed in Tetrahedron 15, 193, or with lithium aluminum hydride in accordance with the methods shown in J. Biol. Chem. 175, 217; Helv. Chim. Acta, 31, 1822 and 1885; ibid., 32, 265.

Example 3.—7α,17α-dimethyl-17β-hydroxy-4-androsten-3-one 17-acetate (I)

A solution of 10 g. of 7α,17α-dimethyl-17β-hydroxy-4-androsten-3-one (I) in 20 ml. of acetic anhydride and 50 ml. of pyridine was refluxed under nitrogen for about 16 hours. The solvent was removed on a rotary evaporator leaving a brown crystalline residue. It was triturated with Skellysolve B, the crystals washed with Skellysolve B and methanol, and recrystallized from acetone-Skellysolve B to give 5 g. of product melting at 187 to 191° C. Part of the product was recrystallized from acetone-Skellysolve B to give an analytical sample of 7α,17α-dimethyl-17β-hydroxy-4-antrosten-3-one 17-acetate (I); melting point 190 to 192° C.;

$\lambda_{max.}^{alc.}$ 242 m$\mu$ ($\epsilon$=16,750); $[\alpha]_D$+90° (chloroform)

Analysis.—Calcd. for $C_{23}H_{34}O_3$: C, 77.05; H, 9.56. Found: C, 76.85; H, 9.68.

Following the procedure of Example 3 but substituting 2α - 7α - dimethyl-17β-hydroxy-4-androsten-3-one (I) and 2α - 7α,17α-trimethyl-17β-hydroxy-4-androsten-3-one (I) as starting materials, yields the corresponding 17-acetates (I).

Example 4.—2α,7α-dimethyl-17β-hydroxy-4-androsten-3-one 17-acetate (2α,7α-dimethyltestosterone 17-acetate) (I)

(a) A solution of 1 g. of 2α,7α-dimethyl-17β-hydroxy-4-androsten-3-one (I), dissolved in 6 ml. of dried and redistilled pyridine, is treated with 6 ml. of acetic anhydride. After standing at room temperature for about 17 hours, the reaction mixture is poured into ice water. The mixture is filtered after about two hours of standing and the precipitate washed in water and dried in vacuo. Upon recrystallization from a mixture of acetone and hexane, pure 2α,7α-dimethyl-17β-hydroxy-4-androsten-3-one 17-acetate (I) is obtained.

2α,7α,17α-trimethyl-17β-hydroxy-4-androsten-3-one 17-benzoate (2α,7α,17α-trimethyltestosterone 17-benzoate) (I)

(b) A suspension of 0.3 g. of 2α,7α,17α-trimethyl-17β-hydroxy-4-androsten-3-one (I) in 12 ml. of benzene is treated with 0.3 ml. of distilled benzoyl chloride and 0.3 ml. of dry pyridine. The mixture is stirred for about 17 hours at 50° C. After refrigeration the product is collected on a filter, washed with benzene and ether, and dried. Chromatography over Florisil and recrystallization from ethyl acetate gives pure 2α,7α,17α-trimethyl-17β-hydroxy-4-androsten-3-one 17-benzoate (I).

In the same manner as given in Example 4(a and b), the 17β-cyclopentylpropionate, formate, butyrate, isobutyrate, valerate, isovalerate, hexanoate, octanoate, phenylacetate and other like 17-esters of 2α,7α-dimethyl and 2α,7α,17α-trimethyltestosterone (I) are prepared by the reaction of their corresponding 17β-alcohols with the appropriate acid anhydride or halide.

Similarly, following the procedures of Example 4(a and b) and the paragraph directly above, the following representative 17β-hydroxy compounds are converted to a desired 17-ester named therein:

(1) 2α,7α-dimethyl-19-nor-17β-hydroxy-17α-ethynyl-4-androsten-3-one (I),
(2) 2α,7α-dimethyl-17β-hydroxy-4-androstene (I),
(3) 2α,7α-dimethyl-17β-hydroxy-17α-vinyl-4-androstene (I),
(4) 2α,7α,17α-trimethyl-19-nor-17β-hydroxy-17α-ethyl-4-androstene (I),
(5) 2α,7α,17α-trimethyl-19-nor-17β-hydroxy-4-androsten-3-one (I) and
(6) 2α,7α,17α-trimethyl-17β-hydroxy-4-androstene (I).

*Example 5.—7α-methyl-19-nor-3β,17β-dihydroxy-4-androstene (I)*

To a stirred mixture of 2.5 g. of lithium aluminum tri-t-butoxyhydride in 200 ml. of absolute ether, 1 g. of 7α-methyl-19-nor-17β-hydroxy-4-androsten-3-one (7α-methyl-19-nortestosterone) (I) (prepared as in Belgian Patent 610,385) was added and the mixture stirred for about 16 hours at room temperature. The excess lithium aluminum tri-t-butoxyhydride was destroyed by slow addition of a mixture of 5 percent acetic acid and 95 percent water. The ether layer was separated, washed successively with dilute hydrochloric acid, water, dilute sodium hydroxide, additional water and dried. The solvent was removed and the oily residue chromatographed through Florisil. The more polar fractions recovered from the eluates were combined and recrystallized from a mixture of acetone and Skellysolve B to give 250 mg. of 7α-methyl-19-nor-3β,17β-dihydroxy-4-androstene (I) melting at 136 to 139.5° C. (with bubbling). The compound is probably solvated with Skellysolve B.

*Analysis.*—Calcd. for C₁₉H₃₀O₂ (290.43): C, 78.57; H, 10.41. Found: C, 79.21; H, 10.67; C, 79.22; H, 11.06.

*Example 6.—2α,7α-dimethyl-19-nor-3β,17β-dihydroxy-4-androstene (I)*

Following the procedure of Example 5 but substituting 2α,7α-dimethyl-19-nor-17β-hydroxy-4-androsten-3-one (I) as starting steroid, yields 2α,7α-dimethyl-19-nor-3β,17β-dihydroxy-4-androstene (I).

*Example 7.—7α,17α-dimethyl-3β,17β-dihydroxy-4-androstene (I)*

To a stirred mixture 2 g. of lithium aluminum tri-t-butoxyhydride in 20 ml. of tetrahydrofuran, 1 g. of 7α,17α-dimethyl-17β-hydroxy-4-androsten-3-one (2α,7α-dimethyl-19-nortestosterone) (I) was added and the mixture stirred at room temperature for about 16 hours. On addition of a mixture of 5 percent acetic acid and 95 percent water the crude product precipitated. It was recrystallized twice from acetone-Skellysolve B to yield 0.5 g. of pure 7α,17α-dimethyl-3β-17β-dihydroxy-4-androstane (II) having a melting point of 166 to 167° C.; [α]_D +20° (chloroform).

*Analysis.*—Calcd. for C₂₁H₃₄O₂: C, 79.19; H, 10.76. Found: C, 79.07; H, 10.67.

*Example 8.—2α,7α,17α-trimethyl-3β,17β-dihydroxy-4-androstene (I)*

Following the procedure of Example 7 but substituting 2α,7α,17α-trimethyl-17β-hydroxy-4-androsten-3-one (I) as starting material, yields 2α,7α,17α-trimethyl-3β,17β-dihydroxy-4-androstene (I).

*Example 9.—7α,17α-dimethyl-19-nor-3β,17β-dihydroxy-4-androstene (7α,17α-dimethylestr-4-ene-3β,17β-diol) (I)*

To a solution of 2 g. of 7α,17α-dimethyl-19-nor-17β-hydroxy-4-androsten-3-one (I) (prepared as in Belgian Patent 610,385) in 25 ml. of purified tetrahydrofuran cooled in an ice-salt bath, 4 g. of lithium aluminum tri-t-butoxy hydride was added. The nearly clear solution was stored at −15° C. for about 15 hours; then the excess hydride destroyed and the inorganic salts coagulated by the addition of dilute acetic acid. The organic phase was decanted, dried over magnesium sulfate, filtered and concentrated to dryness. The residue, an oil, became partly crystalline on drying under vacuum at room temperature. It was triturated with Skellysolve B-ether and recrystallized, first from Skellysolve B and then from acetone-water to give 1.05 g. of well-formed crystals. The crystals of 7α,17α-dimethyl-19-nor-3β,17β-dihydroxy-4-androstene (I) on drying at 60° C. still maintained their shape but appeared to be amorphous and softened at 85° C.; [α]_D −4° (chloroform). Infrared and nuclear magnetic resonance spectra were consistent with the structure assigned.

Following the procedure of Example 9 but substituting 2α,7α,17α-trimethyl-19-nor-17β-hydroxy-4-androsten-3-one (I) as starting material, yields 2α,7α,17α-trimethyl-19-nor-3β,17β-dihydroxy-4-androstene (I).

*Example 10.—4,7α-dimethyl-17β-hydroxy-4-androsten-3-one 17-acetate (4,7α-dimethyltestosterone 17-acetate) (II)*

To a flask containing a mixture of 4.4 ml. of thiophenol, 2.6 ml. of 38 percent aqueous formaldehyde, 2.6 ml. of trimethylamine and 9 ml. of ethanol, 5 g. of 7α-methyl-17β-hydroxy-4-androsten-3-one (7α-methyltestosterone) (I) was added the mixture refluxed for 6 days. The reaction mixture was cooled, poured into 200 ml. of 5 percent aqueous potassium hydroxide and the steroid extracted with methylene chloride. The extract was washed with water, dried over anhydrous sodium sulfate and concentrated to dryness by vacuum distillation over a steam bath to give a light brown amorphous mass. This material (7α-methyl-17β-hydroxy-4-androsten-3-one-4-methylthiophenol) (I'), was dissolved in 50 ml. of pyridine and acetylated with 20 ml. of acetic anhydride by warming to about 60° C. and allowing the mixture to stand for about 16 hours. The mixture was poured into ice and water and allowed to stand for about 40 minutes to hydrolyze the excess acetic anhydride. The product (the 17-acetate of 7α-methyl-17β-hydroxy-4-androsten-3-one 4-methylthiophenol) (I'') was extracted with methylene chloride, the extract washed successively with cold dilute hydrochloric acid to remove the pyridine, with aqueous sodium bicarbonate, finally water and dried over anhydrous sodium sulfate. The dried extract was concentrated to a light brown glass and then dissolved in about 60 ml. of acetone. Approximately 50 ml. of Raney nickel sludge was washed by decantation three times with 200 ml. portions of acetone. The sludge was then suspended in 200 ml. of acetone and refluxed with efficient stirring for about 60 minutes in a nitrogen atmosphere. The 17-acetate of the 4-methylthiophenol steroid (I'') in acetone solution was added to the acetone suspension of Raney nickel and the mixture stirred and refluxed for about 4 hours. The Raney nickel was filtered from the acetone solution through a half-inch bed of Celite (diatomaceous earth). The flask was rinsed and the residue washed with 100 ml. of hot ethyl alcohol. The residue was finally washed with 50 ml. of deionized water and discarded. The filtrate was concentrated to dryness by vacuum distillation to give a colorless glass. The total crude product (II) was dissolved in 75 ml. of methylene chloride and chromatographed over a 280 g. column of Florisil. The column was developed with 100 ml. portions of acetone in Skellysolve B. A peak of seven fractions eluted with 5 percent acetone in Skellysolve B gave 2.83 g. of material with an ultraviolet absorption spectrum with $\lambda$ maximum at 249 m$\mu$ to 250 m$\mu$. Five subsequent fractions eluted with 7.5 percent acetone in Skellysolve B gave about 800 mg. of material showing maximum absorption at 246 to 248 m$\mu$. [The starting material (I) has $\lambda$ max. 240 m$\mu$.] The major portion (2.83 g.) was an amorphous glass that could only be crystallized from Skellysolve B to give 1 g. of the desired product, 4,7$\alpha$ - dimethyl - 17$\beta$ - hydroxy - 4 - androsten - 3 - one 17-acetate (II), with a melting point of 148 to 153° C., $\lambda$ max. 250, $\epsilon$=15,450. Infrared and nuclear magnetic resonance spectra supported the proposed structure of the product.

*Analysis.*—Calcd. for $C_{23}H_{34}O_3$: C, 77.09; H, 9.56. Found: C, 76.53; H, 9.61.

The remaining material eluted from the column could not be crystallized; it had $\lambda$ max. 249.5, $\epsilon$=15,450.

Following the procedure of Example 10, but substituting the other compounds embraced by Formula I of the flow-sheet on page 2, above, as starting materials, yields the corresponding compounds of Formula II thereof. Thus, replacing 7$\alpha$ - methyl - 17$\beta$ - hydroxy - 4 - androsten - 3-one (I) by:

(1) 7$\alpha$-methyl-19-nor-17$\beta$-hydroxy-4-androsten-3-one,
(2) 2$\alpha$,7$\alpha$-dimethyl-17$\beta$-hydroxy-4-androsten-3-one (I),
(3) 2$\alpha$,7$\alpha$-dimethyl-19-nor-17$\beta$-hydroxy-4-androsten-3-one (I),
(4) 7$\alpha$,17$\alpha$-dimethyl-17$\beta$-hydroxy-4-androsten-3-one,
(5) 7$\alpha$,17$\alpha$-dimethyl-19-nor-17$\beta$-hydroxy-4-androsten-3-one,
(6) 2$\alpha$,7$\alpha$,17$\alpha$-trimethyl-17$\beta$-hydroxy-4-androsten-3-one (I),
(7) 2$\alpha$,7$\alpha$,17$\alpha$-trimethyl-19-nor-17$\beta$-hydroxy-4-androsten-3-one (I), yields, respectively, (1) 4,7$\alpha$-dimethyl-19-nor-17$\beta$-hydroxy-4-androsten-3-one 17-acetate (II),
(2) 2$\alpha$,4,7$\alpha$-trimethyl-17$\beta$-hydroxy-4-androsten-3-one 17-acetate (II),
(3) 2$\alpha$,4,7$\alpha$-trimethyl-19-nor-17$\beta$-hydroxy-4-androsten-3-one 17-acetate (II),
(4) 4,7$\alpha$,17$\alpha$-trimethyl-17$\beta$-hydroxy-4-androsten-3-one 17-acetate (II),
(5) 4,7$\alpha$,17$\alpha$-trimethyl-19-nor-17$\beta$-hydroxy-4-androsten-3-one 17-acetate (II),
(6) 2$\alpha$,4,7$\alpha$,17$\alpha$-tetramethyl-17$\beta$-hydroxy-4-androsten-3-one 17-acetate (II) and
(7) 2$\alpha$,4,7$\alpha$,17$\alpha$-tetramethyl-19-nor-17$\beta$-hydroxy-4-androsten-3-one 17-acetate (II).

*Example 11.—4,7$\alpha$ - dimethyl - 17$\beta$ - hydroxy - 4 - androsten-3-one (4,7$\alpha$-dimethyltestosterone) (II)*

To 600 mg. of 4,7$\alpha$ - dimethyl - 17$\beta$ - hydroxy - 4 - androsten-3-one 17-acetate (II) dissolved in 50 ml. of 95 percent ethanol, 100 mg. of potassium hydroxide was added. The mixture was swirled until the base dissolved and allowed to stand at room temperature for about 15 hours. The mixture was then made barely acidic with dilute acetic acid and the major portion of the ethanol removed by vacuum distillation. The product crystallized from the mixture and was collected by filtration, washed with deionized water and dried under vacuum at 40° C. to give 460 mg. of white needles of 4,7$\alpha$ - dimethyl - 17$\beta$-hydroxy-4-androsten-3-one (II) having a melting point of 201 to 205° C.; $\lambda$ max. 251 m$\mu$ ($\epsilon$=15,450/$C_2H_5OH$). The infrared absorption spectra of the compound supports its proposed structure.

*Analysis.*—Calcd. for $C_{21}H_{32}O_2$: C, 79.69; H, 10.19. Found: C, 79.48; H, 10.12.

Following the procedure of Example 11, but substituting for 4,7$\alpha$-dimethyl-17$\beta$-hydroxy-4-androsten-3-one 17-acetate (II), the following representative starting materials:

(1) 4,7$\alpha$-dimethyl-19-nor-17$\beta$-hydroxy-4-androsten-3-one-17-acetate (II),
(2) 2$\alpha$,4,7$\alpha$-trimethyl-17$\beta$-hydroxy-4-androsten-3-one 17-acetate (II),
(3) 2$\alpha$,4,7$\alpha$-trimethyl-19-nor-17$\beta$-hydroxy-4-androsten-3-one 17-acetate (II),
(4) 4,7$\alpha$,17$\alpha$-trimethyl-17$\beta$-hydroxy-4-androsten-3-one 17-acetate (II),
(5) 4,7$\alpha$,17$\alpha$-trimethyl-17$\beta$-hydroxy-19-nor-17$\beta$-hydroxy-4-androsten-3-one 17-acetate (II)
(6) 2$\alpha$,4,7$\alpha$,17$\alpha$-tetramethyl-17$\beta$-hydroxy-4-androsten-3-one 17-acetate (II),
(7) 2$\alpha$,4,7$\alpha$,17$\alpha$-tetramethyl-19-nor-17$\beta$-hydroxy-4-androsten-3-one 17-acetate (II),
(8) 4,7$\alpha$-dimethyl-3$\beta$,17$\beta$-dihydroxy-4-androstene 3,17-diacetate (II),
(9) 4,7$\alpha$-dimethyl-19-nor-3$\beta$,17$\beta$-dihydroxy-4-androsten 3,17-diacetate (II),
(10) 2$\alpha$,4,7$\alpha$-trimethyl-3$\beta$,17$\beta$-dihydroxy-4-androstene 3,17-diacetate (II),
(11) 2$\alpha$,4,7$\alpha$-trimethyl-19-nor-3$\beta$,17$\beta$-dihydroxy,4-androstene 3,17-diacetate (II),
(12) 4,7$\alpha$,17$\alpha$-trimethyl-3$\beta$,17$\beta$-dihydroxy-4-androstene 3,17-diacetate (II),
(13) 4,7$\alpha$,17$\alpha$-trimethyl-19-nor-3$\beta$,17$\beta$-dihydroxy-4-androstene 3,17-diacetate (II),
(14) 2$\alpha$,4,7$\alpha$,17$\alpha$-tetramethyl-3$\beta$,17$\beta$-dihydroxy-4-androstene 3,17-diacetate (II) and
(15) 2$\alpha$,4,7$\alpha$,17$\alpha$-tetramethyl-19-nor-3$\beta$,17$\beta$-dihydroxy-4-androstene 3,17-diacetate (II), yields, respectively, (1) 4,7$\alpha$-dimethyl-19-nor-17$\beta$-hydroxy-4-androsten-3-one (II),
(2) 2$\alpha$,4,7$\alpha$-trimethyl-17$\beta$-hydroxy-4-androsten-3-one (II),
(3) 2$\alpha$,4,7$\alpha$-trimethyl-19-nor-17$\beta$-hydroxy-4-androsten-3-one (II),
(4) 4,7$\alpha$,17$\alpha$-trimethyl-17$\beta$-hydroxy-4-androsten-3-one (II),
(5) 4,7$\alpha$,17$\alpha$-trimethyl-17$\beta$-hydroxy-19-nor-17$\beta$-hydroxy-4-androsten-3-one (II),
(6) 2$\alpha$,4,7$\alpha$,17$\alpha$-tetramethyl-17$\beta$-hydroxy-4-androsten-3-one (II),
(7) 2$\alpha$,4,7$\alpha$,17$\alpha$-tetramethyl-19-nor-17$\beta$-hydroxy-4-androsten-3-one (II),
(8) 4,7$\alpha$-dimethyl-3$\beta$,17$\beta$-dihydroxy,4-androstene (II),
(9) 4,7$\alpha$-dimethyl-19-nor-3$\beta$,17$\beta$-dihydroxy-4-androstene (II),
(10) 2$\alpha$,4,7$\alpha$-trimethyl-3$\beta$,17$\beta$-dihydroxy-4-androstene (II),
(11) 2$\alpha$,4,7$\alpha$-trimethyl-19-nor-3$\beta$,17$\beta$-dihydroxy-4-androstene (II),
(12) 4,7$\alpha$,17$\alpha$-trimethyl-3$\beta$,17$\beta$-dihydroxy-4-androstene (II),
(13) 4,7$\alpha$,17$\alpha$-trimethyl-19-nor-3$\beta$,17$\beta$-dihydroxy-4-androstene (II),
(14) 2$\alpha$,4,7$\alpha$,17$\alpha$-tetramethyl-3$\beta$,17$\beta$-dihydroxy-4-androstene (II) and
(15) 2$\alpha$,4,7$\alpha$,17$\alpha$-tetramethyl-19-nor-3$\beta$,17$\beta$-dihydroxy-4-androstene (II).

*Example 12.—4,7α-dimethyl-4-androstene-3,17-dione (V)*

To a solution of 3 g. of 4,7α-dimethyl-17β-hydroxy-4-androsten-3-one (II) in 40 ml. of acetone cooled in an ice bath, 3 ml. of 8 N chromium trioxide reagent (Jones reagent) is added dropwise with stirring. After about 10 minutes the mixture is diluted to a volume of about 150 ml. with water. The precipitate that forms is collected on a filter washed with water and dried to give the crude product (V). Recrystallization from acetone-Skellysolve B gives pure 4,7α-dimethyl-4-androstene-3,17-dione (V).

Following the procedure of Example 12, but substituting for 4,7α-dimethyl-17β-hydroxy-4-androsten-3-one (II), the following representative starting materials:

(1) 4,7α-dimethyl-19-nor-17β-hydroxy-4-androsten-3-one (II),
(2) 2α,4,7α-trimethyl-17β-hydroxy-4-androsten-3-one (II),
(3) 2α,4,7α-trimethyl-19-nor-17β-hydroxy-4-androsten-3-one (II), yields, respectively, (1) 4,7α-dimethyl-19-nor-4-androstene-3,17-dione (V),
(2) 2α,4,7α-trimethyl-4-androstene-3,17-dione (V),
(3) 2α,4,7α-trimethyl-19-nor-4-androstene-3,17-dione (V),

*Example 13.—4,7α - dimethyl - 19-nor-3β,17β-dihydroxy-17α-ethynyl-4-androstene (4,7α-dimethyl-17α-ethynyl-4-estrene-3β,17β-diol) (VI)*

(a) *4,7-dimethyl-19-nor-4-androstene-3,17-dione 3-pyrrolidinyl enamine.*—To a solution of 100 mg. of 4,7α-dimethyl-19-nor-4-androstene-3,17-dione (V) in 1 ml. of boiling methanol, 0.2 ml. of pyrrolidine is added. The resulting solution is heated briefly under nitrogen, concentrated and allowed to cool. The crystalline solid which separates is isolated by filtration, washed with a small volume of methanol and dried. There is thus obtained 4,7α - dimethyl-19-nor-4-androstene-3,17-dione 3-pyrrolidinyl enamine in the form of a crystalline solid.

(b) *4,7α-dimethyl - 19-nor-17β-hydroxy-17α-ethynyl-4-androsten-3-one (VI).*—A volume of 1 ml. of a 20 percent by weight suspension of sodium acetylide in xylene centrifuged and the solid that separates is taken up in 6 ml. of redistilled dimethyl sulfoxide. To the resulting mixture is added the 3-pyrrolidinyl enamine from 0.5 g. of 4,7α-dimethyl-19-nor-4-androstene-3,17-dione, prepared as described in (a), above. The mixture so obtained is maintained under an atmosphere of nitrogen for about 5 hours, after which time the excess sodium acetylide is destroyed by dropwise addition of water. About 2 ml. of water and 5 ml. of methanol is added to obtain a clear solution which is then heated on a steam bath for 1 hour. The mixture so obtained is extracted with ether and the etheral extract washed successively with dilute hydrochloric acid, dilute sodium carbonate, and water, then dried over anhydrous magnesium sulfate. The dried solution is filtered and the filtrate evaporated to dryness. The residue is triturated with a mixture of ether and Skellysolve B and recrystallized twice from a mixture of acetone and Skellysolve B. There is thus obtained pure 4,7α-dimethyl - 19-nor-17β-hydroxy - 17α-ethynyl-4-androsten-3-one (VI).

(c) *4,7α - dimethyl - 19-nor-3β,17β-dihydroxy - 17α-ethynyl-4-androstene (VI).*—A solution of 0.5 g. of 4,7α-dimethyl-19-nor-17β-hydroxy-17α - ethynyl - 4-androsten-3-one (VI), prepared as described in (b), above, in 5 ml. of tetrahydrofuran (purified by passage through a Woelm neutral alumina column) is cooled in an ice bath and a cooled solution of 1 g. of lithium aluminum tri-t-butoxyhydride in 5 ml. of tetrahydrofuran added. After standing at room temperature for about 18 hours, a mixture of 5 percent acetic acid and 95 percent water is added and the product extracted with ether. The extract is washed with water and dried over magnesium sulfate. The solvent is removed and the crude product chromatographed through Florisil. The oily fractions of the desired 3β-hydroxy compound are combined and crystallized twice from a two-phase mixture of water, Skellysolve B and ether, to yield pure 4,7α-dimethyl-19-nor-3β,17β-dihydroxy-17α-ethynyl-4-androsten (VI).

Following the procedure of Example 13 but substituting 2α,4,7α-trimethyl-19-nor-4-androstene-3,17-dione (V) and 2α,4,7α-trimethyl-4-androstene-3,17-dione (V) for the starting material employed therein, yields, respectively, (a) 2α,4,7α - trimethyl-19-nor-4-androstene-3,17-dione 3-pyrrolidinyl enamine and 2α,4,7α-trimethyl-4-androstene-3,17-dione 3-pyrrolidinyl enamine, (b) 2α,4,7α - trimethyl - 19 - nor - 17β - hydroxy - 17α-ethynyl-4-androsten-3-one (VI), 2α,7α - trimethyl - 17β-hydroxy-17α-ethynyl-4-androsten-3-one (VI), (c) 2α,4,7α - trimethyl-19-nor-3β,17β-dihydroxy-17α-ethynyl-4-androstene (VI) and 2α,4,7α-trimethyl-3β,17β-dihydroxy-17α-ethynyl-4-androstene (VI).

*Example 14.—4,7α - dimethyl - 19 - nor-3β,17β-dihydroxy 17α-ethynyl-4-androstene 17 - acetate (4,7α - dimethyl-17α-ethynyl-4-esterene-3β,17β-diol 17-acetate) (VI)*

(a) *4,7α - dimethyl - 19 - nor-17β-hydroxy-17α-ethyl-4-androstene-3-one 17-acetate (VI).*—A mixture of 1 g. of 4,7α - dimethyl-19-nor-17β-hydroxy-17α-ethynyl-4-androsten-3-one (VI), prepared as described in (b) of Example 13, 20 ml. of acetic anhydride and 1 ml. of pyridine is stirred and heated at about 140° C. for about 1 hour under a nitrogen atmosphere. The reaction mixture is then cooled to room temperature and stirred with 100 ml. of water for about 2 hours. The product which separates is isolated by filtration. This is a mixture of the desired 4,7α-dimethyl - 19 - nor - 17β - hydroxy-17α-ethinyl-4-androsten-3-one 17-acetate (VI) and the corresponding 3-enol 3,17-diacetate; the latter compound is hydrolyzed to the desired 3-one 17-monoacetate compound by heating the above product under reflux for ½ hour with 100 ml. of methanol containing 2 ml. of concentrated hydrochloric acid. The reaction product so obtained is diluted with water and extracted with ether. The ether extract is dried over anhydrous magnesium sulfate and evaporated to dryness. The residue is dissolved in methylene chloride and chromatographed on a column of magnesium silicate (Florisil). The column is eluted with Skellysolve B containing increasing proportions of acetone and the fraction of the eluate, which is shown by paper chromatogram analysis to contain the desired product, is evaporated to dryness. The solid so obtained is recrystallized from aqueous methanol. There is thus obtained 4,7α-dimethyl-19-nor-17β-hydroxy-17α-ethinyl-4-androsten - 3 - one 17 acetate (VI) in the form of a crystalline solid.

Similarly, by reacting 4,7α-dimethyl-19-nor-17β-hydroxy-17α-ethynyl-4-androsten-3-one (VI) with the appropriate hydrocarbon carboxylic acid anhydride, for example, at temperatures between about 80° C. and 150° C. using the above procedure there are produced other 17-acylates thereof such as the 17-propionate, 17-butyrate, 17-valerate, 17-hexanoate, 17-trimethylacetate, 17-isobutyrate, 17-isovalerate, 17-decanoate, 17-cyclohexanecarboxylate, 17-cyclopentylpropionate, 17-p-hexyloxypropionate, 17-benzoate, 17-hemisuccinate, 17-phenylacetate, 17-acrylate, 17-chrotonate, 17-undecylenate, 17-propiolate, 17-cinnamate, 17-maleate, and 17-citraconate.

(b) *4,7α - dimethyl - 19 - nor-3β,17β-dihydroxy-17α-ethynyl-4-androstene 17-acetate (VI).*—To a chilled solution of 2g. of 4,7α-dimethyl-19-nor-17β-hydroxy-17α-ethynyl-4-androsten-3-one 17-acetate-3-one (VI) [prepared as described in (a), immediately above] in 40 ml. of purified tetrahydrofuran, 4 g. of lithium aluminum-tri-t-butoxyhydride is added with stirring under nitrogen. The solution is stored in the refrigerator at —15° C. overnight and dilute acetic acid then added dropwise until the inorganic material is precipitated. The organic phase is decanted, dried over magnesium sulfate and concentrated to a solid foam. It is chromatographed through Florisil and recrystallized from a mixture of acetone and Skellysolve B to give pure 4,7α-dimethyl-19-nor-3β,17β-dihydroxy-17α-ethynyl-4-androstene 17-acetate (VI).

Following the procedure of Example 14(b), but substituting as starting material for the 17-acetate of 4,7α-dimethyl-19-nor-17β-hydroxy-17α-ethynyl - 4 - androsten-3-one (VI) employed therein, other corresponding 17-acylates such as the 17-propionate, 17-butyrate, 17-valerate, 17 - hexanoate, 17-trimethylacetate, 17-isobutyrate, 17-isovalerate, 17-decanoate, 17-cyclohexanecarboxylate, 17--cyclopentylpropionate, 17-p-hexyloxypropionate, 17-benzoate, 17-hemisuccinate, 17-phenylacetate, 17-acrylate, 17-crotonate, 17-undecylenate, 17-propiolate, 17-cinnamate, 17-maleate and 17-citraconate, yields the corresponding 4,7α - dimethyl - 19 - nor-3β,17β-dihydroxy-17α-ethynyl-4-androsten-17-acylate (VI).

*Example 15.—4,7α-dimethyl - 19 - nor-3β,17β-dihydroxy-17α-ethynyl-4-androstene-3-propionate (4,7α - dimethyl-17α-ethynyl-4-esterene-3β,17β-diol 3-propionate) (IV)*

A solution of 100 mg. of 4,7α-dimethyl-19-nor-3β,17β-dihydroxy-17α-ethynyl-4-androstene (VI) (prepared as described in Example 14) in 0.4 ml. of pridine and 0.35 ml. of propionic anhydride is kept at room temperature for a period of about 16 hours. Ice and water are added and the product extracted with ether and washed successively with water, dilute hydrochloric acid, water, dilute sodium hydroxide, water and then dried. The solvent is removed and the residue recrystallized from Skellysolve B to give 4,7α-dimethyl - 19 - nor-3β,17β-dihydroxy-17α-ethynyl-4-androstene 3-propionate (VI).

Similarly, by reacting 4,7α-dimethyl-19-nor-3β,17β-dihydroxy-17α-ethynyl-4-androstene (VI) with the appropriate hydrocarbon carboxylic acid anhydride using the above procedure, there are produced other 3-acylates thereof such as the 3-butyrate, 3-valerate, 3-hexanoate, 3-trimethylacetate, 3-isobutyrate, 3-isovalerate, 3-decanoate, 3-cyclohexanecarboxylate, 3-cyclopentylpropionate, 3-p-hexyloxypropionate, 3-benzoate, 3-hemisuccinate, 3-phenylacetate, 3-acrylate, 3-crotonate, 3-undecylanate, 3-propiolate, 3-cinnamate, 3-maleate and 3-citraconate.

Following the procedure of Example 15 and the paragraph directly above, but substituting as starting materials other 3(α and β)-hydroxy-17α-ethynyl steroids (VI) such as 2α,4,7α - trimethyl-19-nor-3β,17β-dihydroxy-17α-ethynyl-4-androstene (VI), 2α,4,7α-trimethyl-3β,17β-dihydroxy-17α-ethynyl-4-androstene (VI), 2α,4,7α-trimethyl-19-nor-3β,17β-dihydroxy-17α-chlorethynyl - 4 - androstene (VI), 2α,4,7α-trimethyl - 19 - nor-3α,17β-dihydroxy-17α-ethynyl-4-androstene (VI), 2α,4,7α-trimethyl-3α,17β-dihydroxy-17α-ethynyl-4-androstene (VI) and 2α,4,7α-trimethyl 3α,17β-dihydroxy-17α-chlorethyl - 4 - androstene (VI), yields the corresponding 3-acylates thereof.

*Example 16.—4,7α-dimethyl-19-nor - 3β,17β - dihydroxy-17α-ethynyl-4-androstene 3,17-diacetate (4,7α-dimethyl-4-esterene-3β,17β-diol 3,17-diacetate) (VI)*

A solution of 0.42 g. of 4,7α-dimethyl-19-nor-3β,17β-dihydroxy-17α-ethynyl-4-androsten 17-acetate (VI) (prepared as described in Example 14) and 0.4 ml. of acetic anhydride in 0.5 ml. of pyridine is kept at room temperature for a period of about 16 hours. Ice and water are added and the resulting precipitate collected, washed with water, dried and recrystallized from aqueous methanol to give pure 4,7α-dimethyl-19-nor-3β,17β-dihydroxy-17α-ethynyl-4-androstene 3,17-diacetate (VI).

Similarly, by reacting a 4,7α-dimethyl-19-nor-3β,17β-dihydroxy-17α-ethynyl-4-androsten 17-acylate (VI) with the appropriate hydrocarbon carboxylic acid anhydride corresponding to the 17-acylate and using the above procedure, there are produced other 3,17-diacylates thereof such as the 3,17-dibutyrate, 3,17-divalerate, 3,17-dihexanoate, 3,17-ditrimethylacetate, 3,17-diisobutyrate, 3,17-diisovalerate, 3,17-dicyclohexanecarboxylate, 3,17-dicyclopentylpropionate, 3,17-di-p-hexylpropionate, 3,17-dibenzoate, 3,17-dihemisuccinate, 3,17-diphenylacetate, 3,17-diacrylate, 3,17-dicrotonate, 3,17-diundecylanate, 3,17-dipropiolate, 3,17-dicinnamate, 3,17-dimaleate and 3,17-dicitraconate.

Following the procedure of Example 16 and the paragraph directly above but substituting as starting materials other 3 (α and β)-hydroxy-17-acylate steroids such as 2α,4,7α - trimethyl - 19 - nor - 3β,17β - dihydroxy - 17α-ethynyl - 4 - androstene 17 - acylate (VI), 2α, 4,7α - trimethyl - 3β,17β - dihydroxy - 17α - ethynyl - 4 - androstene 17-acylate (VI), 2α,4,7α-trimethyl-19-nor-3β,17β-dihydroxy - 17α - chlorethynyl - 4 - androstene 17 - acylate (VI), 2α,4,7α-trimethyl - 19 - nor - 3α,17β - dihydroxy - 17α - ethynyl - 4 - androstene 17 - acylate (VI), 2α,4,7α - trimethyl - 3α,17β - dihydroxy - 17α - ethynyl-4-androstene 17-acylate (VI) and 2α,4,7α-trimethyl-3α, 17β - dihydroxy - 17α - chlorethynyl - 4 - androstene 17-acylate (VI), yields the corresponding 3,17-diacylates thereof.

By reacting a 4,7α-dimethyl (or 2α,4,7α-trimethyl-19-nor) (or 19-methyl)-3(α or β),17β-dihydroxy-17α-ethynyl-4-androsten-17-acylate (VI) with an appropriate hydrocarbon caboxylic acid anhydride different from the progenitor of the 17-acylate of an aforesaid steroid of Formula VI, and using the above procedures, there are produced mixed 3,17-diacylates thereof such as the 3-acetate 17-butyrate, 3-propionate 17-acetate, 3-butyrate 17-propionate, 3-acetate 17-valerate, 3-valerate 17-hexanoate, 3-valerate 17-trimethylacetate, 3-propionate 17-cyclohexanecarboxylate, 3-acetate 17-cyclo-p-hexylpropionate, 3-benzoate 17-hemisuccinate, 3-hemisuccinate 17-phenylacetate, 3-acetate 17-acrylate, 3-crotonate 17-phenylacetate, 3-acrylate 17-undecylanate, 3-cinnamate 17-acetate, 3-propionate 17-citraconate, 3-cinnamate 17-propiolate, etc.

*Example 17.—4,7α - dimethyl -19 - nor - 17β - hydroxy-4 - androsten - 3 - one 3 - thioketal (4,7α - dimethyl-19-nortestosterone 3-thioketal) (III)*

To a solution of 2 g. of 4,7α-dimethyl-19-nor-17β-hydroxy-4-androsten-3-one (II) in 6 ml. of acetic acid cooled to about 10° C., 0.7 ml. of ethanedithiol and 0.7 ml. of borontrifluoride etherate is added. After standing at room temperature for about 20 minutes the reaction mixture is composed of crystalline material. It is diluted to a volume of about 25 ml. with water and ice. The crystals are collected, washed with water and dried to yield the product (III), which is recrystallized from a mixture of methanol and methylene chloride to give 4,7α-dimethyl - 19 - nor - 17β - hydroxy - 4 - androsten - 3 - one 3-thioketal (III).

Following the procedure of Example 17 but substituting the following compounds for the starting material employed therein:

(1) 4,7α-dimethyl-17β-hydroxy-4-androsten-3-one (II),
(2) 2α,4,7α-trimethyl-17β-hydroxy-4-androsten-3-one (II),
(3) 2α,4,7α,17α-tetramethyl-17β-hydroxy-4-androsten-3-one (II),
(4) 2α,4,7α-trimethyl-19-nor-17β-hydroxy-4-androsten-3-one (II) and
(5) 2α,4,7α,17α-tetramethyl-19-nor-17β-hydroxy-4-androsten-3-one (II), yields, respectively, (1) 4,7α-dimethyl-17β-hydroxy-4-androsten-3-one 3-thioketal (III),
(2) 2α,4,7α-trimethyl-17β-hydroxy-4-androsten-3-one 3-thioketal (II),
(3) 2α,4,7α,17α-tetramethyl-17β-hydroxy-4-androsten-3-one 3-thioketal (III),
(4) 2α,4,7α,trimethyl-19-nor-17β-hydroxy-4-androsten-3-one 3-thioketal (III) and (5) 2α,4,7α,17α-tetramethyl-19-nor-17β-hydroxy-4-androsten-3-one 3-thioketal (III).

Following the procedure of Example 17 and the paragraph directly above but substituting as starting materials for the 17β-hydroxy compounds disclosed therein, a corresponding 17-acylate thereof, e.g., a 17-acetate or one of those listed at the end of Example 14, or a corresponding 17-alkyl ether, yields the corresponding 3-thioketal counterpart of the aforesaid acylate or alkyl ether embraced by Formula III of the flow-sheet.

*Example 18.—4,7α-dimethyl-19-nor-17β-hydroxy-4-androstene (4,7α-dimethylestr-4-en-17β-ol) (IV)*

To a mixture of 1 g. of 4,7α-dimethyl-19-nor-17β-hydroxy-4-androsten-3-one 3-thioketal (III), 30 ml. of distilled liquid ammonia, 15 ml. of ether and 5 ml. of tetrahydrofuran, 1 g. of sodium metal is added in small pieces. The solution is refluxed for about 15 minutes and the blue color is discharged by dropwise addition of absolute ethanol. A fast stream of nitrogen is passed through to aid in evaporating the solvents. After nearly all of the ammonia and other solvents are removed, water is added. The product is extracted with ether and washed, dried, and chromatographed and the purified product recrystallized from Skellysolve B to yield 4,7α-dimethyl - 19 - nor - 17β - hydroxy - 4 - androstene (IV).

Following the procedure of Example 18 but omitting tetrahydrofuran also yields 4,7α-dimethyl-19-nor-17β-hydroxy-4-androstene (IV).

Following the procedure of Example 18 but substituting the following compounds for the starting material employed therein:

(1) 4,7α-dimethyl-17β-hydroxy-4-androsten-3-one 3-thioketal (III),
(2) 2α,4,7α-trimethyl-17β-hydroxy-4-androsten-3-one 3-thioketal (III),
(3) 2α,4,7α,17α-tetramethyl-17β-hydroxy-4-androsten-3-one 3-thioketal (III),
(4) 2α,4,7α-trimethyl-19-nor-17β-hydroxy-4-androsten-3-one 3-thioketal (III) and
(5) 2α,4,7α,17α-tetramethyl-19-nor-17β-hydroxy-4-androsten-3-one 3-thioketal (III), yields, respectively, (1) 4,7α-dimethyl-17β-hydroxy-4-androstene (IV),
(2) 2α,4,7α-trimethyl-17β-hydroxy-4-androstene (IV),
(3) 2α,4,7α,17α-tetramethyl-17β-hydroxy-4-androstene (IV),
(4) 2α,4,7α-trimethyl-19-nor-17β-hydroxy-4-androstene (IV) and
(5) 2α,4,7α,17α-tetramethyl-19-nor-17β-hydroxy-4-androstene (IV).

Following the procedure of Example 18 and the two paragraphs immediately preceding the present one by substituting as starting materials for the 17β-hydroxy compounds disclosed therein, a corresponding 17-acylate thereof, e.g., a 17-acetate or one of those listed at the end of Example 14, or a corresponding 17-alkoxide, yields the corresponding 3-thioketal counterpart of the aforesaid acylate or alkoxide embraced by Formula III of the flow-sheet.

*Example 19.—4,7α-dimethyl-19-nor-17β-hydroxy-4-androsten 17-acetate (4,7α-dimethylestr-4-en-17β-ol acetate) (IV)*

A solution of 0.7 g. of 4,7α-dimethyl-19-nor-17β-hydroxy-4-androstene (IV) in 1.4 ml. of pyridine and 0.7 ml. of acetic anhydride is kept at 60° C. for about 16 hours. Water is slowly added to the reaction mixture and the product extracted with methylene chloride, washed with dilute sodium hydroxide, saturated with a solution of a mixture of sodium chloride and sodium bicarbonate, dried and the solvent removed. The oily residue is chromatographed through a column of Florisil to yield the desired product 4,7α-dimethyl-19-nor-17β-hydroxy-4-androsten 17-acetate (IV).

Similarly, by reacting 4,7α-dimethyl-19-nor-17β-hydroxy-4-androstene (IV) with the appropriate hydrocarbon carboxylic acid anhydride, for example at temperatures between about 40° C. and 150° C. using the above procedure there are produced other 17-acylates thereof such as the 17-propionate, 17-butyrate, 17-valerate, 17-hexanoate, 17-trimethylacetate, 17-isobutyrate, 17-isovalerate, 17-decanoate, 17-cyclohexanecarboxylate, 17-cyclopentylpropionate, 17-p-hexyloxypropionate, 17-benzoate, 17-hemisuccinate, 17-phenylacetate, 17-acrylate, 17-crotonate, 17-undecylanate, 17-propiolate, 17-cannamate, 17-maleate and 17-citraconate.

Following the procedure of Example 19 and the paragraph directly above, but substituting as starting materials other 3-desoxy-7α-methyl-17β-hydroxy steroids (IV) such as 4,7α-dimethyl-17β-hydroxy-4-androstene (IV), 2α,4,7α-trimethyl-17β-hydroxy-4-androstene (IV), 2α,4,7α,17α-tetramethyl-17β-hydroxy-4-androstene (IV), 2α,4,7α-trimethyl-19-nor-17β-hydroxy-4-androstene (IV) and 2α,4,7α,17α - tetramethyl - 19 - nor-17β-hydroxy-4-androstene (IV), yields the corresponding 17-acylates thereof.

*Example 20.—4,7α-dimethyl-19-nor-4-androsten-17-one (4,7α-dimethylestr-4-en-17-one) (V)*

To a solution of 1.0 g. 4,7α-dimethyl-19-nor-17β-hydroxy-4-androstene (IV) in 30 ml. of acetone cooled in an ice bath, is added 0.95 ml. of 8 N chromium trioxide reagent [J. Org. Chem. 21, 1547 (1956)] dropwise with stirring. After about 10 minutes the mixture is diluted to a volume of about 100 ml. with water. The precipitate is collected, washed with water and dried to yield the product (V). Recrystallization of this material from a mixture of acetone and Skellysolve B gives pure 4,7α-dimethyl-19-nor-4-androsten-17-one (V).

Following the procedure of Example 20 but substituting the following compounds for the starting material employed therein:

(1) 4,7α-dimethyl-17β-hydroxy-4-androstene (IV),
(2) 2α,4,7α-trimethyl-17β-hydroxy-4-androstene (IV),
(3) 2α4,7α-trimethyl-19-nor-17β-hydroxy-4-androstene (IV),
(4) 4,7α-dimethyl-17β-hydroxy-4-androsten-3-one (II),
(5) 4,7α-dimethyl-19-nor-17β-hydroxy-4-androsten-3-one (II),
(6) 2α,4,7α-trimethyl-17β-hydroxy-4-androsten-3-one (II),
(7) 2α,4,7α-trimethyl-19-nor-17β-hydroxy-4-androsten-3-one (II), yields, respectively, (1) 4,7α-dimethyl-4-androsten-17-one (V),
(2) 2α,4,7α-trimethyl-4-androsten-17-one (V),
(3) 2α,4,7α-trimethyl-19-nor-4-androsten-17-one (V),
(4) 4,7α-dimethyl-4-androstene-3,17-dione (V),
(5) 4,7α-dimethyl-19-nor-4-androstene-3,17-dione (V),
(6) 2α,4,7α-trimethyl-4-androstene-3,17-dione (V) and
(7) 2α,4,7α-trimethyl-19-nor-4-androstene-3,17-dione (V).

*Example 21.—4,7α-dimethyl - 19 - nor-17β-hydroxy-17α-ethynyl-4-androstene (4,7α-dimethyl-17α-ethynylestr-4-en-17β-ol) (VI)*

A suspension of sodium acetylide (20 percent in xylene) is centrifuged and the sludge slurried with 10 ml. of dimethylsulfoxide. A mixture of 2 g. of 4,7α-dimethyl-19-nor-4-androsten-17-one (V) in 10 ml. of dimethylsulfoxide is mixed with the sodium acetylide. After keeping the mixture at room temperature for about a half hour it is stored in the refrigerator for about 16 hours. Water is added to the frozen mixture and the product extracted with ether. The extracts are washed with dilute acid, sodium bicarbonate and water, and the solvent removed to give an oily residue. The residue is chromatographed first through a column of Florisil and then through Woelm neutral alumina; recrystallization of the crude product (VI) from aqueous acetone gives clean plates of 4,7α-dimethyl - 19 - nor-17β-hydroxy-17α-ethynyl-4-androstene (VI).

Following the procedure of Example 21 but substituting the following compounds for the starting material employed therein:

(1) 4,7α-dimethyl-4-androsten-17-one (IV),
(2) 2α,4,7α-trimethyl-4-androsten-17-one (IV) and
(3) 2α,4,7α-trimethyl-19-nor-4-androsten-17-one (IV), yields, respectively, (1) 4,7α-dimethyl-17β-hydroxy-17α-ethynyl-4-androstene (VI),
(2) 2α,4,7α-trimethyl-17β-hydroxy-17α-ethynyl-4-androstene (VI) and
(3) 2α,4,7α-trimethyl-19-nor-17β-hydroxy-17α-ethynyl-4-androstene (VI).

Following the procedure of Example 21 but substituting the following reagents for sodium acetylide:

(a) sodium methylacetylide,
(b) sodium chloroacetylide,
(c) sodium bromoacetylide and
(d) sodium trifluoromethylacetylide, yields, respectively, (a) 4,7α-dimethyl-19-nor-17β-hydroxy-17α(1-propyne)-4-androstene (VI),
(b) 4,7α-dimethyl-19-nor-17β-hydroxy-17α-chloroethynyl-4-androstene (VI),
(c) 4,7α-dimethyl-19-nor-17β-hydroxy-17α-bromoethynyl-4-androstene (VI) and
(d) 4,7α-dimethyl-19-nor-17β-hydroxy-17α-trifluoromethylethynyl-4-androstene (VI).

Following the procedures of Example 21 and the two hereinabove paragraphs yields:

(1) 4,7α-dimethyl-17β-hydroxy-17α(1-propynyl)-4-androstene (VI),
(2) 4,7α-dimethyl-17β-hydroxy-17α-chloroethynyl-4-androstene (VI),
(3) 4,7α-dimethyl-17β-hydroxy-17α-bromoethynyl-4-androstene (VI),
(4) 4,7α-dimethyl-17β-hydroxy-17α-trifluoromethylethynyl-4-androstene (VI),
(5) 2α,4,7α-trimethyl-17β-hydroxy-17α(1-propynyl)-4-androstene (VI),
(6) 2α,4,7α-trimethyl-17β-hydroxy-17α-chloroethynyl-4-androstene (VI),
(7) 2α,4,7α-trimethyl-17β-hydroxy-17α-bromoethynyl-4-androstene (VI),
(8) 2α,4,7α-trimethyl-17β-hydroxy-17α-trifluoromethylethynyl-4-androstene (VI),
(9) 2α,4,7α-trimethyl-19-nor-17β-hydroxy-17α(1-propynyl)-4-androstene (VI),
(10) 2α,4,7α-trimethyl-19-nor-17β-hydroxy-17α-chloroethynyl-4-androstene (VI),
(11) 2α,4,7α-trimethyl-19-nor-17β-hydroxy-17α bromoethynyl-4-androstene (VI) and
(12) 2α,4,7α-trimethyl-19-nor-17β-hydroxy-17α-trifluoromethylethynyl-4-androstene (VI).

Following the procedures of Example 21 and the subsequent two paragraphs, but substituting the respective 3-enamine, 3-ketal or 3-enol ether of the following starting materials (prepared from the corresponding 3-ketosteroid, e.g., in the manner disclosed in J. Amer. Chem. Soc. 78, 430, ibid. 80, 4717 and ibid. 75, 650, respectively):

(1) 4,7α-dimethyl-4-androstene-3,17-dione (V),
(2) 4,7α-dimethyl-19-nor-4-androstene-3,17-dione (V),
(3) 2α,4,7α-trimethyl-4-androstene-3,17-dione (V) and
(4) 2α,4,7α-trimethyl-19-nor-4-androstene-3,17-dione (V), followed by cleavage of the aforesaid protecting group at the 3-position to restore the 3-keto function (in the manner described in the above-cited publications), yields, respectively, (1) (a) 4,7α-dimethyl-17β-hydroxy-17α-ethynyl-4-androsten-3-one (VI),
(1) (b) 4,7α-dimethyl-17β-hydroxy -17α(1-propynyl)-4-androsten-3-one (VI),
(1) (c) 4,7α-dimethyl-17β-hydroxy-17α-chloroethynyl-4-androsten-3-one (VI),
(1) (d) 4,7α-dimethyl-17β-hydroxy-17α-bromoethynyl-4-androsten-3-one (VI),
(1) (e) 4,7α-dimethyl-17β-hydroxy-17α-trifluoromethylethynyl-4-androsten-3-one (VI),
(2) (a) 4,7α-dimethyl-19-nor-17β-hydroxy-17α-ethynyl-4-androsten-3-one (VI),
(2) (b) 4,7α-dimethyl-19-nor-17β-hydroxy-17α-(1-propynyl)-4-androsten-3-one (VI),
(2) (c) 4,7α-dimethyl-19-nor-17β-hydroxy-17α-chloroethynyl-4-androsten-3-one (VI),
(2) (d) 4,7α-dimethyl-19-nor-17β-hydroxy-17α-bromoethynyl-4-androsten-3-one (VI),
(2) (e) 4,7α-dimethyl-19-nor-17β-hydroxy-17α-trifluoromethylethynyl-4-androsten-3-one (VI),
(3) (a) 2α,4,7α-trimethyl-17β-hydroxy-17α-ethynyl-4-androsten-3-one (VI),
(3) (b) 2α,4,7α-trimethyl-17β-hydroxy-17α(1-propynyl)-4-androsten-3-one (VI),
(3) (c) 2α,4,7α-trimethyl-17β-hydroxy-17α-chloroethynyl-4-androsten-3-one (VI),
(3) (d) 2α,4,7α-trimethyl-17β-hydroxy-17α-bromoethynyl-4-androsten-3-one (VI),
(3) (e) 2α,4,7α-trimethyl-17β-hydroxy-17α-trifluoromethylethynyl-4-androsten-4-one (VI),
(4) (a) 2α,4,7α-trimethyl-19-nor-17β-hydroxy-17α-ethynyl-4-androsten-3-one (VI),
(4) (b) 2α,4,7α-trimethyl-19-nor-17β-hydroxy-17α-(1-propynyl)-4-androsten-3-one (VI),
(4) (c) 2α,4,7α-trimethyl-19-nor-17β-hydroxy-17α-chloroethynyl-4-androsten-3-one (VI),
(4) (d) 2α,4,7α-trimethyl-19-nor-17β-hydroxy-17α-bromoethynyl-4-androsten-3-one (VI) and
(4) (e) 2α,4,7α-trimethyl-19-nor-17β-hydroxy-17α-trifluoromethylethynyl-4-androsten-3-one (VI).

Following the procedures of Example 21 and the paragraphs thereafter, and substituting the following starting materials and reagents:

(1) 4,7α-dimethyl-19-nor-4-androstene-3β-hydroxy-17-one (V) and sodium acetylide,
(2) 4,7α-dimethyl-4-androstene-3β-hydroxy-17-one (V) and sodium methylacetylide,
(3) 2α4,7α-trimethyl-4-androstene-3β-hydroxy-17-one 3-acetate (V) and sodium chloroacetylide and
(4) 2α4,7α-trimethyl-19-nor-4-androstene-3β-hydroxy-17-one (V) and sodium trifluoromethylacetylide, yields, respectively, (1) 4,7α-dimethyl-19-nor-3β,17β-dihydroxy-17α-ethynyl-4-androstene (VI),
(2) 4,7α-dimethyl-3β,17β-dihydroxy-17α(1-propynyl)-4-androstene (VI),
(3) 2α,4,7α-trimethyl-3β,17β-dihydroxy-17α-chloroethynyl-4-androstene 3-acetate (VI) and
(4) 2α,4,7α-trimethyl-19-nor-3β,17β-dihydroxy-17α-trifluoromethylethynyl-4-androstene (VI).

Following the procedure of Example 15 and the two paragraphs thereafter, the above 3-hydroxy-17α-alkynyl and haloalkynyl compound (VI) such as (1), (2) and (4), produced in the manner of the immediately preceding paragraph, are converted to their corresponding 3-acylates.

*Example 22.*—(a) *4,7α - dimethyl-19-nor-17β-hydroxy-17α - ethyl-4-androstene (4,7α-dimethyl-17α-ethylestr-4-en-17β-ol (VII)*

A catalyst comprising a suspension of 100 mg. of 1 percent palladium on charcoal in 30 ml. of dioxane (purified by passage through a column of Woelm neutral alumina) is reduced at atmospheric pressure with hydrogen. A solution of 0.4 g. of 4,7α-dimethyl-19-nor-17β-hydroxy-17α-ethynyl-4-androstene (VI) (from Example 21) in 5 ml. of dioxane is injected into the flask through a rubber stopper. Hydrogenation is continued until 2 moles of hydrogen (66.5 mls.) are consumed at atmospheric pressure. The catalyst is removed by filtration and the filtrate concentrated to dryness on a rotary evaporator. The oily residue is chromatographed through a column of 65 g. of Florisil. The eluted material is recrystallized from aqeous methanol. Recrystallization from the same solvent gives crystals of 4,7α-dimethyl-19-nor-17β-hydroxy-17α-ethyl-4-androstene (VII).

(b) *4,7α - dimethyl-19-nor-17β-hydroxy-17α-ethenyl-4-androstene (VII')*

Following the procedure of Example 22(a), above, but permitting the hydrogenation described therein to proceed until only 1 mole (33.25 mls.) of hydrogen is consumed instead of 2 moles, yields 4,7α-dimethyl-19-nor-17β-hydroxy-17α-ethenyl-4-androstene (VII').

Following the procedure of Example 22(a) but substituting the following compounds for the starting material employed therein:

(1) 4,7α-dimethyl-17β-hydroxy-17α-ethynyl-4-androstene (VI),
(2) 2α,4,7α-trimethyl-17β-hydroxy-17α-ethynyl-4-androstene (VI),
(3) 2α,4,7α-trimethyl-19-nor-17β-hydroxy-17α-ethynyl-4-androstene (VI),
(4) 4,7α-dimethyl-17β-hydroxy-17α-ethynyl-4-androsten-3-one (VI),
(5) 4,7α-dimethyl-19-nor-17β-hydroxy-17α-ethynyl-4-androsten-3-one (VI)
(6) 2α,4,7α-trimethyl-17β-hydroxy-17α-ethynyl-4-androsten-3-one (VI) and
(7) 2α,4,7α - trimethyl-19-nor-17β-hydroxy-17α-ethynyl-4-androsten-3-one (VI), yields the corresponding 17α-ethyl counterparts of (1), (2), (3), (4), (5), (6) and (7) of Formula VII.

Following the procedure of Example 22(a) but substituting the following compounds for the starting material employed therein:

(1) 4,7α-dimethyl-19-nor-17β-hydroxy-17α-(1-propyne)-4-androstene (VI),
(2) 4,7α-dimethyl-19-nor-17β-hydroxy-17α-trifluoromethylethynyl-4-androstene (VI),
(3) 2α,4,7α-trimethyl-17β-hydroxy-17α-(1-propyne)-4-androstene (VI),
(4) 2α,4,7α-trimethyl-17β-hydroxy-17α-trifluoromethylethynyl-4-androstene (VI),
(5) 2α,4,7α-trimethyl-19-nor-17β-hydroxy-17α(1-propyne)-4-androstene (VI),
(6) 2α,4,7α-trimethyl-19-nor-17β-hydroxy-17α-trifluoromethylethynyl-4-androstene (VII),
(7) 4,7α-dimethyl-17β-hydroxy-17α(1-propyne)-4-androsten-3-one (VI),
(8) 4,7α-dimethyl-17β-hydroxy-17α-trifluoromethylethynyl-4-androsten-3-one (VI),
(9) 4,7α-dimethyl-19-nor-17β-hydroxy-17α(1-propyne)-4-androsten-3-one (VI),
(10) 4,7α-dimethyl-19-nor-17β-hydroxy-17α-trifluoromethylethynyl-4-androsten-3-one (VI),
(11) 2α,4,7α-trimethyl-17β-hydroxy-17α(1-propyne)-4-androsten-3-one (VI),
(12) 2α,4,7α-trimethyl-17β-hydroxy-17α-trifluoromethylethynyl-4-androsten-3-one (VI),
(13) 2α,4,7α-trimethyl-19-nor-17β-hydroxy-17α(1-propyne)-4-androsten-3-one (VI),
(14) 2α,4,7α-trimethyl-19-nor-17β-hydroxy-17α-trifluoromethylethynyl-4-androsten-3-one (VI) and
(15) 4,7α-dimethyl-19-nor-3β,17β-dihydroxy-17α-ethynyl-4-androstene (VI) [prepared as in Example 13(c)], yields, respectively, (1) 4,7α-dimethyl-19-nor-17β-hydroxy-17α(3-propyl)-4-androstene (VII),
(2) 4,7α-dimethyl-19-nor-17β-hydroxy-17α(3',3',3'-trifluoropropyl)-4-androstene (VII),
(3) 2α,4,7α-trimethyl-17β-hydroxy-17α(3-propyl)-4-androstene (VII),
(4) 2α,4,7α-trimethyl-17β-hydroxy-17α(3',3',3'-trifluoropropyl)-4-androstene (VII),
(5) 2α,4,7α-trimethyl-19-nor-17β-hydroxy-17α(3-propyl)-4-androstene (VII),
(6) 2α,4,7α-trimethyl-19-nor-17β-hydroxy-17α(3',3',3'-trifluoropropyl)-4-androstene (VII),
(7) 4,7α-dimethyl-17β-hydroxy-17α-(3-propyl)-4-androsten-3-one (VII),
(8) 4,7α-dimethyl-17β-hydroxy-17α(3',3',3'-trifluoropropyl)-4-androsten-3-one (VII),
(9) 4,7α-dimethyl-19-nor-17β-hydroxy-17α(3-propyl)-4-androsten-3-one (VII),
(10) 4,7α-dimethyl-19-nor-17β-hydroxy-17α(3',3',3'-trifluoropropyl)-4-androsten-3-one (VII),
(11) 2α,4,7α-trimethyl-17β-hydroxy-17α(3-propyl)-4-androsten-3-one (VII),
(12) 2α,4,7α-trimethyl-17β-hydroxy-17α(3',3',3'-trifluoropropyl)-4-androsten-3-one (VII),
(13) 2α,4,7α-trimethyl-19-nor-17β-hydroxy-17α(3-propyl)-4-androsten-3-one (VII),
(14) 2α,4,7α-trimethyl-19-nor-17β-hydroxy-17α(3',3',3'-trifluoropropyl)-4-androsten-3-one (VII) and
(15) 4,7α-dimethyl-19-nor-3β,17β-dihydroxy-17α-ethyl-4-androstene (VII).

Following the procedure of Example 22(b) but substituting for the starting material employed therein the following compounds:

(1) 4,7α-dimethyl-17β-hydroxy-17α-ethynyl-4-androstene (VI),
(2) 2α,4,7α-trimethyl-17β-hydroxy-17α-enthynyl-4-androstene (VI),
(3) 4,7α-dimethyl-17β-hydroxy-17α-ethynyl-4-androsten-3-one (VI) and
(4) 2α,4α,7α-trimethyl-19-nor-17β-hydroxy-17α-ethynyl-4-androsten-3-one (VI), yields the corresponding 17α-ethenyl counterparts of (1), (2), (3) and (4) of Formula VII'.

Following the procedure of Example 22(b) but substituting for the starting material employed therein the following compounds:

(1) 4,7α-dimethyl-19-nor-17β-hydroxy-17α(1-propynyl)-4-androstene (VI),
(2) 2α,4,7α-trimethyl-19-nor-17β-hydroxy-17α-trifluoromethylethynyl-4-androstene (VI),
(3) 4,7α-dimethyl-17β-hydroxy-17α(1-propynyl)-4-androsten-3-one (VI),
(4) 2α,4,7α-trimethyl-19-nor-17β-hydroxy-17α-trifluoromethylethynyl-4-androsten-3-one (VI) and
(5) 2α,4,7α-trimethyl-19-nor-3β,17β-dihydroxy-17α-ethynyl-4-androstene (VI), yields, respectively, (1) 4,7α-dimethyl-19-nor-17β-hydroxy-17α(n-propenyl)-4-androstene (VII'),
(2) 2α,4,7α-trimethyl-19-nor-17β-hydroxy-17α(3',3',3'-trifluoropropenyl)-4-androstene (VII'),
(3) 4,7α-dimethyl-17β-hydroxy-17α(1-propynyl)-4-androsten-3-one (VII'),
(4) 2α,4,7α-trimethyl-19-nor-17β-hydroxy-17α(3',3',3'-trifluoropropenyl)-4-androsten-3-one (VII') and (5) 2α,4,7α-trimethyl-19-nor-3β,17β-dihydroxy-17α-ethenyl-4-androstene (VII′).

*Example 23.—4,7α-dimethyl - 19 - nor-17β-hydroxy-17α-ethyl - 4 - androsten-3-one (4,7α-dimethyl-17α-ethyl-19-nortestosterone) (VII)*

A suspension of 90 mg. of 1 percent palladium on carbon catalyst in 50 ml. of dioxane (purified as described in Fieser, "Methods of Organic Chemistry," page 368, 2nd edition) is saturated with hydrogen at atmospheric pressure. To the dioxane suspension 300 mg. of 4,7α-dimethyl-19-nor-17β-hydroxy-17α-ethynyl-4-androsten-3-one (VI), prepared as in Example 13(b), is added and hydrogenated at atmospheric pressure until two equivalents of hydrogen is consumed. The reaction mixture is filtered through a bed of Celite (diatomaceous earth), the filtrate concentrated to dryness and chromatographed through a 100 g. column of Florisil packed wet with Skellysolve B. Elution by a gradient technique employing between 4 l. of 2 percent acetone-Skellysolve B and 4 l. of 8 percent acetone-Skellysolve B, collecting 250 ml. fractions, gives the desired product, 4,7α-dimethyl - 19 - nor - 17β-hydroxy-17α-ethyl-4-androsten-3-one (VII), in the late fractions.

The early fractions are combined and recrystallized from Skellysolve B to give 4,7α-dimethyl-19-nor-17β-hydroxy-17α-ethyl-5β-androstan-3-one.

In the same manner as shown for preparing the various 17α-alkyl compound (VII) from their 17α-alkynyl counterparts (VI) appearing after Example 22 by the substitution of appropriate starting materials and by following the procedure of the aforesaid example, similar substitution of the same 17α-alkynyl starting steroids (VI) and employment of the procedure of Example 23, likewise produces the corresponding 17α - alkyl - Δ⁴ - compounds (VII) and in addition the corresponding 17α-alkyl-5β-androstane derivatives.

By following the procedure of Example 23, but employing three equivalents of hydrogen instead of two, gives 4,7α-dimethyl - 19 - nor-17β-hydroxy-17α-ethyl-5β-androstan-3-one. By following this procedure and employing the starting materials disclosed in the immediately preceding paragraph, the corresponding 17α-alkyl-5β-androstane derivatives will be produced.

*Example 24.—4,7α,17α-trimethyl - 19 - nor-17β-hydroxy-4-androstene (4,7α,17α-trimethyl-4-estren-17β-ol) (VIII)*

A solution of 2 g. of 4,7α-dimethyl-19-nor-4-androsten-17-one (V) (prepared as in Example 20) in 100 ml. of 2 N methylmagnesium bromide in a mixture of equal volumes of benzene and tetrahydrofuran, is heated under reflux for about 18 hours. Most of the solvent is evaporated with a stream of nitrogen. The concentrate is poured into ice-water, acidified with dilute hydrochloric acid and extracted with ether. The extract is washed with sodium bicarbonate solution, water, dried and the solvent removed. It is chromatographed through a 150 g. column of Woelm neutral alumina. Unreacted starting material (V) is eluted first. The desired product is then eluted and crystallized from aqueous acetone to give 4,7α,17α-trimethyl-19-nor-17β-hydroxy-4-androstene (VIII).

Following the procedure of Example 24 but substituting for methylmagnesium bromide, the following Grignard reagents:

(1) ethylmagnesium bromide (or chloride),
(2) n-propylmagnesium bromide (or chloride),
(3) i-propylmagnesium bromide (or chloride) and,
(4) n-butylmagnesium bromide (or chloride) yields, respectively, (1) 4,7α-dimethyl-17α-ethyl-19-nor-17β-hydroxy-4-androstene (VIII),
(2) 4,7α-dimethyl-17α-n-propyl-19-nor-17β-hydroxy-4-androstene (VIII),
(3) 4,7α-dimethyl-17α-i-propyl-19-nor-17β-hydroxy-4-androstene (VIII) and
(4) 4,7α-dimethyl-17α-n-butyl-19-nor-17β-hydroxy-4-androstene (VIII).

Following the procedures of Example 24 and the paragraph immediately preceding the present one, reaction of the following pairs of starting materials and Grignard reagents:

(1) 4,7α-dimethyl-19-nor-4-androstene-3,17-dione-3-pyrrolidinyl enamine [prepared as in Example 13(a)] and ethylmagnesium bromide,
(2) 4,7α-dimethyl-4-androstene-3,17-dione-3-pyrrolidinyl enamine and n-propylmagnesium bromide,
(3) 2α,4,7α-trimethyl-19-nor-4-androstene-3,17-dione-3-pyrrolidinyl enamine and methylmagnesium bromide and
(4) 2α,4,7α-trimethyl-4-androstene-3,17-dione-3-pyrrolidinyl enamine and methylmagnesium bromide, followed by hydrolyzing the products with a base, yields, respectively, (1) 4,7α-dimethyl-17α-ethyl-19-nor-17β-hydroxy-4-androsten-3-one (VIII),
(2) 4,7α-dimethyl-17α-n-propyl-17β-hydroxy-4-androsten-3-one (VIII),
(3) 2α,4,7α-17α-tetramethyl-19-nor-17β-hydroxy-4-androsten-3-one (VIII) and
(4) 2α,4,7α,17α-tetramethyl-17β-hydroxy-4-androsten-3-one (VIII).

Following the procedure of the Example 24 and the paragraph thereafter, reaction of the following pairs of starting materials and Grignard reagents:

(1) 4,7α-dimethyl-4-androsten-17-one (V) and isopropyl magnesium bromide,
(2) 4,7α-dimethyl-4-androsten-17-one (V) and n-butyl-magnesium bromide,
(3) 2α,4,7α-trimethyl-19-nor-4-androsten-17-one (V) methylmagnesium bromide and
(4) 2α,4,7α-trimethyl-4-androsten-17-one (V) and ethylmagnesium bromide, yields, respectively, (1) 4,7α-dimethyl-17α-isopropyl-17β-hydroxy-4-androstene (VIII),
(2) 4,7α-dimethyl-17α-n-butyl-17β-hydroxy-4-androstene (VIII),
(3) 2α,4,7α,17α-tetramethyl-19-nor-17β-hydroxy-4-androstene (VIII) and
(4) 2α,4,17α-trimethyl-17α-ethyl-17β-hydroxy-4-androstene (VIII).

The 4,7α-dimethyl-(and 2α,4,7α-trimethyl)17α-alkyl-17β-hydroxy compounds (VIII) produced in Example 24 and the three paragraphs immediately above, can be converted to their corresponding 17-acylates by following the procedures of Example 19 and the paragraphs thereafter.

Following the procedure of Example 9, but substituting the following representative starting materials:

(1) 4,7α-dimethyl-17α-ethyl-19-nor-17β-hydroxy-4-androsten-3-one (VIII) and
(2) 4,7α-dimethyl-17α-n-propyl-17β-hydroxy-4-androsten-3-one (VIII), yields, respectively, (1) 4,7α-dimethyl-17α-ethyl-19-nor-3β,17β-dihydroxy-4-androstene (VIII) and
(2) 4,7α-dimethyl-17α-n-propyl-3β,17β-dihydroxy-4-androstene (VIII).

*Example 25.—4α,7α-dimethyl-17β-hydroxy-5β-androstan-3-one (II′)*

A solution of 1 g. of 4,7α-dimethyl-17β-hydroxy-4-androsten-3-one (4,7α-dimethyltestosterone) (II) (prepared as in Example 11) in 250 ml. of 95% ethyl alcohol is reacted with hydrogen using 5% palladium on charcoal catalyst until 1 mole equivalent of hydrogen is absorbed. The catalyst is removed by filtration through a bed of Celite (diatomaceous earth). The filtrate is concentrated to dryness, and the residue chromatographed and recrystallized from a mixture of acetone and Skellysolve B to give 4α,7α-dimethyl-17β-hydroxy-5β-androstan-3-one (II'), Following the procedure of Example 25, but substituting for 4,7α - dimethyl - 17β-hydroxy-4-androsten-3-one (II), the following representative starting materials:
(1) 4,7α-dimethyl-19-nor-17β-hydroxy-4-androsten-3-one (II) and
(2) 4,7α-dimethyl-19-nor-17β-hydroxy-4-androsten-3-one 17-acetate (II), yields, respectively,
(1) 4α,7α-dimethyl-19-nor-17β-hydroxy-5β-androstan-3-one (II') and
(2) 4α,7α-dimethyl-19-nor-17β-hydroxy-5β-androstan-3-one 17-acetate (II').

*Example 26.—(a) 4α,7α-dimethyl-5β-androstan-3,17-dione (V')*

*(b) 4α,7α-dimethyl-3α,17β-dihydroxy-5β-androstane*

*(c) 4α,17α - dimethyl - 3β - hydroxy - 5β - androstan-17-one (V') and 4α,7α - dimethyl - 3α,17β-dihydroxy-5β-androstane (IIα'')*

(a) A solution of 1 g. of 4,7α-dimethyl-4-androstene-3,17-dione (V) (prepared as in Example 12) in 250 ml. of 95% ethyl alcohol is hydrogenated using 5% palladium on charcoal catalyst until 1 mole equivalent of hydrogen is absorbed. The catalyst is removed by filtration through a bed of Celite. The filtrate is concentrated to dryness, and the residue chromatographed and recrystallized from a mixture of acetone and Skellysolve B to give 4α,7α-dimethyl-5β-androstan-3,17-dione (V').

Following the procedure of Example 26(a), but substituting 4,7α - dimethyl - 19-nor-4-androstene-3,17-dione (prepared as in the paragraph following Example 12) and 2α,4α,7α-trimethyl-4-androstene-3,17-dione as starting materials, yields 4α,7α - dimethyl - 19-nor-5β-androstan-3,17-dione (V') and 2α,4α,7α - trimethyl - 5β-androstan-3,17-dione (V'), respectively.

(b) To a solution of 1 g. of 4α,7α-dimethyl-5β-androstane-3,17-dione (V') from (a), above, in 100 ml. of tetrahydrofuran, 1.5 g. of lithium aluminum tri-t-butoxyhydride at 0° C. is added with stirring. The reaction mixture is stored at about −15° C. for about 18 hours. Dilute acetic acid is added until the inorganic materials coagulate. The organic phase is decanted, dried over magnesium sulfate, filtered, concentrated to dryness, recrystallized and purified by chromatography employing a column of Florisil to yield 4α,7α-dimethyl-3α,17β-dihydroxy-5β-androstane (V').

Following the procedure of Example 26(b), but substituting 4α,7α - dimethyl-19-nor-5β-androstan-3,17-dione (V') and 2α,4α,7α - trimethyl - 5β-androstane-3,17-dione (V'), prepared as in (a), above, as starting materials, yields 4α,7α-dimethyl-19-nor-3α-hydroxy-5β-androstan-17-one (V') and 2α,4α,7α - trimethyl-3α-hydroxy-5β-androstan-17-one (V').

(c) A solution of 1 g. of 4α,7α-dimethyl-5β-androstane-3,17-dione (V') from (a), above, in 25 ml. of methanol is added to a solution of 45 mg. of sodium borohydride in 1 ml. of water and 5 ml. of methanol. After about 20 minutes, water and ether are added, the organic phase washed with water, dried and evaporated to dryness. The residual solid is separated into three components by chromatography on alumina and recrystallization to yield (1) 4α,7α - dimethyl - 3α-hydroxy-5β-androstan-17-one (V'), and (2) 4α,7α-dimethyl-3α,17β-dihydroxy-5β-androstane (IIα'').

Following the procedure of Example 26 (c), but substituting (1) 4α,7α-dimethyl-19-nor-5β-androstan-3,17-dione (V') and (2) 2α,4α,7α-trimethyl-5β-androstane-3,17-dione (V'), prepared as in (a), above, as starting material, yields respectively, (1) 4α,7α - dimethyl-19-nor-3α-hydroxy-5β-androstan-17-one (V'), 4α,7α - dimethyl - 19-nor-3β-hydroxy-5β-androstan-17-one (V') and 4α,7α-dimethyl-19-nor-3α,17β-dihydroxy-5β-androstane (IIα''), and (2) 2α,4α,7α-trimethyl-3α-hydroxy-5β-androstan-17-one (V), 2α,4α,7α-trimethyl-3β-hydroxy-5β-androstan-17-one (V') and 2α,4α,7α - trimethyl - 3α,17β - dihydroxy-5β-androstane (IIα'').

*Example 27.—2α,4α,7α-trimethyl-17β-hydroxy-5β-androstan-3-one (II')*

(a) A solution of 10 g. of 4,7α-dimethyl-17β-hydroxy-4-androsten-3-one (4,7α-dimethyltestosterone) (II) in 150 ml. of t-butyl alcohol is treated with stirring at about 60° C. with 10 ml. of ethyl oxalate followed by 13 ml. of 25 percent sodium methoxide solution. Heating is stopped and stirring continued for about 20 minutes, while the temperature of the reaction mixture is allowed to decline without external cooling. After the addition of about 120 ml. of anhydrous ether and a further period of about 20 minutes of stirring, the yellow glyoxalate is collected by filtration, washed with ether and dried at about 70° C. in vacuo. The crude glyoxalate is mixed with 30 g. of potassium carbonate, 30 ml. of methyl iodide and 250 ml. of acetone; the mixture is stirred while heating under gentle reflux for a period of about 24 hours. The reflux condenser is removed and the reaction flask arranged for distillation. After most of reaction mixture distills, it is filtered and the filtrate evaporated to dryness to give a light colored solid. This material is dissolved in methanol, purged with nitrogen and treated with similarly purged 25 percent sodium methoxide solution. After about 2 hours at room temperature, saturated salt solution is added, the mixture extracted with methlyene chloride, dried and evaporated to an amber gum. This crude product is purified by chromatography on Florisil, elution from a mixture of acetone and Skellysolve B yielding pure 2α,4α,7α-trimethyl-17β-hydroxy-4-androsten-3-one (II').

Following the procedure of (a) of Example 27, but substituting for the starting steroid 4,7α-dimethyl-17β-hydroxy-4-androsten-3-one (II), the following representative starting materials:
(1) 4,7α-dimethyl-19-nor-17β-hydroxy-4-androsten-3-one (II) and
(2) 4,7α-dimethyl-19-nor-17β-hydroxy-4-androsten-3-one 17-acetate (II), yields,
(1) 2α,4,7α-trimethyl-19-nor-17β-hydroxy-4-androsten-3-one (II').

(b) Following the procedure of Example 25, but substituting 2α,4,7α - trimethyl-17β-hydroxy-4-androsten-3-one (II) and its corresponding 19-nor derivative (prepared as in the preceding two paragraphs) as starting materials, yields 2α,4α,7α-trimethyl-17β-hydroxy-5β-androstan-3-one (II') and its 19-nor counterpart, respectively.

*Example 28.—2α,4,7α,17α-tetramethyl-17β-hydroxy - 5β-androstan-3-one (II')*

(a) To a solution of 50 g. of 4,7α,17α-trimethyl-17β-hydroxy-4-androsten-3-one (4,7α,17α - trimethyltestosterone) (II) (prepared as in (4) of the paragraph following Example 11) in 750 ml. of t-butyl alcohol, warmed to 55° C. in a nitrogen atmosphere, 50 ml. of ethyl oxalate and 65 ml. of 25 percent sodium methoxide solution is added with stirring. Stirring is continued for about 20 minutes after which 750 ml. of ether is added. The mixture is filtered and washed and the solid of crude yellow glyoxalate dried in a vacuum oven. A mixture of the crude glyoxalate, potassium carbonate, methyliodide and acetone is stirred and heated under reflux for about 24 hours. Approximately, a third of the liquid is distilled off and the remaining mixture filtered. The cake is washed with additional acetone and the combined filtrate evaporated at reduced pressure to an amber gum which is dissolved in methanol purged with nitrogen and treated with 25 percent sodium methoxide solution. After about 2 hours, saturated sodium chloride solution is added, and the mixture extracted with methylene chloride. The extract is dried and the solvent evaporated. The crude gummy product is purified via chromatography on a column of Florisil. A mixture composed of a minor proportion of acetone and the remainder Skellysolve B eluted light colored crystals, which on recrystallization from acetone-Skellysolve B yields the desired product, pure 2α,4,7α,17α-tetramethyl-17β-hydroxy-4-androsten-3-one (II).

Following the procedure of (a) of Example 28, but substituting for the starting steroid 4,7α,17α-trimethyl-17β-hydroxy-4-androsten-3-one (II), the following representative starting materials:

(1) 4,7α,17α-trimethyl-19-nor-17β-hydroxy-4-androsten-3-one (II) and
(2) 4,7α,17α-trimethyl-19-nor-17β-hydroxy-4-androsten-3-one 17-acetate (II), yields,
(1) 2α,4,7α,17α-tetramethyl-19-nor-17β-hydroxy-4-androsten-3-one (II).

(b) Following the procedure of Example 25, but substituting 2α,4,7α,17α - tetramethyl-17β-hydroxy-4-androsten-4-one (II) and its corresponding 19-nor derivative (prepared as in the preceding two paragraphs) as starting materials, yields 2α,4α,7α-tetramethyl-17β-hydroxy-5β-androstan-3-one (II') and its 19-nor counterpart (II'), respectively.

*Example 29.—4α,7α-dimethyl-17β-hydroxy-5α-androstan-3-one (II')*

To 2 l. of liquid ammonia is added 1.62 g. of lithium wire cut in small pieces. After the lithium dissolves, 20 g. of 4,7α-dimethyl-17β-hydroxy-4-androsten-3-one (II) in 450 ml. of tetrahydrofuran (purified by passage through an aluminum oxide column) is added in a slow stream at reflux. The solution is refluxed for about 15 minutes, then 30 g. of solid ammonium chloride is added in small portions. The ammonia produced is rapidly evaporated on a steam bath. Water is added and the product extracted with ether. The ether extract is washed successively with water, dilute hydrochloric acid, water and brine, then dried over magnesium sulfate, filtered and concentrated to dryness. The amorphous solid is dissolved in methylene chloride and the solution poured onto a Florisil column. After chromatography and recrystallization from ethyl acetate, the product (II) is obtained. Recrystallization from acetone gives pure 4α,7α-dimethyl-17β-hydroxy-5α-androstan-3-one (II').

Following the procedure of Example 29, but substituting 4,7α-dimethyl-19-nor-17β-hydroxy-4-androsten-3-one (II) as starting material, yields 4α,7α-dimethyl-19-nor-17β-hydroxy-5α-androstan-3-one (II').

*Example 30.—4α,7α-dimethyl-17β-hydroxy-5α-androstan-3-one 17-hydrocinnamate (II')*

To a solution of 3 g. of 4α,7α-dimethyl-17β-hydroxy-5α-androstan-3-one (II') (from Example 29) in 25 ml. of methylene chloride and 3 ml. of pyridine, 1.85 g. of hydrocinnamoyl chloride is added. After standing for about 1.25 hours at room temperature, the solution is washed successively with water, dilute acid, dilute base, water, dried over magnesium sulfate and the solvent removed. The residue is chromatographed through Florisil and crystallized from acetone-Skellysolve B to give pure 4α,7α-dimethyl-17β-hydroxy-5α-androstan 3-one 17-cinnamate (II').

Following the procedure of Example 30, but substituting 4α,7α - dimethyl-19-nor-17β-hydroxy-5α-androstan-3-one (II') as starting material, yields 4,7α-dimethyl-19-nor-17β-hydroxy-5α-androstan-3-one 17-cinnamate (II').

In the same manner as in Example 30, the 17β-acetate, cyclopentylpropionate, formate, butyrate, isobutyrate, valerate, isovalerate, hexanoate, octanoate, phenylacetate and other like 17-esters of 4α,7α-dimethyl-17β-hydroxy-5α-androstan-3-one (II') are prepared by reaction of their corresponding 17β-alcohols with the appropriate halide or acid anhydride.

*Example 31.—4α,7α,17α-trimethyl-17β-hydroxy-5α-androstan-3-one (II')*

To about 1.2 l. of liquid ammonia, 0.8 g. of lithium wire cut in small pieces is added. After the lithium dissolves, 10 g. of 4,7α,17α-trimethyl-17β-hydroxy-4-androsten-3-one (II) in 200 ml. of tetrahydrofuran (purified by passage through an aluminum oxide column) is added in a slow stream at reflux. The solution is refluxed for about 15 minutes, then 15 g. of solid ammonium chloride is added in small portions. The ammonia produced is rapidly evaporated on a steam bath. Water is added and the product extracted with ether. The ether extract is washed successively with water, dilute hydrochloric acid, water and brine, then dried over magnesium sulfate, filtered and concentrated to dryness. The amorphous solid is dissolved in methylene chloride and the solution poured onto a 250 g. Florisil column packed wet with Skellysolve B and eluted (employing 400 ml. fractions) by gradient elution between 5 l. of a mixture comprising 2% acetone and 98% Skellysolve B and 5 l. of a mixture of 12% acetone and 88% Skellysolve B to give the desired material. Recrystallization of material from acetone-Skellysolve B provided the desired pure product, 2α,7α,17α-trimethyl-17β-hydroxy-5α-androstan-3-one (II').

Following the procedure of Example 31, but substituting 4,7α,17α-trimethyl-19-nor-17β-hydroxy-4-androsten-3-one (II) as starting material, yields 4α,7α,17α-trimethyl-19-nor-17β-hydroxy-5β-androstan-3-one (II').

*Example 32.—(a) 2α,4α,7α-trimethyl-17β-hydroxy-5α-androstan-3-one (II')*

*(b) 2α,4α,7α-trimethyl-3β,17β-dihydroxy-5α-androstane (II')*

(a) To approximately 50 ml. of liquid ammonia cooled in a Dry-Ice bath, 1 g. of lithium wire in small pieces is added with stirring. When solution is complete, the cooling bath is removed and a solution of 1 g. of 2α,4,7α-trimethyl-17β-hydroxy-4-androsten-3-one (II) in 20 ml. of tetrahydrofuran added. The mixture is stirred for 15 minutes, 15 g. of ammonium chloride added, and evaporation of the remaining ammonia that forms is completed by heating on a warm-water bath. The residue is partitioned between water and methylene chloride. The organic phase is washed with cold dilute hydrochloric, water, dried and evaporated to a light amber gum. Purification is effected by chromatography on a 75 g. column of Florisil. Fractions are collected using acetone in Skellysolve B as eluent, to give pure 2α,4α,7α - trimethyl-17β-hydroxy-5α-androstan-3-one (II').

(b) From other fractions that are collected a second crystalline substance is obtained lacking 3-carbonyl absorption in its infrared spectrum; recrystallization from acetone-Skellysolve B, gives the product, 2α,4α,7α-trimethyl-3β,17β-dihydroxy-5α-androstane (II').

Following the procedure of Example 32 (a), but substituting for 2α,4,7α-trimethyl-17β-hydroxy-4-androsten-3-one (II), the following representative starting materials:

(1) 2α,4,7α - trimethyl - 19-nor-17β-hydroxy-4-androsten-3-one (II) and
(2) 2α,4,7α - trimethyl - 19-nor-17β-hydroxy-4-androsten-3-one-17-acetate (II),
yields,
(1) 2α,4α,7α - trimethyl-19-nor-5α-androstan-3-one (II').

On following the procedure of Example 32 (b), but substituting 2α,4,7α - trimethyl - 19 - nor-17β-hydroxy-4-androsten-3-one (II) as starting material, yields 2α,4α,7α-trimethyl - 19-nor-3β,17β-dihydroxy-5α-androstane (II'').

*Example 33.—$2\alpha,4\alpha,7\alpha,17\alpha$-tetramethyl-$17\beta$-hydroxy-$5\alpha$-androstan-3-one (II')*

To approximately 60 ml. of liquid ammonia cooled in a Dry Ice bath, 1 g. of lithium wire is added with stirring. When solution is complete the cooling bath is removed and a solution of 2 g. of $2\alpha,4,7\alpha,17\alpha$-tetramethyl-$17\beta$-hydroxy-4-androsten-3-one (II) in 30 ml. of tetrahydrofuran is added. After stirring for about 15 minutes, 5 g. of ammonium chloride is added, and the excess ammonia evaporated on a warm-water bath. The residue is partitioned between water and methylene chloride, the organic phase is separated, washed with cold dilute hydrochloric acid, water, dried and the solvent evaporated. This material is oxidized by treatment with sodium dichromate in acetic acid at room temperature for 2 hours. The product is isolated by dilution with water and chromatographed as before on a 75 g. column of Florisil. Crystals are obtained from the eluate which show the presence of a 3-keto substituent. After recrystallization from acetone-Skellysolve B, the product, $2\alpha,4\alpha,7\alpha,17\alpha$-tetramethyl-19-nor-$17\beta$-hydroxy-4-androsten-3-one (II) as starting material, yields $4\alpha,7\alpha,17\alpha$-trimethyl-19-nor-$17\beta$-hydroxy-$5\alpha$-androstan-3-one (II').

*Example 34.—$4\alpha,7\alpha$-dimethyl-$3\beta,17$-dihydroxy-$5\alpha$-androstane (II'')*

To a solution of 2.5 g. of $4,7\alpha$-dimethyl-$17\beta$-hydroxy-$5\alpha$-androstan-3-one (II') in 25 ml. of 95% alcohol, 0.6 g. of sodium borohydride is added. After stirring for about 1.25 hours, acetic acid is added to the reaction mixture until excess borohydride is destroyed. The crude product (II'') is precipitated with water, filtered, washed, dried and recrystallized from acetone-Skellysolve B to yield pure $4\alpha,7\alpha$-dimethyl-$3\beta,17\beta$-dihydroxy-$5\alpha$-androstane (II'').

Following the procedure of Example 34, but substituting $2\alpha,4\alpha,7\alpha$-trimethyl-$17\beta$-hydroxy-$5\alpha$-androstan-3-one (II'), $4\alpha,7\alpha$-dimethyl-19-nor-$17\beta$-hydroxy-$5\alpha$-androstan-3-one (II') and their corresponding 17-acylates (II') as starting materials, yields, respectively, $2\alpha,4\alpha,7\alpha$-trimethyl-$3\beta,17\beta$-dihydroxy-$5\alpha$-androstane (II''), $4\alpha,7\alpha$-dimethyl-19-nor-$3\beta,17\beta$-dihydroxy-$5\alpha$-androstane (II'') and their corresponding $17\beta$-acylates (II'').

*Example 35.—$4\alpha,7\alpha,17\alpha$-trimethyl-$3\beta,17\beta$-dihydroxy-$5\alpha$-androstane (II'')*

To a solution of 1.1 g. of $4\alpha,7\alpha,17\alpha$-trimethyl-$17\beta$-hydroxy-$5\alpha$-androstan-3-one (II') in 23 ml. of methanol and 1 ml. of water, 150 mg. of sodium borohydride is added while cooling and stirring. After 1.5 hours a few drops of acetic acid is added to destroy the excess borohydride. The reaction mixture is diluted to about 50 ml. with water, the precipitate collected, washed with water and dried. The crude material is recrystallized from aqueous methanol to give pure $4\alpha,7\alpha,17\alpha$-trimethyl-$3\beta,17\beta$-dihydroxy-$5\alpha$-androstane (II'').

Following the procedure of Example 35, but substituting $2\alpha,4\alpha,7\alpha,17\alpha$-tetramethyl-$17\beta$-hydroxy-$5\alpha$-androstan-3-one (II'), $2\alpha,4\alpha,7\alpha,17\alpha$-tetramethyl-19-nor-$17\beta$-hydroxy-$5\alpha$-androstan-3-one (II'), $4\alpha,7\alpha,17\alpha$-trimethyl-19-nor-$17\beta$-hydroxy-$5\alpha$-androstan-3-one (II') and the 17-acylates of the foregoing compounds (II') as starting materials, yields, respectively, $2\alpha,4\alpha,7\alpha,17\alpha$-tetramethyl-$3\beta,17\beta$-dihydroxy-$5\alpha$-androstane (II''), $2\alpha,4\alpha,7\alpha,17\alpha$-tetramethyl-19-nor-$3\beta,17\beta$-dihydroxy-$5\alpha$-androstane (II''), $4\alpha,7\alpha,17\alpha$-trimethyl-19-nor-$3\beta,17\beta$-dihydroxy-$5\alpha$-androstane (II'') and their corresponding 17-acylates (II'').

*Example 36.—(a) $4\alpha,7\alpha$-dimethyl-$3\alpha,17\beta$-dihydroxy-$5\alpha$-androstane 17-acetate (II$\alpha$) and $4\alpha,7\alpha$-dimethyl-$3\beta,17\beta$-dihydroxy-$5\alpha$-androstane 17-acetate (II$\beta$)*

(a) To a suspension of 3.5 g. of lithium aluminum tri-t-butoxyhydride in 50 ml. of tetrahydrofuran, 3.5 g. of $4\alpha,7\alpha$-dimethyl-$17\beta$-hydroxy-$5\alpha$-androstan-3-one 17-acetate (II') is added with stirring at 0° C. The suspension is allowed to warm to room temperature during 30 minutes after which dilute hydrochloric acid is added dropwise until all of the excess hydride is consumed. The solution is diluted further with 50 ml. of water and the tetrahydrofuran removed under reduced pressure. The product is extracted into ether and the combined extracts washed consecutively with water, saturated sodium chloride solution, dried with sodium sulfate and the solution evaporated to dryness under reduced pressure. Thin layer chromatography on silica gel G (ethyl acetate-cyclohexane 1:1) indicates the presence of both the $3\alpha$- and $3\beta$-isomers of the product (II'). This material is adsorbed onto 175 g. of Florisil in methylene chloride and the column eluted with acetone-Skellysolve B over a gradient of from 0 to 15% acetone. The middle fractions are combined and recrystallized from Skellysolve B to give $4\alpha,7\alpha$-dimethyl-$3\beta,17\beta$-dihydroxy-$5\alpha$-androstan 17-acetate (II$\beta$).

Following the procedure of Example 36 (a), but substituting for $4\alpha,7\alpha$-dimethyl-$17\beta$-hydroxy-$5\alpha$-androstan-3-one 17-acetate (II') the following representative starting materials:

(1) $4\alpha,7\alpha$-dimethyl-19-nor-$17\beta$-hydroxy-$5\alpha$-androstan-3-one 17-acetate (II'), (2) $2\alpha,4\alpha,7\alpha$-trimethyl-$17\beta$-hydroxy-$5\alpha$-androstan-3-one 17-acetate (II') and (3) $2\alpha,4\alpha,7\alpha$-trimethyl-19-nor-$17\beta$-hydroxy-$5\alpha$-androstan-3-one 17-acetate (II'), yields, respectively, (1) $4\alpha,7\alpha$-dimethyl-19-nor-$3\alpha,17\beta$-dihydroxy-$5\alpha$-androstane 17-acetate (II$\alpha$) and $4\alpha,7\alpha$-dimethyl-19-nor-$3\beta,17\beta$-dihydroxy-$5\alpha$-androstane 17-acetate (II$\beta$), (2) $2\alpha,4\alpha,7\alpha$-trimethyl-$3\alpha,17\beta$-dihydroxy-$5\alpha$-androstane 17-acetate (II$\alpha$) and $2\alpha,4\alpha,7\alpha$-trimethyl-$3\beta,17\beta$-dihydroxy-$5\alpha$-androstane 17-acetate (II$\beta$) and (3) $2\alpha,4\alpha,7\alpha$-trimethyl-$3\alpha,17\beta$-dihydroxy-$5\alpha$-androstane 17-acetate (II$\alpha$) and $2\alpha,4\alpha,7\alpha$-trimethyl-$3\beta,17\beta$-dihydroxy-$5\alpha$-androstane 17-acetate (II$\beta$).

(b) *$4\alpha,7\alpha$-dimethyl-$3\alpha,17\beta$-dihydroxy-$5\beta$-androstane 17-acetate (II$\alpha$) and $4\alpha,7\alpha$-dimethyl-$3\beta,17\beta$-dihydroxy-$5\beta$-androstane 17-acetate (II$\beta$)*

(b) To a solution of 1 g. of $4\alpha,7\alpha$-dimethyl-$17\beta$-hydroxy-$5\beta$-androstan-3-one 17-acetate (II') [obtained by converting $4\alpha,7\alpha$-dimethyl-$17\beta$-hydroxy-$5\beta$-androstan-3-one (II'), prepared as in Example 25, to its corresponding 17-acetate (in the manner described in the last paragraph of Example 30) in 25 ml. of methanol] a solution of 125 mg. of sodium borohydride in 2 ml. of water and 10 ml. of methanol is added. The mixture warms spontaneously and after standing at room temperature for about 20 minutes, excess borohydride is destroyed by addition of a few drops of acetic acid. The reaction mixture is diluted to about 50 ml. with water, extracted with ether, the ether extracts washed with water, dried over magnesium sulfate and evaporated to dryness under reduced pressure. The crude solid is recrystallized from acetone-Skellysolve B; recrystallization from the same solvent pair yields pure $4\alpha,7\alpha$-dimethyl-$3\alpha,17\beta$-dihydroxy-$5\beta$-androstane 17-acetate (II$\alpha$). Chromatography of the mother liquor over a Florisil column yields $4\alpha,7\alpha$-dimethyl-$3\beta,17\beta$-dihydroxy-$5\beta$-androstane 17-acetate (II$\beta$).

Following the procedure of Example 36(b), but substituting for $4\alpha,7\alpha$-dimethyl-$17\beta$-hydroxy-$5\beta$-androstan-3-one 17-acetate (II') the following representative starting materials:

(1) $4\alpha,7\alpha$-dimethyl-19-nor-$17\beta$-hydroxy-$5\beta$-androstan-3-one 17-acetate (II'), (2) 2α,4α,7α - trimethyl - 17β - hydroxy - 5β - androstan-3-one 17-acetate (II′) and
(3) 2α,4α,7α - trimethyl - 19 - nor - 17β - hydroxy-3-one 17-acetate (II′),
yields, respectively,
(1) 4α,7α - dimethyl - 19 - nor - 3α,17β - dihydroxy-5β - androstane 17 - acetate (IIα) and 4α,7α - dimethyl - 19 - nor - 3β,17β - dihydroxy - 5β-androstane 17-acetate (IIβ),
(2) 2α,4α,7α - trimethyl - 3α,17β - dihydroxy - 5β-androstane 17 - acetate (IIα) and 2α,4α,7α-trimethyl - 3β,17β - dihydroxy - 5β - androstane 17-acetate (IIβ), and
(3) 2α,4α,7α - trimethyl - 19 - nor - 3α,17β - dihydroxy-5β - androstane 17 - acetate (IIα) and 2α,4α,7α-trimethyl - 19 - nor-3β,17β - dihydroxy - 5β - androstane 17-acetate (IIβ).

(c) *4α,7α - dimethyl - 3α,17β - dihydroxy - 5α-androstane (IIα)*

(c) One hundred mg. of 4α,7α - dimethyl - 3α,17β-dihydroxy-5α-androstane 17-acetate (IIα), obtained according to the procedure of Example 36 (a), is dissolved in 4 ml. of 5% potassium hydroxide in methanol, followed by the addition of 5 drops of water. After standing for about 15 hours at room temperature the solution is warmed on a steam bath and diluted to incipient crystallization by the dropwise addition of water. On cooling, a colorless crystalline product (IIα) is isolated by filtration and air dried. Recrystallization of this material from alcohol and water gives pure 4α,7α-dimethyl-3α,17β-dihydroxy-5α-androstane (IIα).

Following the procedure of Example 36(c), but substituting for 4α,7α - dimethyl - 3α,17β - dihydroxy - 5α-androstane 17-acetate (IIα) the following representative starting materials:

(1) 4α,7α - dimethyl - 19 - nor - 3β,17β - dihydroxy-5α-androstane 17-acetate (IIβ),
(2) 4α,7α - dimethyl - 3α,17β - dihydroxy - 5β - androstane 17-acetate (IIα),
(3) 2α,4α,7α - trimethyl - 3α,17β - dihydroxy - 5α-androstane 17-acetate (IIα) and
(4) 2α,4α,7α - trimethyl - 19 - nor - 3β,17β - dihydroxy-5β-androstane 17-acetate (IIβ),
yields, respectively,
(1) 4α,7α - dimethyl - 19 - nor - 3β,17β - dihydroxy-5α-androstane (IIβ),
(2) 4α,7α - dimethyl - 3α,17β - dihydroxy - 5β - androstane (IIα),
(3) 2α,4α,7α - trimethyl - 3α,17β - dihydroxy - 5α-androstane (IIα) and
(4) 2α,4α,7α - trimethyl - 19 - nor - 3β,17β - dihydroxy-5β-androstane (IIβ).

*Example 37.—4α,7α - dimethyl - 3β,17β - dihydroxy-5α - androstane 17 - acetate 3 - p - toluenesulfonate (IIβ₁)*

To 1.13 g. of 4α,7α - dimethyl - 3β,17β - dihydroxy-5α-androstane 17-acetate (IIβ) (obtained in Example 36) in 10 ml. of pyridine, 1.13 g. of p-toluenesulfonyl chloride is added and the reaction mixture allowed to stand for about 16 hours at room temperature. The solution was poured into 200 ml. of 3 N hydrochloric acid and refrigerated. The solid that separated is filtered, washed with water and dried. The solid is recrystallized from methanol at 4° C. to give the product 4α,7α-dimethyl - 3β,17β - dihydroxy - 5α - androstane 17-acetate 3-p-toluenesulfonate (IIβ₁).

Following the procedure of Example 37, but substituting 4α,7α - dimethyl - 19 - nor - 3β,17β - dihydroxy-5α - androstane 17 - acetate (IIβ), 2α,4α,7α - trimethyl-3β,17β - dihydroxy - 5α - androstane 17 - acetate (IIβ) and 2α,4α,7α - trimethyl - 19 - nor - 3β,17β - dihydroxy-5α-androstane 17-acetate (IIβ) as starting material, yields, respectively, 4α,7α - dimethyl - 19 - nor - 3β,17β-dihydroxy - 5α - androstane 17 - acetate 3 - p - toluenesulfonate (IIβ₁), 2α,4α,7α -trimethyl - 3β,17β - dihydroxy - 5α - androstane 17-acetate 3-p-toluenesulfonate (IIβ₁), and 2α,4α,7α - trimethyl - 19 - nor - 3β,17β-dihydroxy - 5α - androstane 17 - acetate 3 - p - toluenesulfonate (IIβ₁).

*Example 38.—(a) 4α,7α - dimethyl - 3β,17β - dihydroxy - 5α - androstane 3 - p - toluenesulfonate (IIβ₂) and*

(b) *4α,7α - dimethyl - 3β - hydroxy - 5α - androstan-17 - one 3 - p - toluenesulfonate (IIβ₃)*

(a) A 940 mg. sample of 4α,7α - dimethyl - 3β,17β-dihydroxy - 5α - androstane 17 - acetate 3 - p - toluenesulfonate (IIβ₁) (obtained in Example 37) is dissolved with warming in 50 ml. of methanol and treated with 1 ml. of concentrated hydrochloric acid. The solution is allowed to stand at room temperature for about 20 hours. It is then diluted with an equal volume of water and the alcohol removed under reduced pressure to give a semi-solid gum. The aqueous phase is decanted and the residue taken up in ether. The ether solution is washed consecutively with water, 4% sodium bicarbonate solution, saturated sodium chloride solution, dried over sodium sulfate and evaporated to dryness under reduced pressure. A sample of this material is crystallized from methanol to give 4α,7α-dimethyl-3β,17β - dihydroxy - 5α - androstane 3 - p - toluenesulfonate (IIβ₂).

(b) The residue from (a), above, is taken up in 10 ml. of pyridine, 0.1 g. of chromic anhydride added and the mixture allowed to stand at room temperature for about 5 hours. The excess chromic acid is destroyed by the addition of 10 ml. of methanol and the solution concentrated to dryness under vacuum on a steam bath. The residue is taken up in ether and the ether solution washed consecutively with water, 4% sodium bicarbonate solution, saturated sodium chloride solution, dried over sodium sulfate and the solvent evaporated under reduced pressure. The residue, after toluene azeotropic distillation of residual pyridine, is crystalline and is recrystallized from ethanol to give the product 4α,7α-dimethyl-3β-hydroxy-5α-androstan-17-one 3-p-toluenesulfonate (IIβ₃).

Following the procedure of Example 38, but substituting for 4α,7α-dimethyl-3β,17β-dihydroxy-5α-androstan 17-acetate 3-p-toluenesulfonate (IIβ₁) the following starting materials:

(1) 4α,7α-dimethyl-19-nor-3β,17β-dihydroxy-5α-androstan 17-acetate 3-p-toluenesulfonate (IIβ₁),
(2) 2α,4α,7α-dimethyl-3β,17β-dihydroxy-5α-androstan 17-acetate 3-p-toluenesulfonate (IIβ₁) and
(3) 2α,4α,7α-dimethyl-19-nor-3β,17β-dihydroxy-5α-androstane 17-acetate 3-p-toluenesulfonate (IIβ₁), yields, respectively, (1) 4α,7α-dimethyl-19-nor-3β,17β-dihydroxy-5α-androstane 3-p-toluenesulfonate (IIβ₂) and 4,7α-dimethyl-19-nor-3β-hydroxy-5α-androstan-17-one 3-p-toluenesulfonate (IIβ₃),
(2) 2α,4α,7α-trimethyl-3β,17β-dihydroxy-5α-androstane 3-p-toluenesulfonate (IIβ₂) and 2α,4α,7α-trimethyl-3β-hydroxy-5α-androstan-17-one 3-p-toluenesulfonate (IIβ₃) and
(3) 2α,4α,7α-trimethyl-19-nor-3β,17β-dihydroxy-5α-androstane 3-p-toluenesulfonate (IIβ₂) and 2α,4α,7α-trimethyl-19-nor-3β-hydroxy-5α-androstan-17-one 3-toluenesulfonate (IIβ₃).

*Example 39.—(a) 4α,7α-dimethyl-5α-androst-2-en-17-one (IIβ₄), (b) 4α,7α-dimethyl-3α-hydroxy-5α-androstan-17-one 3-formate (IIβ₅) and (c) 4α,7α-dimethyl-3α-hydroxy-5α-androstan-17-one (IIβ₆)*

A 410 mg. sample of 4α,7α-dimethyl-3β-hydroxy-5α-androstan-17-one 3-p-toluenesulfonate (IIβ₃) (obtained in Example 38) is dissolved with warming in 20 ml. of dimethylformamide and the solution heated at between about 80 and 85° C. for about 3.5 days. The solution is poured into 250 ml. of saturated sodium chloride solution. The products are extracted with methylene chloride and the extracts washed consecutively with water, saturated sodium chloride solution, dried with sodium sulfate and evaporated under reduced pressure to give an oily residue containing 4α,7α-dimethyl-5α-androst-2-en-17-one (II$\beta_4$) and 4α,7α-dimethyl-3α-hydroxy-5α-androstan-3 - formate (II$\beta_5$).

The residue obtained above is dissolved in benzene, adsorbed onto a 10 g. column of Fisher A540 alumina and eluted over a gradient of from 0 to 5% methanol in benzene during 20 fractions of 10 ml. each. The first several fractions are combined and recrystallized from Skellysolve B to give colorless prisms of 4α,7α-dimethyl-5α-androst-2-en-17-one (II$\beta_4$). A middle fraction contained the product 4α,7α-dimethyl-3α-hydroxy-5α-androstan-17-one (II$\beta$).

Following the procedure of Example 39, but substituting for 4α,7α-dimethyl-3β-hydroxy-5α-androstan-17-one 3-p-toluenesulfonate (II$\beta_3$) the following starting materials:

(1) 4α,7α-dimethyl-19-nor-3β-hydroxy-5α-androstan-17-one 3-p-toluenesulfonate (II$\beta_3$).
(2) 2α,4α,7α-trimethyl-3β-hydroxy-5α-androstan-17-one 3-p-toluenesulfonate (II$\beta_3$) and
(3) 2α,4α,7α-trimethyl-19-nor-3β-hydroxy-5α-androstan-17-one 3-p-toluenesulfonate (II$\beta_3$), yields, respectively, (1) 4α,7α-dimethyl-19-nor-5α-androst-2-en-17-one (II$\beta_4$),
4α,7α-dimethyl-19-nor-3α-hydroxy-5α-androstan-17-one 3-formate (II$\beta_5$) and
4α,7α-dimethyl-19-nor-3α-hydroxy-5α-androstan-17-one (II$\beta_6$),
(2) 2α,4α,7α-trimethyl-5α-androst-2-en-17-one (II$\beta_4$),
2α,4α,7α-trimethyl-3α-hydroxy-5α-androstan-17-one 3-formate (II$\beta_5$), and
2α,4α,7α-trimethyl-3αhydroxy5α-androstan-17-one (II$\beta_6$) and
(3) 2α,4α,7α-trimethyl-19-nor-5α-androst-2-en-17-one (II$\beta_4$),
2α,4α,7α-trimethyl-19-nor-3α-hydroxy-5α-androstan-17-one 3-formate (II$\beta_5$) and
2α,4α,7α-trimethyl-19-nor-3α-hydroxy-5α-androstan-17-one (II$\beta_6$).

*Example 40.—4α,7α-dimethyl-3α,17β-dihydroxy-5α-androstane 3-dihydropyranyl ether 17-acetate (II$\alpha_1$)*

To 1.8 g. of 4α,7α-dimethyl-3α,17β-dihydroxy-5α-androstan 17-acetate (IIα) (obtained in accordance with the procedure of Example 36) suspended in 10 ml. of dihydropyran and 50 ml. of ether, 100 mg. of p-toluenesulfonic acid are added. The ether solution is stirred for about 16 hours, extracted successively with sodium bicarbonate solution, saturated sodium chloride solution, dried over anhydrous sodium sulfate and evaporated to dryness under reduced pressure to yield 4α,7α-dimethyl-3α,17β-dihydroxy-5α-androstan 3-dihydropyranyl ether 17-acetate (II$\alpha_1$). This residue is employed in the following example without further purification.

Similarly substituting a stoichiometrically equivalent amount of (1) 4α,7α-dimethyl-19-nor-3α,17β-dihydroxy-5α-androstan 17-acetate (IIα),
(2) 2α,4α,7α-trimethyl-3α,17β-dihydroxy-5α-androstan 17-acetate (IIα) and
(3) 2α,4α,7α-trimethyl-19-nor-3α,17β-dihydroxy-5α-androstane 17-acetate (IIα), yields, respectively, (1) 4α,7α-dimethyl-19-nor-3α,17β-dihydroxy-5α-androstane 3-dihydropyranyl ether 17-acetate (II$\alpha_1$),
(2) 2α,4α,7α-trimethyl-3α,17β-dihydroxy-5α-androstane 3-dihydropyranyl ether, 17-acetate (II$\alpha_1$) and
(3) 2α,4α,7α-trimethyl-19-nor-3α,17β-dihydroxy-5α-androstane 3-dihydropyranyl ether, 17-acetate (II$\alpha_1$).

*Example 41.—4α,7α-dimethyl-3α,17β-dihydroxy-5α-androstane 3-dihydropyranyl ether (II$\alpha_2$)*

The residue comprising 4α,7α-dimethyl-3α,17β-dihydroxy-5α-androstane 3-dihydropyranyl ether 17-acetate (II$\alpha_1$) (obtained in Example 40) is dissolved in 100 ml. of 5% potassium carbonate in methanol-water (4:1) solution and the reaction mixture heated to reflux for about 1.5 hours. The solvents are removed under reduced pressure to give a crystalline residue comprising 4α,7α-dimethyl-3α,17β-dihydroxy - 5α - androstane 3-dihydropyranyl ether (II$\alpha_2$), which is used in the following experiment without further purification.

Similarly substituting for the residue comprising 4α,7α-dimethyl - 3α,17β - dihydroxy - 5α - androstane 3-dihydropyranyl ether (II$\alpha_1$) the residues comprising (1) 4α,7α-dimethyl-19-nor-3α,17β-dihydroxy-5α-androstane 3-dihydropyranyl ether 17-acetate (II$\alpha_1$)
(2) 2α,4α,7α-trimethyl-3α,17β-dihydroxy-5α-androstane 3-dihydropyranyl ether 17-acetate (II$\alpha_1$) and
(3) 2α,4α,7α-trimethyl-19-nor-3β,17β-dihydroxy-5α-androstane 3-dihydropyranyl ether 17-acetate (II$\alpha_1$), yields, respectively, (1) 4α,7α-dimethyl-19-nor-3α,17β-dihydroxy-5α-androstane 3-dihydropyranyl ether (II$\alpha_2$),
(2) 2α,4α,7α-trimethyl-3α,17β-dihydroxy-5α-androstane 3-dihydropyranyl ether (II$\alpha_2$) and
(3) 2α,4α,7α-trimethyl-19-nor-3α,17β-dihydroxy-5α-androstane 3-dihydropyranyl ether (II$\alpha_2$).

*Example 42.—4α,7α-dimethyl-3α-hydroxy-5α-androstan-17-one 3-dihydropyranyl ether (II$\alpha_3$)*

The crystalline residue comprising 4α,7α-dimethyl-3α,17β - dihydroxy - 5α - androstane 3-dihydropyranyl ether (II$\alpha_2$) (obtained in Example 41) is taken up in 10 ml. of pyridine and added to pyridine-chromic acid complex prepared from 2 g. of chromic anhydride in 20 ml. of pyridine. The reaction mixture is stirred for about 5 hours at room temperature, diluted with a 1:1 mixture of ether and benzene and filtered on a Celite (diatomaceous earth) pad. The filtrate is washed successively with water and saturated sodium chloride solution, dried over anhydrous sodium sulfate and evaporated to dryness under reduced pressure and the residual pyridine distilled azeotropically with toluene under reduced pressure to yield a residue comprising 4α,7α-dimethyl-3α-hydroxy-5α-androstan-17-one 3-dihydropyranyl ether (II$\alpha_3$) which was used without further purification in the following experiment.

Similarly substituting for the residues comprising 4α,7α-dimethyl-3α,17β-dihydroxy-5α-androstane 3 - dihydropyranyl ether (II$\alpha_2$) the residues comprising (1) 4α,7α-dimethyl-19-nor-3α,17β-dihydroxy-5α- androstane 3-dihydropyranyl ether (II$\alpha_2$),
(2) 2α,4α,7α-trimethyl-3α,17β-dihydroxy-5α-androstane 3-dihydropyranyl ether (II$\alpha_2$) and
(3) 2α,4α,7α-trimethyl-19-nor-3β,17β-dihydroxy-5α-androstane 3-dihydropyranyl ether (II$\alpha_2$), yields, respectively, (1) 4α,7α-dimethyl-19-nor-3α-hydroxy-5α-androstan-17-one 3-dihydropyranyl ether (II$\alpha_3$),
(2) 2α,4α,7α-trimethyl-3α-hydroxy-5α-androstan-17-one 3-dihydropyranyl ether (II$\alpha_3$) and
(3) 2α,4α,7α-trimethyl-19-nor-3α-hydroxy-5α-androstan-17-one 3-dihydropyranyl ether (II$\alpha_3$).

Example 43.—$4\alpha,7\alpha$-dimethyl-$3\alpha$-hydroxy-$5\alpha$-androstan-17-one (II$\alpha_4$)

The residue comprising $4\alpha,7\alpha$-dimethyl-$3\alpha$-hydroxy-$5\alpha$-androstan-17-one 3-dihydropyranyl ether (II$\alpha_3$) (obtained in Example 42) is taken up in 20 ml. of acetone and 2 ml. of 3 N hydrochloric acid added thereto. The reaction mixture, after standing at room temperature overnight, yields colorless crystals which on recrystallization from acetone give $4\alpha,7\alpha$-dimethyl-$3\alpha$-hydroxy-$5\alpha$-androstan-17-one (II$\alpha_4$).

Following the procedure of Example 43, but substituting the residue of $4\alpha,7\alpha$-dimethyl-$3\alpha$-hydroxy-$5\alpha$-androstan-17-one 3-dihydropyranyl ether (II$\alpha_3$) for those of (1) $4\alpha,7\alpha$-dimethyl-19-nor-$3\alpha$-hydroxy-$5\alpha$-androstan-17-one 3-dihydropyranyl ether (II$\alpha_3$),
(2) $2\alpha,4\alpha,7\alpha$-trimethyl-$3\alpha$-hydroxy-$5\alpha$-androstan-17-one 3-dihydropyranyl ether (II$\alpha_3$) and
(3) $2\alpha,4\alpha,7\alpha$-trimethyl-19-nor-$3\alpha$-hydroxy-$5\alpha$-androstan-17-one 3-dihydropyranyl ether (II$\alpha_3$), yields, respectively, (1) $4\alpha,7\alpha$-dimethyl-19-nor-$3\alpha$-hydroxy-$5\alpha$-androstan-17-one (II$\alpha_4$),
(2) $2\alpha,4\alpha,7\alpha$-trimethyl-$3\alpha$-hydroxy-$5\alpha$-androstan-17-one (II$\alpha_4$) and
(3) $2\alpha,4\alpha,7\alpha$-trimethyl-19-nor-$3\alpha$-hydroxy-$5\alpha$-androstan-17-one (II$\alpha_4$).

Example 44.—(a) $4\alpha,7\alpha$-dimethyl-$5\alpha$-androstane-3,17-dione (V')

(b) $4\alpha,7\alpha$ - dimethyl - $3\alpha$ - hydroxy - $5\alpha$ - androstan-17-one (V') and $4\alpha,7\alpha$-dimethyl-$3\beta$-hydroxy-$5\alpha$-androstan-17-one (V')

(a) To a solution of 0.3 g. of $4\alpha,7\alpha$-dimethyl-$17\beta$-hydroxy-$5\alpha$-androstan-3-one (II') (prepared as in Example 29) in 10 ml. of acetone, 0.275 ml. of Jones reagent (8 N chromium trioxide) is added with cooling. The crude product (V') is precipitated with water, filtered, dried and recrystallized from acetone-Skellysolve B to give $4\alpha,7\alpha$-dimethyl-$5\alpha$-androstane-3,17-dione (V').

Following the procedure of Example 44, but substituting for $4\alpha,7\alpha$-dimethyl-$17\beta$-hydroxy-$5\alpha$-androstan-3-one (II'), the following representative starting materials:

(1) $4\alpha,7\alpha$-dimethyl-19-nor-$17\beta$-hydroxy-$5\alpha$-androstan-3-one (II'),
(2) $2\alpha,4\alpha,7\alpha$-trimethyl-$17\beta$-hydroxy-$5\alpha$-androstan-3-one (II') and
(3) $2\alpha,4\alpha,7\alpha$-trimethyl-19-nor-$17\beta$-hydroxy-$5\alpha$-androstan-3-one (II'), yields, respectively, (1) $4\alpha,7\alpha$-dimethyl-19-nor-$5\alpha$-androstane-3,17-dione (V'),
(2) $2\alpha,4\alpha,7\alpha$-trimethyl-$5\alpha$-androstan-3,17-dione (V') and
(3) $2\alpha,4\alpha,7\alpha$-trimethyl-19-nor-$5\alpha$-androstane-3,17-dione (V').

Following the procedure of Example 44, but substituting for $4\alpha,7\alpha$ - dimethyl-$17\beta$-hydroxy-$5\alpha$-androstan-3-one (II'), the following representative starting materials:

(1) $4\alpha,7\alpha$-dimethyl-$17\beta$-hydroxy-$5\beta$-androstan-3-one (II') (prepared as in Example 25),
(2) $2\alpha,4\alpha,7\alpha$-trimethyl-$17\beta$-hydroxy-$5\beta$-androstan-3-one (II') (prepared as in Example 27),
(3) $4\alpha,7\alpha$-dimethyl-19-nor-$17\beta$-hydroxy-$5\beta$-androstan-3-one (II') and
(4) $2\alpha,4\alpha,7\alpha$-trimethyl-19-nor-$17\beta$-hydroxy-$5\beta$-androstan-3-one (II'), yields, respectively, (1) $4\alpha,7\alpha$-dimethyl-$5\beta$-androstan-3,17-dione (V'),
(2) $2\alpha,4\alpha,7\alpha$-trimethyl-$5\beta$-androstan-3,17-dione (V'),
(3) $4\alpha,7\alpha$-dimethyl-19-nor-$5\beta$-androstan-3,17-dione (V') and
(4) $2\alpha,4\alpha,7\alpha$-trimethyl-19-nor-$5\beta$-androstan-3,17-dione (V').

(b) A solution of 300 mg. of $4\alpha,7\alpha$-dimethyl-$5\alpha$-androstane-3,17-dione (V'), obtained in (a), above, in 5 ml. of pyridine is added to a solution of 15 mg. of sodium borohydride in 20 ml. of pyridine. The solution is allowed to stand at room temperature for about 2 hours and then diluted with water and extracted with ether. The ether extracts are washed with water, dried and evaporated to dryness in vacuo. The residue is recrystallized and chromatographed over a column of alumina to yield $4\alpha,7\alpha$ - dimethyl - $3\alpha$ - hydroxy-$5\alpha$ - androstan-17-one (V') and $4\alpha,7\alpha$-dimethyl-$3\beta$-hydroxy-$5\alpha$- androstan-17-one (V').

Following the procedure of Example 44(b), but substituting for $4\alpha,7\alpha$-dimethyl-$5\alpha$ - androstane - 3,17-dione (V') the following representative starting materials:

(1) $4\alpha,7\alpha$-dimethyl-19-nor-$5\alpha$-androstane-3,17-dione (V'),
(2) $2\alpha,4\alpha,7\alpha$-trimethyl-$5\alpha$-androstane-3,17-dione (V') and
(3) $2\alpha,4\alpha,7\alpha$-trimethyl-19-nor-$5\alpha$-androstane-3,17-dione (V'), yields, respectively, (1) $4\alpha,7\alpha$-dimethyl-19-nor-$3\alpha$-hydroxy-$5\alpha$-androstan-17-one (V') and $4\alpha,7\alpha$-dimethyl-19-nor-$3\beta$-hydroxy-$5\alpha$-androstan-17-one (V'),
(2) $2\alpha,4\alpha,7\alpha$-trimethyl-$3\alpha$-hydroxy-$5\alpha$-androstan-17-one (V') and $2\alpha,4\alpha,7\alpha$-trimethyl-$3\beta$-hydroxy-17-one (V'), and
(3) $2\alpha,4\alpha,7\alpha$-trimethyl-19-nor-$3\alpha$-hydroxy-$5\alpha$-androstan-17-one (V') and $2\alpha,4\alpha,7\alpha$-trimethyl-19-nor-$3\beta$-hydroxy-$5\alpha$-androstan-17-one (V').

Example 45.—$4\alpha,7\alpha$-dimethyl-$17\beta$-hydroxy-$5\alpha$-androstan-3-one 3-thioketal (III')

[$4\alpha,7\alpha$-dimethyl-$17\beta$-hydroxy-$5\alpha$-androstan-3-one cyclic 3-(ethylene dithioketal)]

To a solution of 2 g. of $4\alpha,7\alpha$-dimethyl-$17\beta$-hydroxy-$5\alpha$-androstan-3-one (II') (prepared as in Example 29) in 6 ml. of acetic acid cooled to about 10° C., 0.7 ml. of ethanedithiol and 0.7 ml. of borontrifluoride etherate are added. After standing at room temperature for about 20 minutes the reaction mixture is composed of crystalline material. It is diluted to a volume of about 25 ml. with water and ice. The crystals are collected, washed with water and dried to yield the crude product (III'), which on recrystallization from a mixture of methanol and methylene chloride gives pure $4\alpha,7\alpha$-dimethyl-$17\beta$-hydroxy-$5\alpha$-androstan-3-one 3-thioketal (III').

Following the procedure of Example 45 but substituting the following representative compound for the starting material employed therein:

(1) $4\alpha,7\alpha$-dimethyl-19-nor-$17\beta$-hydroxy-$5\alpha$-androstan-3-one (II'),
(2) $4\alpha,7\alpha,17\alpha$-trimethyl-$17\beta$-hydroxy-$5\alpha$-androstan-3-one (II') (obtained in Example 31),
(3) $2\alpha,4\alpha,7\alpha$-trimethyl-$17\beta$-hydroxy-$5\alpha$-androstan-3-one (II') (obtained in Example 32),
(4) $2\alpha,4\alpha,7\alpha,17\alpha$-tetramethyl-$17\beta$-hydroxy-$5\alpha$-androstan-3-one (II') (obtained in Example 33),
(5) $4\alpha,7\alpha,17\alpha$-trimethyl-19-nor-$17\beta$-hydroxy-$5\alpha$-androstan-3-one (II'),
(6) $2\alpha,4\alpha,7\alpha$-trimethyl-19-nor-$17\beta$-hydroxy-$5\alpha$-androstan-3-one (II'),
(7) $2\alpha,4\alpha,7\alpha,17\alpha$-tetramethyl-19-nor-$17\beta$-hydroxy-$5\alpha$-androstan-3-one (II'),
(8) $4\alpha,7\alpha$-dimethyl-19-nor-$17\beta$-hydroxy-$5\beta$-androstan-3-one (II'),
(9) $4\alpha,7\alpha,17\alpha$-trimethyl-$17\beta$-hydroxy-$5\beta$-androstan-3-one (II'),
(10) $2\alpha,4\alpha,7\alpha$-trimethyl-$17\beta$-hydroxy-$5\beta$-androstan-3-one (II'),

(11) 2α,4α,7α,17α-tetramethyl-17β-hydroxy-5β-androstan-3-one (II'),
(12) 4α,7α,17α-trimethyl-19-nor-17β-hydroxy-5β-androstan-3-one (II'),
(13) 2α,4α,7α-trimethyl-19-nor-17β-hydroxy-5β-androstan-3-one (II') and
(14) 2α,4α,7α,17α-tetramethyl-19-nor-17β-hydroxy-5β-androstan-3-one (II'), yields, respectively, (1) 4α,7α-dimethyl-19-nor-17β-hydroxy-5α-androstan-3-one 3-thioketal (III'),
(2) 4α,7α,17α-trimethyl-17β-hydroxy-5α-androstan-3-one 3-thioketal (III'),
(3) 2α,4α,7α-trimethyl-17β-hydroxy-5α-androstan-3-one 3-thioketal (III'),
(4) 2α,4α,7α,17α-tetramethyl-17β-hydroxy-5α-androstan-3-one 3-thioketal (III'),
(5) 4α,7α,17α-trimethyl-19-nor-17β-hydroxy-5α-androstan-3-one 3-thioketal (III'),
(6) 2α,4α,7α-trimethyl-19-nor-17β-hydroxy-5α-androstan-3-one 3-thioketal (III'),
(7) 2α,4α,7α,17α-tetramethyl-19-nor-17β-hydroxy-5α-androstan-3-one 3-thioketal (III'),
(8) 4α,7α-dimethyl-19-nor-17β-hydroxy-5β-androstan-3-one 3-thioketal (III'),
(9) 4α,7α,17α-trimethyl-17β-hydroxy-5β-androstan-3-one 3-thioketal (III'),
(10) 2α,4α,7α-trimethyl-17β-hydroxy-5β-androstan-3-one 3-thioketal (III'),
(11) 2α,4α,7α,17α-tetramethyl-17β-hydroxy-5β-androstan-3-one 3-thioketal (III'),
(12) 4α,7α,17α-trimethyl-17β-hydroxy-5β-androstan-3-one 3-thioketal (III'),
(13) 2α,4α,7α-trimethyl-19-nor-17β-hydroxy-5β-androstan-3-one 3-thioketal (III') and
(14) 2α,4α,7α,17α-tetramethyl-19-nor-17β-hydroxy-5β-androstan-3-one 3-thioketal (III'),

*Example 46.—4α,7α-dimethyl-17β-hydroxy-5α-androstane (IV')*

To a solution of 1 g. of 4α,7α-dimethyl-17β-hydroxy-5α-androstan-3-one 3-thioketal (III') (obtained in Example 45), 30 ml. of distilled liquid ammonia, 15 ml. of ether and 5 ml. of tetrahydrofuran, 1 g. of sodium metal is added in small pieces. The solution is refluxed for about 15 minutes and the blue color discharged by dropwise addition of absolute ethanol. A rapid stream of nitrogen is passed through the reaction vessel to evaporate the solvents. After removal of most of the ammonia and other solvents, water is added. The resulting precipitate is collected, washed with water, dried and recrystallized from Skellysolve B to yield 4α,7α-dimethyl-17β-hydroxy-5α-androstane (IV').

Following the procedure of Example 46 but substituting the following representative compounds for the starting material employed therein:

(1) 4α,7α-dimethyl-19-nor-17β-hydroxy-5α-androstan-3-one 3-thioketal (III'),
(2) 4α,7α,17α-trimethyl-17β-hydroxy-5α-androstan-3-one 3-thioketal (III'),
(3) 2α,4α,7α-trimethyl-17β-hydroxy-5α-androstane-3-thioketal (III'),
(4) 2α,4α,7α,17α-tetramethyl-17β-hydroxy-5α-androstan-3-one 3-thioketal (III'),
(5) 4α,7α,17α-trimethyl-19-nor-17β-hydroxy-5α-androstan-3-one 3-thioketal (III'),
(6) 2α,4α,7α-trimethyl-19-nor-17β-hydroxy-5α-androstan-3-one 3-thioketal (III'),
(7) 2α,4α,7α,17α-tetramethyl-19-nor-17β-hydroxy-5α-androstan-3-one 3-thioketal (III'),
(8) 4α,7α-dimethyl-19-nor-17β-hydroxy-5β-androstan-3-one 3-thioketal (III'),
(9) 4α,7α,17α-trimethyl-17β-hydroxy-5β-androstan-3-one 3-thioketal (III'),
(10) 2α,4α,7α-trimethyl-17β-hydroxy-5β-androstan-3-one 3-thioketal (III'),
(11) 2α,4α,7α,17α-tetramethyl-17β-hydroxy-5β-androstan-3-one 3-thioketal (III'),
(12) 4α,7α,17α-trimethyl-17β-hydroxy-5β-androstan-3-one 3-thioketal (III'),
(13) 2α,4α,7α-trimethyl-19-nor-17β-hydroxy-5β-androstan-3-one 3-thioketal (III') and
(14) 2α,4α,7α,17α-tetramethyl-19-nor-17β-hydroxy-5α-androstan-3-one 3-thioketal (III'), yields, respectively, (1) 4α,7α-dimethyl-19-nor-17β-hydroxy-5α-androstane (IV'),
(2) 4α,7α,17α-trimethyl-17β-hydroxy-5α-androstane (IV'),
(3) 2α,4α,7α-trimethyl-17β-hydroxy-5α-androstane (IV'),
(4) 2α,4α,7α,17α-tetramethyl-17β-hydroxy-5α-androstane (IV'),
(5) 4α,7α,17α-trimethyl-19-nor-17β-hydroxy-5α-androstane (IV'),
(6) 2α,4α,7α-trimethyl-19-nor-17β-hydroxy-5α-androstane (IV'),
(7) 2α,4α,7α,17α-tetramethyl-19-nor-17β-hydroxy-5α-androstane (IV'),
(8) 4α,7α-dimethyl-19-nor-17β-hydroxy-5β-androstane (IV'),
(9) 4α,7α,17α-trimethyl-17β-hydroxy-5β-androstane (IV'),
(10) 2α,4α,7α-trimethyl-17β-hydroxy-5β-androstane (IV'),
(11) 2α,4α,7α,17α-tetramethyl-17β-hydroxy-5β-androstane (IV'),
(12) 4α,7α,17α-trimethyl-19-nor-17β-hydroxy-5β-androstane (IV'),
(13) 2α,4α,7α-trimethyl-19-nor-17β-hydroxy-5β-androstane (IV'),
(14) 2α,4α,7α,17α-tetramethyl-19-nor-17β-hydroxy-5β-androstane (IV'),

*Example 47.—4,7α - dimethyl-19-nor-17β-hydroxy-4-androsten-3-one 3-thioketal (4,7α-dimethyl-19-nortestosterone 3-thioketal) (III)*

To a solution of 2 g. of 4,7α-dimethyl-19-nor-17β-hydroxy-4-androsten-3-one (II) in 6 ml. of acetic acid cooled to about 10° C., 0.7 ml. of ethanedithiol and 0.7 ml. of borontrifluoride etherate is added. After standing at room temperature for about 20 minutes the reaction mixture is composed of crystalline material. It is diluted to a volume of about 25 ml. with water and ice. The crystals are collected, washed with water and dried to yield 4,7α-dimethyl-19-nor-17β-hydroxy-4-androsten-3-one 3-thioketal.

Following the procedure of Example 47 but substituting the following compounds for the starting material employed therein:

(1) 4,7α-dimethyl-17β-hydroxy-4-androsten-3-one (II),
(2) 2α,4,7α-trimethyl-17β-hydroxy-4-androsten-3-one (II),
(3) 2α,4,7α,17α-tetramethyl-17β-hydroxy-4-androsten-3-one (II),
(4) 2α,4,7α-trimethyl-19-nor-17β-hydroxy-4-androsten-3-one (II) and
(5) 2α,4,7α,17α-tetramethyl-19-nor-17β-hydroxy-4-androsten-3-one (II), yields, respectively, (1) 4,7α-dimethyl-17β-hydroxy-4-androsten-3-one 3-thioketal (III),
(2) 2α,4,7α-trimethyl-17β-hydroxy-4-androsten-3-one 3-thioketal (III),
(3) 2α,4,7α,17α-tetramethyl-17β-hydroxy-4-androsten-3-one 3-thioketal (III),
(4) 2α,4,7α-trimethyl-19-nor-17β-hydroxy-4-androsten-3-one (III) and (5) 2α,4,7α,17α-tetramethyl-19-nor-17β-hydroxy-4-androsten-3-one 3-thioketal (III).

*Example 48.—4,7α-dimethyl-19-nor-17β-hydroxy-4-androstene (4,7α-dimethylestr-4-en-17β-ol) (IV)*

To a solution of 1 g. of 4,7α-dimethyl-19-nor-17β-hydroxy-4-androsten-3-one 3-thioketal (III), 30 ml. of distilled liquid ammonia, 15 ml. of ether and 5 ml. of tetrahydrofuran, 1 g. of sodium metal is added in small pieces. The steroid goes into solution rapidly as the sodium dissolves. The solution is refluxed for about 15 minutes and the blue color discharge by dropwise addition of absolute ethanol. A fast stream of nitrogen is passed through to aid in evaporating the solvents. After nearly all of the ammonia and other solvents are removed, water is added. The resulting precipitate is collected, washed with water, dried, chromatographed and recrystallized from Skellysolve B to yield 4,7α-dimethyl-19-nor-17β-hydroxy-4-androstene (IV).

Following the procedure of Example 48 but omitting tetrahydrofuran also yields 4,7α-dimethyl-19-nor-17β-hydroxy-4-androstene (IV).

Following the procedure of Example 48 but substituting the following compounds for the starting material employed therein:

(1) 4,7α-dimethyl-17β-hydroxy-4-androsten-3-one 3-thioketal (III),
(2) 2α,4,7α-trimethyl-17β-hydroxy-4-androsten-3-one 3-thioketal (III),
(3) 2α,4,7α,17α-tetramethyl-17β-hydroxy-4-androsten-3-one 3-thioketal (III),
(4) 2α,4,7α-trimethyl-19-nor-17β-hydroxy-4-androsten-3-one 3-thioketal (III), and
(5) 2α,4,7α,17α-tetramethyl-19-nor-17β-hydroxy-4-androsten-3-one 3-thioketal (III), yields, respectively,
(1) 4,7α-dimethyl-17β-hydroxy-4-androstene (IV),
(2) 2α,4,7α-trimethyl-17β-hydroxy-4-androstene (IV),
(3) 2α,4,7α,17α-tetramethyl-17β-hydroxy-4-androstene (IV),
(4) 2α,4,7α-trimethyl-19-nor17β-hydroxy-4-androstene (IV), and
(5) 2α,4,7α,17α-tetramethyl-19-nor-17β-hydroxy-4-androstene (IV).

*Example 49.—4α,7α-dimethyl-19-nor-17β-hydroxy-5β-androstane (IV′)*

A suspension containing 1 g. of 4,7α-dimethyl-19-nor-17β-hydroxy-4-androstene (IV) (obtained in Example 48) and 0.2 g. of 5% palladium-on-charcoal in 200 ml. of 95% alcohol is reacted with hydrogen until 1 mole equivalent of hydrogen is consumed. The catalyst is filtered off and the filtrate concentrated to dryness. The residue is purified by chromatography employing a column of Florisil to give 4α,7α-dimethyl-19-nor-17β-hydroxy-5β-androstane (IV′).

Following the procedure of Example 49, but substituting Adams (platinum dioxide) catalyst for 5% palladium-on-charcoal also yields 4α,7α-dimethyl-19-nor-17β-hydroxy-5β-androstane (IV′).

Following the procedure of Example 49 but substituting the following representative compounds for the starting material employed therein:

(1) 4,7α-dimethyl-17β-hydroxy-4-androstene (IV),
(2) 2α,4,7α-trimethyl-17β-hydroxy-4-androstene (IV),
(3) 2α,4,7α,17α-tetramethyl-17β-hydroxy-4-androstene (IV),
(4) 2α,4,7α-trimethyl-19-nor-17β-hydroxy-4-androstene (IV) and
(5) 2α,4,7α,17α-tetramethyl-19-nor-17β-hydroxy-4-androstene (IV), yields, respectively, (1) 4α,7α-dimethyl-17β-hydroxy-5β-androstane (IV′),
(2) 2α,4α,7α-trimethyl-17β-hydroxy-5β-androstane (IV′),
(3) 2α,4α,7α,17α-tetramethyl-17β-hydroxy-5β-androstane (IV′),
(4) 2α,4α,7α,trimethyl-19-nor-17β-hydroxy-5β-androstane (IV′) and
(5) 2α,4α,7α,17α-tetramethyl-19-nor-17β-hydroxy-5β-androstane (IV′).

*Example 50.—4α,7α-dimethyl-19-nor-17β-hydroxy-5β-androstan 17-acetate (IV′)*

A solution of 0.7 g. of 4α,7α-dimethyl-19-nor-17β-hydroxy-5β-androstane (IV′) (obtained in Example 49) in 1.4 ml. of pyridine and 0.7 ml. of acetic anhydride is kept at room temperature for about 16 hours. Water is slowly added to the reaction mixture and the product extracted with methylene chloride, washed with dilute sodium hydroxide, saturated with a solution of a mixture of sodium chloride and sodium bicarbonate, dried and the solvent removed. The oily residue is chromatographed through a column of Florisil. A yield of 0.32 g. of the desired product, 4α,7α-dimethyl-19-nor-17β-hydroxy-5β-androstan 17-acetate (IV′) is obtained.

Similarly, by reaction 4α,7α-dimethyl-19-nor-17β-hydroxy-5β-androstane (IV′) with the appropriate hydrocarbon carboxylic acid anhydride, for example, at temperatures between about 80° C. and 150° C. using the above procedure there are produced other 17-acylates thereof such as the 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17 - p - hexyloxypropionate, 17 - benzoate, 17-hemisuccinate, 17-phenylacetate, 17-acrylate, 17-crotonate, 17 - undecylanate, 17 - propiolate, 17 - cinnamate, 17-maleate and 17-citraconate.

Following the procedure of Example 50 and the paragraph directly hereinabove, but substituting as starting materials other 3-desoxy-4,7α - dimethyl - 17β - hydroxy steroids (IV′) such as 4α,7α-dimethyl-17β-hydroxy-5β-androstane (IV′),
2α,4α,7α-trimethyl-17β-hydroxy-5β-androstane (IV′),
2α,4α,7α,17α-tetramethyl-17β-hydroxy-5β-androstane (IV′),
2α,4α,7α-trimethyl-19-nor-17β-hydroxy-5β-androstane (IV′) and
2α,4α,7α,17α-tetramethyl-19-nor-17β-hydroxy-5β-androstane (IV′), yields the corresponding 17-acylates thereof.

To a solution of 3 g. of 4α,7α-dimethyl-19-nor-17β-hydroxy-5β-androstane (IV′) (obtained in Example 49) in 35 ml. of acetone cooled in an ice-bath, 3 ml. of 8 N chromium trioxide reagent (Jones reagent) is added dropwise with stirring. After about 10 minutes the mixture is diluted to a volume of about 150 ml. with water. The precipitate is collected, washed with water and dried to yield the desired product (V′). Recrystallization from acetone-Skellysolve B gives pure 4α,7α-dimethyl-19-nor-5β-androstane-17-one (V′).

Following the procedure of Example 51 but substituting the following representative compounds for the starting materials employed therein:

(1) 4α,7α-dimethyl-17β-hydroxy-5β-androstane (IV′),
(2) 2α,4α,7α-trimethyl-17β-hydroxy-5β-androstane (IV′),
(3) 2α,4α,7α-trimethyl-19-nor-17β-hydroxy-5β-androstane (IV′),
(4) 4α,7α-dimethyl-17β-hydroxy-5β-androstan-3-one (II′),
(5) 4α,7α-dimethyl-19-nor-17β-hydroxy-5β-androstan-3-one (II′),
(6) 2α,4α,7α-trimethyl-17β-hydroxy-5β-androstan-3-one (II′),
(7) 2α,4α,7α-trimethyl-19-nor-17β-hydroxy-5β-androstan-3-one (II), yields, respectively,

47

(1) 4α,7α-dimethyl-5β-androstan-17-one (V'),
(2) 2α,4α,7α-trimethyl-5β-androstan-17-one (V'),
(3) 2α,4α,7α-trimethyl-19-nor-5β-androstan-17-one (V'),
(4) 4α,7α-dimethyl-5β-androstane-3,17-dione (V'),
(5) 4α,7α-dimethyl-19-nor-5β-androstane-3,17-dione (V'),
(6) 2α,4α,7α-trimethyl-5β-androstane-3,17-dione (V') and
(7) 2α,4α,7α-trimethyl-19-nor-5β-androstane-3,17-dione (V').

Example 52.—4α,7α-dimethyl-19-nor-17β-hydroxy-17α-ethynyl-5β-androstane (VI')

A suspension of sodium acetylide (20% in xylene) is centrifuged and the sludge slurried with 10 ml. of dimethylsulfoxide. A mixture of 2 g. of 4α,7α-dimethyl-19-nor-5β-androstan-17-one (V') (obtained in Example 51) in 10 ml. of dimethylsulfoxide is mixed with the sodium acetylide. After keeping the mixture at room temperature for about a half-hour it is stored in the refrigerator for about 16 hours. Water is added to the frozen mixture and the product extracted with ether. The extracts are washed with dilute acid, sodium bocarbonate and water, and the solvent removed to give an oily residue. The residue is chromatographed first through a column of Florisil and then through Woelm neutral alumina; recrystallization of the crude product gives pure 4α,7α-dimethyl-19-nor-17β-hydroxy-17α-ethynyl-5β-androstane (VI').

Following the procedure of Example 52 but substituting the following compounds for the starting material employed therein:

(1) 4α,7α-dimethyl-5β-androstan-17-one (V'),
(2) 4α,7α-dimethyl-19-nor-3α-hydroxy-5α-androstan-17-one (V'),
(3) 2α,4α,7α-trimethyl-5β-androstan-17-one (V'),
(4) 2α,4α,7α-trimethyl-3α-hydroxy-5α-androstan-17-one (V'),
(5) 2α,4α,7α-trimethyl-19-nor-5β-androstan-17-one (V') and
(6) 2α,4α,7α-trimethyl-19-nor-3α-hydroxy-5α-androstan-17-one yields respectively, (1) 4α,7α-dimethyl-17β-hydroxy-17α-ethynyl-5β-androstane (VI'),
(2) 4α,7α-dimethyl-3α,17β-dihydroxy-17α-ethynyl-19-nor-5α-androstane (VI'),
(3) 2α,4α,7α-trimethyl-17β-hydroxy-17α-hydroxy-17α-ethynyl-5β-androstane (VI'),
(4) 2α,4α,7α-trimethyl-3α,17β-dihydroxy-17α-ethynyl 5α-androstane (VI'),
(5) 2α,4α,7α-trimethyl-19-nor-17β-hydroxy-17α-ethynyl-5β-androstane (VI') and
(6) 2α,4α,7α-trimethyl-3α,17β-dihydroxy-17α-ethynyl-19-nor-5α-androstane (VI').

Following the procedure of Example 52 but substituting the following reagents for sodium acetylide:

(a) sodium methylacetylide,
(b) sodium chloroacetylide,
(c) sodium bromoacetylide and
(d) sodium trifluoromethylacetylide, yields, respectively, (a) 4α,7α-dimethyl-19-nor-17β - hydroxy - 17α(1-propynyl)-5β-androstane (VI'),
(b) 4α,7α-dimethyl-19-nor-17β-hydroxy-17α-chloroethynyl-5β-androstane (VI'),
(c) 4α,7α-dimethyl-19-nor-17β-hydroxy-17α-bromoethynyl-5β-androstane (VI'), and
(d) 4α,7α-dimethyl-19-nor-17β-hydroxy-17α-trifluoromethylethynyl-5β-androstane (VI').

Following the procedure of Example 52 and the two hereinabove paragraphs yields:

(1) 4α,7α-dimethyl-17β-hydroxy-17α(1-propynyl)-5β-androstane (VI'),

48

(2) 4α,7α-dimethyl-17β-hydroxy-17α-chloroethynyl-5β-androstane (VI'),
(3) 4α,7α-dimethyl-17β-hydroxy-17α-bromoethynyl-5β-androstane (VI'),
(4) 4α,7α-dimethyl-17β-hydroxy-17α-trifluoromethylethynyl)-5β-androstane (VI'),
(5) 2α,4α,7α-trimethyl-17β-hydroxy-17(1-propynyl)-5β-androstane (VI'),
(6) 2α,4α,7α-trimethyl-17β-hydroxy-17α-chloroethynyl-5β-androstane (VI'),
(7) 2α,4α,7α-trimethyl-17β-hydroxy-17α-bromoethynyl-5β-androstane (VI'),
(8) 2α,4α,7α-trimethyl-17β-hydroxy-17α-trifluoromethylethynyl-5β-androstane (VI'),
(9) 2α,4α,7α-trimethyl-19-nor-17β-hydroxy-17α(1-propynyl)-5β-androstane (VI'),
(10) 2α,4α,7α-trimethyl-19-nor-17β-hydroxy-17α-chloroethynyl-5β-androstane (VI'),
(11) 2α,4α,7α-trimethyl-19-nor-17β-hydroxy-17α bromoethynyl-5β-androstane (VI') and
(12) 2α,4α,7α-trimethyl-19-nor-17β-hydroxy-17α-trifluoromethylethynyl-5β-androstane (VI').

Following the procedures of Example 52 and the subsequent two paragraphs, but substituting the respective 3-enamine, 3-ketal, or 3-enol ether of the following starting materials (prepared from the corresponding 3-ketosteroid, e.g., in the manner disclosed in J. Amer. Chem. Soc., 78, 430; ibid. 80, 4717, and ibid. 75, 650, respectively):

(1) 4α,7α-dimethyl-5β-androstane-3,17-dione (V'),
(2) 4α,7α-dimethyl-19-nor-5β-androstane-3,17-dione (V'),
(3) 2α,4α,7α-trimethyl-5β-androstane-3,17-dione (V') and
(4) 2α,4α,7α-trimethyl-19-nor-5β-androstane-3,17-dione (V'), followed by cleavage of the aforesaid protecting group at the 3-position to restore the 3-keto function (in the manner described in the above-cited publications), yields, respectively, (1) (a) 4α,7α-dimethyl-17β-hydroxy-17α-ethynyl-5β-androstan-3-one (VI'),
(1) (b) 4α,7α-dimethyl-17β-hydroxy-17α(1-propynyl)-5β-androstan-3-one (VI'),
(1) (c) 4α,7α-dimethyl-17β-hydroxy-17α-chloroethynyl-5β-androstan-3-one (VI'),
(1) (d) 4α,7α-dimethyl-17β-hydroxy-17α-bromoethynyl-5β-androstan-3-one (VI'),
(1) (e) 4α,7α-dimethyl-17β-hydoxy-17α-trifluoromethylethynyl-5β-androstan-3-one (VI'),
(2) (a) 4α,7α-dimethyl-19-nor-17β-hydroxy-17α ethynyl-5β-androstan-3-one (VI'),
(2) (b) 4α,7α-dimethyl-19-nor-17β-hydroxy-17α(1-propynyl)-5β-androstan-3-one (VI'),
(2) (c) 4α,7α-dimethyl-19-nor-17α-hydroxy-17α-chloroethynyl-5β-androstan-3-one (VI'),
(2) (d) 4α,7α-dimethyl-19-nor-17β-hydroxy-17α-bromoethynyl-5β-androstan-3-one (VI'),
(2) (e) 4α,7α-dimethyl-19-nor-17β-hydroxy-17α-trifluoromethylethynyl-5β-androstan-3-one (VI'),
(3) (a) 2α,4α,7α-trimethyl-17β-hydroxy-17α-ethynyl-5β-androstan-3-one (VI'),
(3) (b) 2α,4α,7α-trimethyl-17β-hydroxy-17α(1-propynyl)-5β-androstan-3-one (VI'),
(3) (c) 2α,4α,7α-trimethyl-17β-hydroxy-17α-chloroethynyl-5β-androstan-3-one (VI'),
(3) (d) 2α,4α,7α-trimethyl-17β-hydroxy-17α-bromoethynyl-5β-androstan-3-one (VI'),
(3) (e) 2α,4α,7α-trimethyl-17β-hydroxy-17α-trifluoromethylethynyl-5β-androstan-3-one (VI'),
(4) (a) 2α,4α,7α-trimethyl-19-nor-17β-hydroxy-17α-ethynyl-5β-androstan-3-one (VI'), (4) (b) 2α,4α,7α-trimethyl-19-nor-17α-hydroxy-17α(1-propynyl)-5β-androstan-3-one (VI'),
(4) (c) 2α,4α,7α-trimethyl-19-nor-17β-hydroxy-17α-chloroethynyl-5β-androstan-3-one (VI'),
(4) (d) 2α,4α,7α-trimethyl-19-nor-17β-hydroxy-17α-bromoethynyl-5β-androstan-3-one (VI') and
(4) (e) 2α,4α,7α-trimethyl-19-nor-17β-hydroxy-17α-trifluoromethylethynyl-5β-androstan-3-one (VI').

Following the procedures of Example 52 and the paragraphs thereafter, and substituting the following starting materials and reagents:

(1) 4α,7α-dimethyl-19-nor-5β-androstan-3β-hydroxy-17-one (V') and sodium acetylide,
(2) 4α,7α-dimethyl-19-nor-5β-androstane-3α-hydroxy-17-one (V') and sodium acetylide,
(3) 4α,7α-dimethyl-5β-androstane-3β-hydroxy-17-one (V') (obtained in Example 26) and sodium methylacetylide,
(4) 4α-7α-dimethyl-5β-androstane-3α-hydroxy-17-one (V') and sodium methylacetylide,
(5) 2α,4α,7α-trimethyl-5β-androstane-3β-hydroxy-17-one (V') and sodium chloroacetylide,
(6) 2α,4α7α-trimethyl-5β-androstane,3α-hydroxy-17-one (V') and sodium chloroacetylide,
(7) 2α,4α,7α-trimethyl-19-nor-5β-androstane-3β-hydroxy-17-one (V') and sodium trifluoromethylacetylide,
(8) 2α,4α,7α-trimethyl-19-nor-5β-androstane-3α-hydroxy-17-one (V') and sodium trifluoromethylacetylide, yields, respectively, (1) 4α,7α-dimethyl-19-nor-3β-dihydroxy-17α-ethynyl-5β-androstane (VI'),
(2) 4α,7α-dimethyl-19-nor-3α,17β-dihydroxy-17α-ethynyl-5β-androstane (VI'),
(3) 4α,7α-dimethyl-3β,17β-dihydroxy-17α(1-propynyl)-5β-androstane (VI'),
(4) 4α,7α-dimethyl-3α,17β-dihydroxy-17α(1-propynyl)-5β-androstane (VI'),
(5) 2α,4α,7α-trimethyl-3β,17β-dihydroxy-17α-chloroethynyl-5β-androstane (VI'),
(6) 2α,4α,7α-trimethyl-3α,17β-dihydroxy-17α-chloroethynyl-5β-androstane (VI'),
(7) 2α,4α,7α-trimethyl-19-nor-3β,17β-dihydroxy-17α-trifluoromethylethynyl-5β-androstane (VI') and
(8) 2α,4α,7α-trimethyl-19-nor-3α,17β-dihydroxy-17α-trifluoromethylethynyl-5β-androstane (VI').

Following the procedure of Example 52 and the paragraphs thereafter, but substituting the corresponding 5α-androstane starting materials (V') for the 5β-androstanes (V') employed therein, yields the corresponding 17α-alkynyl and haloalkynyl-5α-androstanes (VI').

*Example 53.—4α,7α-dimethyl-19-nor-3β,17β-dihydroxy-17α-ethynyl-5β-androstane 3-propionate (VI')*

A solution of 100 mg. of 4α,7α-dimethyl-19-nor-3β,17β-dihydroxy-17α-ethynyl-5β-androstane (VI') (prepared as described in Example 52) in 0.4 ml. of pyridine and 0.35 ml. of propionic anhydride is kept at room temperature for a period of about 16 hours. Ice and water are added and the product extracted with ether and washed successively with water, dilute hydrochloric acid, water, dilute sodium hydroxide, water and then dried. The solvent is removed and the residue recrystallized from Skellysolve B to give 4a,7α-dimethyl-19-nor-3β,17β-dihydroxy-17α-ethynyl-5β-androstane 3-propionate (VI').

Similarly, by reacting 4α,7α-dimethyl-19-nor-3β,17β-dihydroxy - 17α - ethynyl - 5β - androstane (VI') and 4α,7α - dimethyl - 19 - nor - 3α,17β - dihydroxy - 17α-ethynyl-5β-androstane (VI') with the appropriate hydrocarbon carboxylic acid anhydride using the above procedure, there are produced other 3-acylates thereof such as the 3-butyrate, 3-valerate, 3-hexanoate, 3-trimethylacetate, 3-isobutyrate, 3-isovalerate, 3-cyclohexanecarboxylate, 3-cyclopentylpropionate, 3-p-hexyloxypropionate, 3-benzoate, 3-hemisuccinate, 3-phenylacetate, 3-acrylate, 3-crotonate, 3-undecylanate, 3-propiolate, 3-cinnamate, 3-maleate and 3-citraconate.

Following the procedure of Example 53 and the paragraph directly above, but substituting as starting materials other 3(α and β)-hydroxy-17α-ethynyl steroids (VI') such as 2α,4α,7α-trimethyl-19-nor-3β,17β-dihydroxy-17α-ethynyl-5β-androstane (VI'), 2α,4α,7α-trimethyl-3β,17β-dihydroxy-17α-ethynyl-5β-androstane (VI'), 2α,4α,7α-trimethyl-19-nor-3β,17β-dihydroxy - 17α - chloroethynyl-5β-androstane (VI'), 2α,4α-trimethyl-19-nor-3α,17β-dihydroxy - 17α - ethynyl-5β-androstane (VI'), 2α,4α,7α-trimethyl-3α,17β-dihydroxy-17α-ethynyl - 5β - androstane (VI'), 4α,7α-dimethyl-3α,17β-dihydroxy-17α-ethynyl-19-nor-5α-androstane (VI'), 2α,4α,7α-trimethyl-3α,17β-dihydroxy-17α-ethynyl-5α-androstane (VI'), 2α,4α,7α-trimethyl - 3α,17β - dihydroxy - 17α - ethynyl - 19 - nor-5α-androstane (VI'), and 2α,4α,7α-trimethyl-3α,17β-dihydroxy-17α-chloroethynyl-5β-androstane (VI'), yields the corresponding 3-acylates thereof.

*Example 54.—4α,7α-dimethyl-19-nor-17β-hydroxy-17α-ethyl-5β-androstane (VII')*

A catalyst comprising a suspension of 100 g. of 1% palladium-on carcoal in 30 ml. of dioxane (purified by passage through a column of Woelm neutral alumina) is reduced at atmospheric pressure with hydrogen. A solution of 0.4 g. of 4α,7α-dimethyl-19-nor-17β-hydroxy-17α-ethynyl-5β-androstane (VI') (from Example 52) in 5 ml. of dioxane is injected into the reaction flask through a rubber stopper. Hydrogenation is continued until 2 moles of hydrogen (66.5 mls.) are consumed at atmospheric pressure. The catalyst is removed by filtration and the filtrate concentrated to dryness on a rotary evaporator. The oily residue is chroatographed through a column of 125 g. of Florisil. The eluted material is recrystallized from aqueous methanol. Recrystallization from the same solvent gives crystals of 4α,7α-dimethyl-19-nor-17β-hydroxy-17α-ethyl-5β-androstane (VII').

Following the procedure of Example 54 but substituting the following compounds for the starting material employed therein:

(1) 4α,7α-dimethyl-17β-hydroxy-17α-ethynyl-5β-androstane (VI'),
(2) 2α,4α,7α-trimethyl-17β-hydroxy-17α-ethynyl-5β-androstane (VI'),
(3) 2α,4α,7α-trimethyl-19-nor-17β-hydroxy-17α-ethynyl-5β-androstane (VI'),
(4) 4α,7α-dimethyl-17β-hydroxy-17α-ethynyl-5β-androstan-3-one (VI'),
(5) 4α,7α-dimethyl-19-nor-17β-hydroxy-17α-ethynyl-5β-androstan-3-one (VI'),
(6) 2α,4α,7α-trimethyl-17β-hydroxy-17α-ethynyl-5β-androstan-3-one (VI'),
(7) 2α,4α,7α-trimethyl-19-nor-17β-hydroxy-17α-ethynyl-5β-androstan-3-one (VI'), yields the corresponding 17α-ethyl counterparts of (1), (2), (3), (4),(5),(6), and (7) of Formula VII'.

Following the procedure of Example 54 but substituting the following compounds for the starting material employed therein:

(1) 4α,7α-dimethyl-19-nor-17β-hydroxy-17α(1-propynyl)-5β-androstane (VI'),
(2) 4α,7α-dimethyl-3α,17β-dihydroxy-17α-ethynyl-19-nor-5α-androstane (VI'),
(3) 2α,4α,7α-trimethyl-3α,17β-dihydroxy-17α-ethynyl-5α-androstane (VI'),
(4) 4α,7α-dimethyl-19-nor-17β-hydroxy-17α-trifluoromethyl-ethynyl-5β-androstane (VI'),
(5) 2α,4α,7α-trimethyl-17β-hydroxy-17α(1-propynyl)-5β-androstane (VI'),
(6) 2α,4α,7α-trimethyl-3α,17β-dihydroxy-17α-ethynyl-19-nor-5α-androstane (VI'), (7) 2α,4α,7α-trimethyl-17β-hydroxy-17α-trifluoromethyl-5β-androstane (VI'),
(8) 2α,4α,7α-trimethyl-19-nor-17β-hydroxy-17α-(1-propynyl)-5β-androstane (VI'),
(9) 2α,4α,7α-trimethyl-19-nor-17β-hydroxy-17α-trifluoromethylethynyl-5β-androstane (VI'),
(10) 4α,7α-dimethyl-17β-hydroxy-17α(1-propynyl)-5β-androstan-one (VI'),
(11) 4α,7α-dimethyl-17β-hydroxy-17α-trifluoromethylethynyl-5β-androstan-3-one (VI'),
(12) 4α,7α-dimethyl-19-nor-17β-hydroxy-17α(1-propynyl)-5β-androstan-3-one (VI'),
(13) 4α,7α-dimethyl-19-nor-17β-hydroxy-17α-trifluoromethylethynyl-5β-androstan-3-one (VI'),
(14) 2α,4α,7α-trimethyl-17β-hydroxy-17α(1-propynyl)-5β-androstan-3-one (VI'),
(15) 2α,4α,7α-trimethyl-17β-hydroxy-17α-trifluoromethylethynyl-5β-androstan-3-one (VI'),
(16) 2α,4α,7α-trimethyl-19-nor-17β-hydroxy-17α(1-propynyl)-5β-androstan-3-one (VI') and
(17) 2α,4α,7α-trimethyl-19-nor-17β-hydroxy-17α-trifluoromethylethynyl-5β-androstan-3-one (VI'), yields, respectively, (1) 4α,7α-dimethyl-19-nor-17β-hydroxy-17α-(3-propyl)-5β-androstane (VII'),
(2) 4α,7α-dimethyl-3α,17β-dihydroxy-17α-ethyl-19-nor-5α-androstane (VII'),
(3) 2α,4α,7α-trimethyl-3α,17β-dihydroxy-17α-ethyl-5α-androstane (VII'),
(4) 4α,7α-dimethyl-19-nor-17β-hydroxy-17α-trifluoromethyl-5β-androstane (VII'),
(5) 2α,4α,7α-trimethyl-17β-hydroxy-17α-(3-propyl)-5β-androstane (VII'),
(6) 2α,4α,7α-trimethyl-3α,17β-dihydroxy-17α-ethyl-19-nor-5α-androstane (VII'),
(7) 2α,4α,7α-trimethyl-17β-hydroxy-17α-trifluoromethyl-5β-androstane (VII'),
(8) 2α,4α,7α-trimethyl-19-nor-17β-hydroxy-17α-(3-propyl)-5β-androstane (VII'),
(9) 2α,4α,7α-trimethyl-19-nor-17β-hydroxy-17α-trifluoromethyl-5β-androstane (VII'),
(10) 4α,7α-dimethyl-17β-hydroxy-17α-(3-propyl)-5β-androstan-3-one (VII'),
(11) 4α,7α-dimethyl-17β-hydroxy-17α-trifluoromethyl-5β-androstan-3-one (VII'),
(12) 4α,7α-dimethyl-19-nor-17β-hydroxy-17α-(3-propyl)-5β-androstan-3-one (VII'),
(13) 4α,7α-dimethyl-19-nor-17β-hydroxy-17α-trifluoromethyl-5β-androstan-3-one (VII'),
(14) 2α,4α,7α-trimethyl-17β-hydroxy-17α-(3-propyl)-5β-androstan-3-one (VII'),
(15) 2α,4α,7α-trimethyl-17β-hydroxy-17α-trifluoromethyl-5β-androstan-3-one (VII'),
(16) 2α,4α,7α-trimethyl-19-nor-17β-hydroxy-17α-(3-propyl)-5β-androstan-3-one (VII') and
(17) 2α,4α,7α-trimethyl-19-nor-17β-hydroxy-17α-trifluoromethyl-5β-androstan-3-one (VII').

*Example 55.—4α,7α-dimethyl-19-nor-17β-hydroxy-17α-ethyl-5β-androstan-3-one (VII')*

A suspension of 90 mg. of 1% palladium on carbon catalyst in 50 ml. of dioxane (purified as described in Fieser, "Methods of Organic Chemistry," page 368, 2nd edition) is saturated with hydrogen at atmospheric pressure. To the dioxane suspension 300 mg. of 4,7α-dimethyl-19-nor-17β-hydroxy-17α-ethynyl-4-androsten-3-one, prepared as in Example 52, is added and hydrogenated at atmospheric pressure until two equivalents of hydrogen are consumed. The reaction mixture is filtered through a bed of Celite (diatomaceous earth), the filtrate concentrated to dryness and chromatographed through a 100 g. column of Florisil packed wet with Skellysolve B. Elution by a radient technique employing between 2 percent acetone-Skellysolve B and 8 percent acetone-Skellysolve B, gives, in late fractions, the product 4,7α-dimethyl-19-nor-17β-hydroxy-17α-ethyl-4-androsten-3-one.

Earlier fractions are combined and recrystallized from Skellysolve B to give 4α,7α-dimethyl-19-nor-17β-hydroxy-17α-ethyl-5β-androstan-3-one (VII').

In the same manner as shown for preparing the various 17α-alkyl compounds (VII') from their 17α-alkynyl counterparts (VI') appearing after Example 54 by the substituting of appropriate starting materials and by following the procedure of the aforesaid example, similar substitution of the same 17α-alkynyl starting steroids (VI') and employment of the procedure of Example 55, likewise produces the corresponding 17α-alkyl-Δ⁴-compounds and in addition the corresponding 17α-alkyl-5β-androstane derivatives (VII').

By following the procedure of Example 54, but employing three equivalents of hydrogen instead of two, gives 4α,7α-dimethyl-19-nor-17β-hydroxy-17α-ethyl-5β-androstan-3-one (VII'), exclusively. By following this procedure and employing the starting materials disclosed in the immediately preceding paragraph, the corresponding 17α-alkyl-5β-androstane derivatives will be produced exclusively, without any of the 17α-alkyl-Δ⁴-compounds.

*Example 56.—4α,7α,17α-trimethyl-19-nor-17β-hydroxy-5β-androstane (VIII')*

A solution of 2 g. of 4α,7α-dimethyl-19-nor-5β-androstan-17-one (V) (prepared as in Example 51) in 100 ml. of 2 N methylmagnesium bromide in a mixture of equal volumes of benzene and tetrahydrofuran, is heated under reflux for about 18 hours. Most of the solvent is evaporated with a stream of nitrogen. The concentrate is poured into ice-water, acidified with dilute hydrochloric acid and extracted with ether. The extract is washed with sodium bicarbonate solution, water, dried and the solvent removed. It is chromatographed through a 150 g. column of Woelm neutral alumina. Unreacted starting material (VI') is eluted first. The desired product is then eluted and crystallized from aqueous acetone to give 4α,7α,17α-trimethyl-19-nor-17β-hydroxy-5β-androstane (VIII').

Following the procedure of Example 56 but substituting the methylmagnesium bromide, the following Grignard reagents:

(1) ethylmagnesium bromide (or chloride),
(2) n-propylmagnesium bromide (or chloride),
(3) i-propylmagnesium bromide (or chloride), and
(4) n-butylmagnesium bromide (or chloride)

yields, respectively, (1) 4α,7α-dimethyl-17α-ethyl-19-nor-17β-hydroxy-5β-androstane (VIII'),
(2) 4α,7α-dimethyl-17α-n-propyl-19-nor-17β-hydroxy-5β-androstane (VIII'),
(3) 4α,7α-dimethyl-17α-i-propyl-19-nor-17β-hydroxy-5β-androstane (VIII'), and
(4) 4α,7α-dimethyl-17α-n-butyl-19-nor-17β-hydroxy-5β-androstane (VIII').

Following the procedure of Example 56 and the paragraph immediately preceding the present one, reaction of the following pairs of starting materials and Grignard reagents:

(1) 4α,7α-dimethyl-19-nor-5β-androstane-3,17-dione-3-pyrrolidinyl enamine (prepared as in the third paragraph following Example 52) and ethylmagnesium bromide,
(2) 4α,7α-dimethyl-5β-androstane-3,17-dione-3-pyrrolidinyl enamine and n-propylmagnesium bromide,
(3) 2α,4α,7α-trimethyl-19-nor-5β-androstane 3,17-dione-3-pyrrolidinyl enamine and methylmagnesium bromide,
(4) 2α,4α,7α-trimethyl-5β-androstane-3,17-dione-3-pyrrolidinyl enamine and methylmagnesium bromide, followed by hydrolyzing the products with a base, yields, respectively, (1) 4α,7α-dimethyl-17α-ethyl-19-nor-17β-hydroxy-5β-androstan-3-one (VIII'),
(2) 4α,7α-dimethyl-17α-n-propyl-17β-hydroxy-5β-androstan-3-one (VIII'),
(3) 2α,4α,7α,17α-tetramethyl-19-nor-17β-hydroxy 5β-androstan-3-one (VIII'), and
(4) 2α,4α,7α,17α-tetramethyl-17β-hydroxy-5β-androstan-3-one (VIII').

Following the procedure of the Example 56 and the paragraph thereafter, reaction of the following pairs of starting materials and Grignard reagents:

(1) 4α,7α-dimethyl-5β-androstan-17-one (V') and isopropyl magnesium bromide,
(2) 4α,7α-dimethyl-5β-androstan-17-one (V') and n-butyl-magnesium bromide,
(3) 2α,4α,7α-trimethyl-19-nor-5β-androstan-17-one (V') and methylmagnesium bromide acid, and
(4) 2α,4α,7α-trimethyl-5β-androstan-17-one (V') and ethylmagnesium bromide, yields, respectively,
(1) 4α,7α-dimethyl-17β-isopropyl-17β-hydroxy-5β-androstane (VIII'),
(2) 4α,7α-dimethyl-17α-n-butyl-17β-hydroxy-5β-androstane (VIII'),
(3) 2α,4α,7α,17α-tetramethyl-19-nor-17β-hydroxy-5β-androstane (VIII') and
(4) 2α,4α,17α-trimethyl-17α-ethyl-17β-hydroxy-5β-androstane (VIII').

The 4α,7α - dimethyl (and 2α,4α,7α - trimethyl) - 17α-alkyl-17β-hydroxy compounds (VIII') produced in Example 56 and the three paragraphs immediately above, can be converted to their corresponding 17-acylates by following the procedures of Example 30 and the paragraphs thereafter.

*Example 57.—2α,4α,7α,17α-tetramethyl-3α,17β-dihydroxy-5β-androstane (VIII")*

To a solution of 1 g. of 2α,4α,7α,17α-tetramethyl-17β-hydroxy-5β-androstan-3-one (VIII') (prepared as in the second paragraph following Example 56) in 100 ml. of tetrahydrofuran, 1.5 g. of lithium aluminum tri-t-butoxyhydride is added at 0° C. with stirring. The reaction mixture is stored at about −15° C. for about 18 hours. Dilute acetic acid is added until the inorganic materials coagulate. The organic phase is decanted, dried over magnesium sulfate, filtered, concentrated to dryness, dissolved in an organic solvent and purified by chromatography with a Florisil column to yield pure 2α,4α,7α,17α-tetramethyl-3α,17β-dihydroxy-5β-androstane (VIII").

Following the procedure of Example 57, but substituting the following representative starting materials:

(1) 4α,7α-dimethyl-17α-ethyl-19-nor-17β-hydroxy-5β-androstan-3-one (VIII'),
(2) 4α,7α-dimethyl-17α-n-propyl-17β-hydroxy-5β-androstan-3-one (VIII') and
(3) 2α,4α,7α,17α-tetramethyl-19-nor-17β-hydroxy-5β-androstan-3-one (VIII'), yields, respectively,
(1) 4α,7α-dimethyl-17α-ethyl-19-nor-3α,17β-dihydroxy-5β-androstane (VIII"),
(2) 4α,7α-dimethyl-17α-n-propyl-3α,17β-dihydroxy-5β-androstane (VIII") and
(3) 2α,4α,7α,17α-tetramethyl-19-nor-3α,17β-dihydroxy-5β-androstane (VIII").

*Example 58.—4α,7α-dimethyl-19-nor-3α,17β-dihydroxy-17α-ethyl-5β-androstane (VII")*

Following the procedure of Example 57, but substituting 4α,7α - dimethyl - 19 - nor - 17β - hydroxy - 17α - ethyl-5β-androstan-3-one (VII') (from Example 55) as starting material, yields 4α,7α - dimethyl - 19 - nor - 3α,17β-dihydroxy-17α-ethyl-5β-androstane (VII").

Following the procedure of Example 58 but substituting the following representative starting materials:

(1) 2α,4α,7α-trimethyl-19-nor-17β-hydroxy-17α-ethyl-5β-androstan-3-one (VII'),
(2) 2α,4α,7α-trimethyl-17β-hydroxy-17α-ethyl-5β-androstan-3-one (VII') and
(3) 4α,7α-dimethyl-17β-hydroxy-17α-ethyl-5β-androstan-3-one (VII'), yields, respectively,
(1) 2α,4α,7α-trimethyl-19-nor-3α,17β-dihydroxy-17α-ethyl-5β-androstane (VII"),
(2) 2α,4α,7α-trimethyl-17β-hydroxy-17α-ethyl-5β-5β-androstane (VII"), and
(3) 4α,7α-dimethyl-3α,17β-dihydroxy-17α-ethyl-5β-androstane (VII").

*Example 59.—4α,7α-dimethyl-3α,17β-dihydroxy-17α-ethynyl-5β-androstane (VI")*

Following the procedure of Example 57 but substituting 4α,7α - dimethyl - 17β-hydroxy-17α-ethynyl-5β-androstan-3-one (VI') (prepared as in the fourth paragraph following Example 52) as starting material, yields 4α,7α-dimethyl - 3α - 17β - dihydroxy - 17α - ethynyl - 5β - androstane (VI").

Following the procedure of Example 59 but substituting the following representative starting maerials:

(1) 4α,7α-dimethyl-17β-hydroxy-17α(1-propynyl)-5β-androstan-3-one (VI'),
(2) 4α,7α-dimethyl-17β-hydroxy-17α-bromoethynyl-5β-androstan-3-one (VI'),
(3) 2α,4α,7α-trimethyl-17β-hydroxy-17α-ethynyl-5β-androstan-3-one (VI'),
(4) 2α,4α,7α-trimethyl-19-nor-17β-hydroxy-17α-chloroethynyl-5β-androstan-3-one (VI'), and
(5) 2α,4α,7α-trimethyl-19-nor-17β-hydroxy-17α-trimethylethynyl-5β-androstane-3-one (VI'), yields, respectively,
(1) 4α,7α-dimethyl-3α,17β-dihydroxy-17α(1-propynyl)-5β-androstane (VI"),
(2) 4α,7α-dimethyl-3α,17β-dihydroxy-17α-bromoethynyl-5β-androstane (VI"),
(3) 2α,4α,7α-trimethyl-3α,17β-dihydroxy-17α-ethynyl-5β-androstane (VI"),
(4) 2α,4α,7α-trimethyl-19-nor-3α,17β-dihydroxy-17α-ethynyl-5β-androstane (VI"), and
(5) 2α,4α,7α-trimethyl-19-nor-3α,17β-dihydroxy-17α-ethynyl-5β-androstane (VI").

*Example 60.—4α,7α-dimethyl-3α-hydroxy-5β-androstan-17-one (V")*

Following the procedure of Example 57, but substituting 4α,7α - dimethyl - 5β - androstane - 3,17 - dione (V') (prepared as in the paragraph following Example 51) as starting material, yields 4α,7α-dimethyl-3α-hydroxy-5β-androstan-17-one (V").

Following the procedure of Example 60, but substituting the following representative starting materials:
(1) 4α,7α-dimethyl-19-nor-5β-androstane-3,17-dione (V'),
(2) 2α,4α,7α-trimethyl-5β-androstane-3,17-dione (V') and
(3) 2α,4α,7α-trimethyl-19-nor-5β-androstane-3,17-dione (V), yields, respectively,
(1) 4α,7α-dimethyl-19-nor-3α-hydroxy-5β-androstan-17-one (V"),
(2) 2α,4α,7α-trimethyl-3α-hydroxy-5β-androstan-17-one (V") and
(3) 2α,4α,7α-trimethyl-19-nor-3α-hydroxy-5β-androstan-17-one (V").

*Example 61.—4α,7α-dimethyl-3α,17β-dihydroxy-5β-androstane (II")*

Following the procedure of Example 57 but substituting 4α,7α - dimethyl - 17β - hydroxy - 5β - androstan - 3-one (II') (prepared as in Example 25) as starting material, yields 4α,7α - dimethyl - 3α,17β - dihydroxy - 5β-androstane (II").

Following the procedure of Example 61, but substituting the following representative starting materials:

(1) 4α,7α-dimethyl-19-nor-17β-hydroxy-5β-androstan-3-one (II'),
(2) 2α,4α,7α-trimethyl-17β-hydroxy-5β-androstan-3-one (II') (prepared as in Example 27),
(3) 2α,4α,7α-trimethyl-19-nor-17β-hydroxy-5β-androstan-3-one (II'),
(4) 2α,4α,7α,17α-tetramethyl-17β-hydroxy-5β-androstan-3-one (II') (prepared as in Example 28) and
(5) 2α,4α,7α,17α-tetramethyl-19-nor-17β-hydroxy-5β-androstan-3-one (II'), yields, respectively, (1) 4α,7α-dimethyl-19-nor-3α,17β-dihydroxy-5β-androstane (II''),
(2) 2α,4α,7α-trimethyl-3α,17β-dihydroxy-5β-androstane (II''),
(3) 2α,4α,7α-trimethyl-19-nor-3α,17β-dihydroxy-5β-androstane (II''),
(4) 2α,4α,7α,17α-tetramethyl-3α,17β-dihydroxy-5β-androstane (II'') and
(5) 2α,4α,7α,17α-tetramethyl-19-nor-3α,17β-dihydroxy-5β-androstane (II'').

As indicated heretofore, the compounds of this invention are useful in therapy for their anabolic, anti-fertility, anti-androgenic, anti-estrogenic and hypocholesteremic (i.e., reducing blood cholesterol) activities, and particularly in the treatment of atherosclerosis and arteriosclerosis. Administration to mammals, including humans, depends on the particular compound involved, severity of the condition being treated and the individual's response to the medication. In general, a dose of about 5 to 1000 mg. of each of the compounds exemplified in Examples 1 to 61 and embraced within Formulas I to VII and II' to VIII' is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

*Example 62.—Compressed tablets*

A lot of 10,000 compressed tablets, each containing 10 mg. of 4,7α-dimethyl-17β-hydroxy-4-androsten-3-one is prepared from the following ingredients:

|   | Grams |
|---|---|
| 4,7α-dimethyl-17β-hydroxy-4-androsten-3-one | 100 |
| Dicalcium phosphate | 2500 |
| Methylcellulose, U.S.P. (15 cps.) | 65 |
| Talc, bolted | 450 |
| Calcium stearate, fine powder | 35 |

The 4,7α-dimethyl-17β-hydroxy-4-androsten-3-one and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

One tablet is given 3 times daily in the oral treatment of hypercholesteremia in adult humans.

*Example 63.—Hard gelatin capsules*

A lot of 1000 hard gelatin capsules, each containing 100 mg. of 2α,4α,7α-trimethyl-17β-hydroxy-4-androsten-3-one is prepared from the following ingredients:

|   | Grams |
|---|---|
| 2α,4α,7α - trimethyl - 17β - hydroxy - 4 - androsten-3-one, micronized | 100 |
| Starch, dried | 150 |
| Calcium stearate | 2 |
| Talc | 3 |

The starch, talc and stearate are mixed well and the 2α,4,7α-trimethyl-17β-hydroxy-4-androsten-3-one incorporated into the mixture. The whole is mixed well and filled into two-piece hard gelatin capsules.

The capsules are used in the reduction of cholesterol levels in adult humans at a dose of 3-6 capsules daily.

*Example 64.—Soft gelatin capsules*

A batch of 1000 soft gelatin capsules, each containing 50 of 2α,4,7α,17α-tetramethyl-17β-hydroxy-4-androsten-3-one and corn oil is prepared from the following materials:

|   |   |
|---|---|
| 2α,4,7α,17α - tetramethyl - 17β - hydroxy - 4 - androsten-3-one, micronized gm | 50 |
| Corn oil | q.s. |

A uniform dispersion of the active ingredient in the corn oil is prepared and the dispersion filled into soft gelatin capsules by conventional means.

One capsule is given three times a day in the treatment of hypercholesteremia in adult humans.

*Example 65.—Aqueous oral suspension*

An aqueous oil suspension containing in each 5 ml. 500 mg. of 4,7α-dimethyl-19-nor-3β,17β-dihydroxy-4-androstene is prepared from the following materials:

|   |   |
|---|---|
| 4,7α - dimethyl - 19 - nor - 3β,17β - dihydroxy-4-androstene, micronized gm | 1000 |
| Methylparaben, U.S.P. gm | 7.5 |
| Propylparaben, U.S.P. gm | 2.5 |
| Saccharin sodium gm | 12.5 |
| Cyclamate sodium gm | 2.5 |
| Glycerin ml | 3000 |
| Tragacanth powder gm | 100 |
| Orange oil flavor gm | 10 |
| F. D. and C. orange dye gm | 7.5 |
| Deionized water, q.s. to ml | 10,000 |

One teaspoonful (5 ml.) three times daily is employed in the treatment of hypercholesteremia in adult humans.

*Example 66.—Aqueous suspension for injection*

A suspending vehicle is prepared from the following materials:

|   |   |
|---|---|
| Polyethylene glycol 4000 gm | 30 |
| Potassium chloride gm | 11.2 |
| Polysorbate 80 gm | 2 |
| Methylparaben gm | 1.8 |
| Propylparaben gm | 0.2 |
| Water for injection q.s. ml | 1000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of 4,7α,17α-trimethyl 3β,17β-dihydroxy-4-androstene which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of 4,7α,17α-trimethyl-3β,17β-dihydroxy-4-androstene. The suspension is used intramuscularly in 1-ml. doses in the treatment of hypercholesteremia.

We claim:
1. 4,7α-dimethyl-19,nor-17β-hydroxy-4-androstene.
2. 4,7α-dimethyl-19-nor-3β,17β-dihydroxy - 4 - androstene.
3. 4,7α,17α-trimethyl-19-nor-17β-hydroxy - 4 - androsten-3-one.
4. 2α,4,7α - trimethyl-19-nor-17β-hydroxy-4-androsten-3-one.

5. 2α,4,7α,17α-tetramethyl-19-nor-17β - hydroxy-4-androsten-3-one.

6. 4,7α,17α - trimethyl-19-nor-3β,17β-dihydroxy-4-androstene.

7. 4,7α - dimethyl - 19 - nor - 3β,17β - dihydroxy - 17α-ethynyl-4-androstene.

8. Compounds of the formula

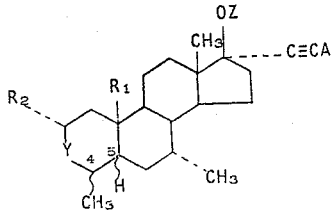

wherein ʃ is a generic expression denoting α- and β-bonds and mixtures thereof; the 4(5)-carbon atom linkage is selected from the group consisting of single bonds and double bonds, with the proviso that the 5-hydrogen atom is absent when the 4(5)-carbon atom linkage is a double bond; $R_1$ and $R_2$ are selected from the group consisting of hydrogen and methyl; Y is selected from the group consisting of the methylene radical (>$CH_2$), the carbonyl radical (>C=O),

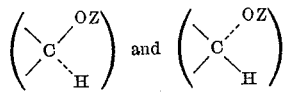

Z being selected from the group consisting of hydrogen, tetrahydropyranyl and the lower acyl radical of a hydrocarbon carboxylic acid containing from one to twelve carbon atoms, inclusive; A is selected from the group consisting of hydrogen, lower alkyl of from one to twelve carbon atoms, inclusive, chloride, bromide and trifluoromethyl.

9. 4,7α-dimethyl-19-nor-17β-hydroxy - 17α - ethynyl-4-androsten-3-one.

10. 2α,4,7α-trimethyl-19-nor-17β-hydroxy - 17α - ethynyl-4-androsten-3-one.

11. 4,7α-dimethyl-19-nor-17β-hydroxy - 17α - ethynyl-4-androstene.

12. A therapeutic composition comprising: about 5 to about 1000 mg. of a compound of the formula

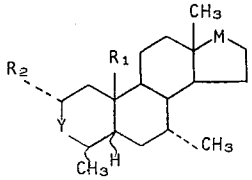

wherein ʃ is a generic expression denoting α- and β-bonds and mixtures thereof; the 4(5)-carbon atom linkage is selected from the group consisting of single bonds and double bonds, with the proviso that the 5-hydrogen atom is absent when the 4(5)-carbon atom linkage is a double bond; $R_1$ and $R_2$ are selected from the group consisting of hydrogen and methyl; Y is selected from the group consisting of the methylene radical (>$CH_2$), the carbonyl radical (>C=O),

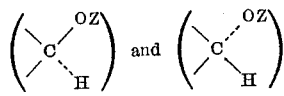

Z being selected from the group consisting of hydrogen, tetrahydropyranyl and the lower acyl radical of a hydrocarbon carboxylic acid containing from one to twelve carbon atoms, inclusive; M is selected from the group consisting of

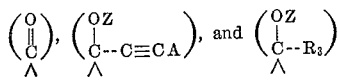

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and alkylene of from two to twelve carbon atoms, inclusive, and Z has the same meaning as above, dispersed in a pharmaceutical carrier.

13. A method for reducing blood cholesterol in mammals comprising: administering to mammals a compound of the formula

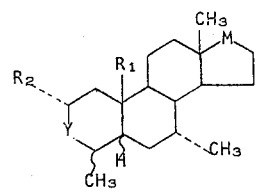

wherein ʃ is a generic expression denoting α- and β-bonds and mixtures thereof; the 4(5)-carbon atom linkage is selected from the group consisting of single bonds and double bonds, with the proviso that the 5-hydrogen atom is absent when the 4(5)-carbon atom linkage is a double bond; $R_1$ and $R_2$ are selected from the group consisting of hydrogen and methyl; Y is selected from the group consisting of the methylene radical (>$CH_2$), the carbonyl radical (>C=O),

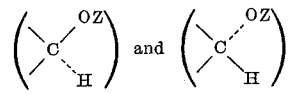

Z being selected from the group consisting of hydrogen, tetrahydropyranyl and the lower acyl radical of a hydrocarbon carboxylic acid containing from one to twelve carbon atoms, inclusive; M is selected from the group consisting of

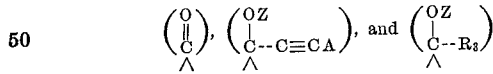

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and alkylene of from two to twelve carbon atoms, inclusive, and Z has the same meaning as above.

References Cited
UNITED STATES PATENTS 3,076,822  2/1963  Kirk et al. _____ 260—397.4
3,257,431  6/1966  Kincl _____ 260—397.4

ELBERT L. ROBERTS, *Primary Examiner.*